US010248700B2

(12) United States Patent
Diamond et al.

(10) Patent No.: US 10,248,700 B2
(45) Date of Patent: *Apr. 2, 2019

(54) SYSTEM AND METHODS FOR EFFICIENT SELECTION AND USE OF CONTENT

(71) Applicant: Remote Sensing Metrics, LLC, Chicago, IL (US)

(72) Inventors: Alex H. Diamond, Buena Vista, CO (US); Thomas Peter Diamond, Chicago, IL (US)

(73) Assignee: Remote Sensing Metrics, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,688

(22) Filed: Feb. 19, 2016

(65) Prior Publication Data

US 2016/0171059 A1    Jun. 16, 2016

Related U.S. Application Data

(63) Continuation-in-part of application No. 14/301,098, filed on Jun. 10, 2014, now Pat. No. 9,965,528, and
(Continued)

(51) Int. Cl.
*G06F 17/30* (2006.01)
*G06Q 30/02* (2012.01)

(52) U.S. Cl.
CPC ........ *G06F 17/30554* (2013.01); *G06F 17/30* (2013.01); *G06F 17/30241* (2013.01); *G06F 17/30572* (2013.01); *G06Q 30/02* (2013.01)

(58) Field of Classification Search
CPC .......... G06F 17/30554; G06K 9/00785; G06K 9/6298; G06T 2207/30242; G06T 7/97; H04N 7/183
(Continued)

(56) References Cited

U.S. PATENT DOCUMENTS 6,178,253 B1    1/2001  Hendrickson et al.
6,421,610 B1    7/2002  Carroll et al.
(Continued)

FOREIGN PATENT DOCUMENTS

DE    19828320 A1    12/1999
EP    2529610 A1    12/2012
(Continued)

OTHER PUBLICATIONS

Wergeles, F. Commercial Satellite Imagery. (Apr. 1998). Retrieved from SCIP Strategic and Competitive Intelligence Professionals: http://www.scip.org/Publications/CIMArticleDetail.cfm?ItemNumber=1318.
(Continued)

*Primary Examiner* — Hanh B Thai
(74) *Attorney, Agent, or Firm* — Valauskas Corder LLC

(57) ABSTRACT

The present invention relates generally to a system and methods for the selection and use of content. More specifically, the present invention relates to a system and methods through the use of which information of one or more types and from one or more information sources may be selected, accessed, analyzed, and managed in order to extract content from which synthesized information may be developed that may be used to produce an information product relevant to a selected topic, issue, subject, or other target. Certain embodiments of the present invention are configurable to permit a user to identify the target for which the synthesized information is sought, select the source or sources from which the information is drawn, identify content in the information relevant to the target to produce the synthesized information, and select the detail of and the form in which the synthesized information is presented in order to produce a customized information product.

22 Claims, 44 Drawing Sheets

Related U.S. Application Data a continuation-in-part of application No. 14/215,954, filed on Mar. 17, 2014, now Pat. No. 9,542,627.

(60) Provisional application No. 62/118,343, filed on Feb. 19, 2015, provisional application No. 61/833,431, filed on Jun. 10, 2013, provisional application No. 61/799,816, filed on Mar. 15, 2013.

(58) Field of Classification Search
USPC .................................. 707/722–724, 765–766
See application file for complete search history.

(56) References Cited

U.S. PATENT DOCUMENTS

| | | | |
|---|---|---|---|
| 6,501,857 B1 | 12/2002 | Gotsman et al. | |
| 7,068,816 B1* | 6/2006 | Knoblauch | A01B 79/005 |
| | | | 348/144 |
| 7,092,957 B2 | 8/2006 | Klein | |
| 7,171,389 B2 | 1/2007 | Harrison | |
| 7,536,025 B2 | 5/2009 | Folchetti et al. | |
| 7,660,430 B2 | 2/2010 | Navulur et al. | |
| 7,940,959 B2 | 5/2011 | Rubenstein | |
| 8,326,536 B1 | 12/2012 | Hoff | |
| 8,341,110 B2 | 12/2012 | Dalton | |
| 8,379,913 B1 | 2/2013 | Robinson et al. | |
| 8,411,903 B2 | 4/2013 | Paris et al. | |
| 8,649,567 B1 | 2/2014 | Maltby, II | |
| 9,105,128 B2 | 8/2015 | Robinson et al. | |
| 9,378,276 B1* | 6/2016 | Mengle | G06F 17/30719 |
| 2003/0040025 A1* | 2/2003 | Ishihara | G01N 33/5014 |
| | | | 435/7.21 |
| 2003/0040971 A1* | 2/2003 | Freedenberg | G06Q 30/06 |
| | | | 705/26.3 |
| 2004/0117777 A1 | 6/2004 | Lichana | |
| 2004/0260513 A1 | 12/2004 | Fitzpatrick et al. | |
| 2005/0162515 A1 | 7/2005 | Venetianer et al. | |
| 2005/0198095 A1* | 9/2005 | Du | G06Q 10/087 |
| | | | 709/200 |
| 2005/0222829 A1 | 10/2005 | Dumas | |
| 2005/0288957 A1 | 12/2005 | Eraker et al. | |
| 2006/0089842 A1 | 4/2006 | Medawar | |
| 2006/0136126 A1 | 6/2006 | Coombes et al. | |
| 2006/0294062 A1 | 12/2006 | Folchetti et al. | |
| 2007/0180131 A1 | 8/2007 | Goldstein et al. | |
| 2008/0016177 A1* | 1/2008 | Jin | G06F 17/30864 |
| | | | 709/217 |
| 2008/0095249 A1* | 4/2008 | Yoon | H04L 27/2659 |
| | | | 375/260 |
| 2009/0005968 A1 | 1/2009 | Vengroff et al. | |
| 2009/0040228 A1* | 2/2009 | Lee | G11B 27/105 |
| | | | 345/440 |
| 2009/0187575 A1 | 7/2009 | DaCosta | |
| 2009/0285487 A1 | 11/2009 | Knoblock et al. | |
| 2010/0243878 A1* | 9/2010 | Freiburger | G01T 1/20 |
| | | | 250/252.1 |
| 2011/0007094 A1 | 1/2011 | Nash et al. | |
| 2011/0288895 A1 | 11/2011 | Perez, Jr. et al. | |
| 2011/0295575 A1 | 12/2011 | Levine et al. | |
| 2012/0269395 A1 | 10/2012 | Coulter et al. | |
| 2012/0274482 A1 | 11/2012 | Chen et al. | |
| 2013/0050517 A1 | 2/2013 | Fan et al. | |

FOREIGN PATENT DOCUMENTS

| | | | |
|---|---|---|---|
| JP | 2008152810 | A | 7/2008 |
| JP | 2008257488 | A | 10/2008 |
| KR | 20050096853 | A | 10/2005 |
| WO | 2009129496 | A2 | 10/2009 |
| WO | 2011079324 | A2 | 6/2011 |
| WO | 2013032823 | A1 | 3/2013 |

OTHER PUBLICATIONS

Gannes, L. Parking Lots Help Predict Earnings. (Aug. 18, 2010). Retrieved from GIGOM: http://gigaom.com/2010/08/18/parking-lots-help-predict-earnings/.

Blanco, A.Satellite Imagery as Alternative Research for Investors. (Oct. 27, 2011). Retrieved from Integrity Research Associates: http://www.integrity-research.com/cms/2011/10/27/satellite-imagery-as-alternative-research-for-investors/.

Luccio, M. Business Uses of Satellite Imagery. (2012). Retrieved from Imaging Notes: http://www.imagingnotes.com/go/articleJ.php?mp_id=311.

Clark, E. Satellite Imagery Used for Sales Lead Generation. (Sep. 19, 2007). Retrieved from Gizmag: http://www.gizmag.com/go/8063/.

Imaging to Drive Remote Sensing Satellite Market. (May 31, 2012). Retrieved from optics.org: http://optics.org/news/3/5/43.

Kouchoukos, N. Globall Agricultural Production Estimates from Advanced Image Analysis. (2011). Retrieved from Lanworth: http://www.commoditymkts.org/Documents/NK%20Lanworth.pdf.

Satellite Imagery: Elevating Insight Three Powerful Ways GeoEye Introduces New Information Services Business Line. (2010). Retrieved from EIJ Earth Imaging Journal: http://eijournal.com/2010/satellite-imagery-elevating-insight-three-powerful-ways-geoeye-introduces-new-information-services-business-line.

Jin Chen; Soundararajan, G.; Mihailescu, M.; Amza, C., "Outlier Detection for Fine-grained Load Balancing in Database Clusters," in Data Engineering Workshop, 2007 IEEE 23rd International Conference on , vol., No., pp. 404-413, Apr. 17-20, 2007.

* cited by examiner

| PNRA | Reporting Period | Fill Rate | Sequential Monthly Growth | Reporting Period | Fill Rate | Sequential Monthly Growth | Year-Over-Year Traffic Growth |
|---|---|---|---|---|---|---|---|
| | | 2013 | | | 2014 | | |
| Oct | 10/2-10/29 | 59.1% | 3.9% | 10/1-10/28 | 58.1% | 5.4% | -1.7% |
| Nov | 10/30-12/3 | 50.8% | -14.0% | 10/29-12/2 | 51.4% | -11.5% | 1.2% |
| Dec | 12/4-12/31 | 49.9% | -1.7% | 12/3-12/30 | 51.9% | 0.9% | 3.9% |
| Quarter | 10/2-12/31 | | | 10/1-12/30 | | | 1.2% |

FIG. 4C

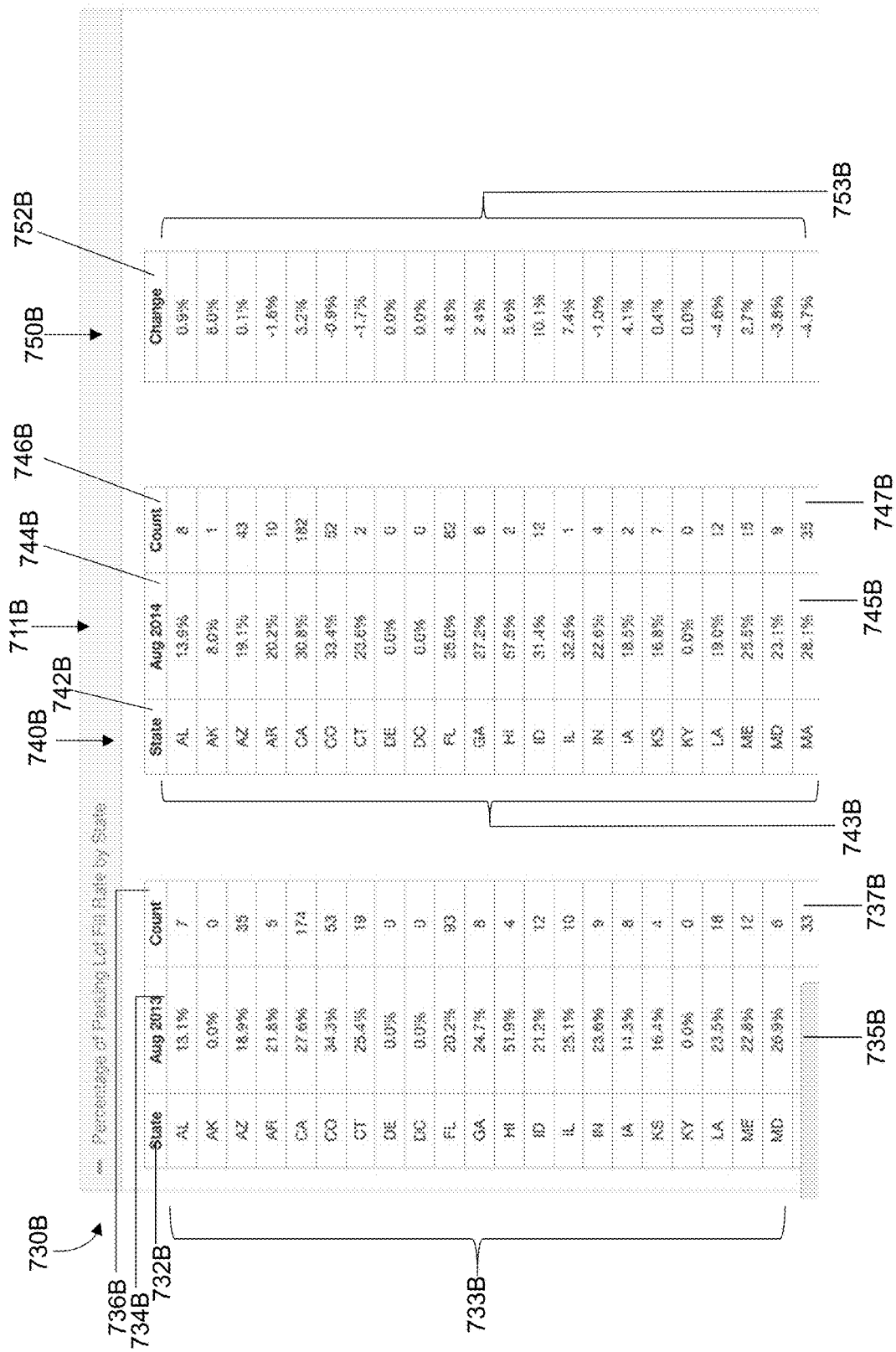

SYSTEM AND METHODS FOR EFFICIENT SELECTION AND USE OF CONTENT

CROSS-REFERENCE TO RELATED APPLICATIONS

This application is a continuation of co-pending U.S. Non-Provisional patent application Ser. No. 14/301,098 filed Jun. 10, 2014, which claims benefit of U.S. Provisional Application No. 61/833,431 filed Jun. 10, 2013, and co-pending U.S. Non-Provisional patent application Ser. No. 14/215,954 filed Mar. 17, 2014, which claims benefit of U.S. Provisional 61/799,816 filed Mar. 15, 2013, and U.S. Provisional Application No. 62/118,343 filed Feb. 19, 2015, all of which are incorporated herein by reference.

FIELD OF THE INVENTION

The present invention relates generally to a system and methods for the selection and use of content. More specifically, the present invention relates to a system and methods through the use of which content of one or more types and from one or more information sources may be selected, accessed, managed, analyzed, and developed to produce easy-to-use, easy-to-understand synthesized information relevant to a topic, issue, subject, or other target. Certain embodiments of the present invention are configurable to permit a user to identify the target for which the information is sought and select, receive, and process information to draw content from which synthesized information may be developed that may be used to produce one or more information products, some or all of which may be in simplified form so a user can obtain the product even in a limited mobile device environment. Embodiments of the present invention may be configurable to permit a customer to select the one or more types of information used and the information source or sources from which the information is drawn and select the detail of and format in which the synthesized information is presented, or otherwise to produce a customized information product. Additional embodiments of the present invention may be configurable to permit a customer to obtain some or all the information, data, content, and synthesized information which was used to develop the information product.

BACKGROUND OF THE INVENTION

From time to time, a person or entity may wish to find or confirm a detail about a topic, answer a question, or define or collect other information regarding a subject. In order to try to find the desired information, the searcher may try to locate a single source that may provide the information and, if so located, conduct a search of it. However, locating a source for information may not be an easy task, especially if the information that is being sought is very specific or highly specialized. A searcher may need to conduct an extended search to identify even possible sources of information. If the searcher fails to find a source for the desired information and the information that is being sought, the searcher has some options.

If the searcher cannot find a source for all the information that is being sought, the searcher may try to identify sources that may provide at least some of the information and, from these possibly many sources, locate and develop the more complete body of information that is being sought. However, again identifying what sources exist that may provide information of the type that is being sought is a time consuming task. Furthermore, determining what specific information is available through each such source is a time consuming task. Some of such time may be spent simply completing the one or more steps that a source may require before providing access to the information held by such source. The source may require that an application process be completed, or a fee be paid, or some "sign in" feature satisfied before access is provided. Again, the completion of these added steps, in order to find possibly at least some of the information that is being sought, adds time and overall makes the search process inefficient.

Furthermore, even if information can be obtained from multiple sources, it may not be readily joinable in order that a single body of information may be developed that the searcher can readily use. As a result, the searcher may need to move back and forth from the one or more non-joined bodies of information in order to have the benefit that a single body of information may provide. The separate nature of these components again makes it time consuming and inefficient for the searcher to obtain the full scope of information that is sought.

Even if a searcher is able to develop a combination of information that is of use to the searcher, the searcher may not be able to establish that each of the sources from which the searcher obtained the information is reliable and that the information is accurate. It is well known that sources can provide information that varies greatly in quality. Many traditional sources provide information, such as data, without checking its accuracy or quality. Few means are known to exist by which the accuracy and quality of information may be efficiently determined and, for example, aberrations within data and other information detected. As a result, while a searcher may be able to find that certain sources offer certain information, the searcher may not be able to determine which sources provide better quality information and which can be combined to provide the full scope of information that is being sought. As a result, even after expending a great amount of time and effort to locate the information, the searcher may be uncertain whether each portion and the combination of information is accurate and may be trusted.

While the combination of information drawn from disparate sources may provide the searcher with the body of information that the searcher is seeking, the combination may not be simple to access and download particularly in mobile digital environments. The combination also may be difficult to review including in such mobile digital environments. A combination having such shortcomings may make the overall usefulness of the combination limited. If the combination that is developed from the multiple sources of information is of a simple form, rather than complex, a searcher may wish to obtain some or all the original information from which the combination was developed for one or more reasons. The searcher may not only wish to verify what some or all the original information that was combined provides but also may wish to learn more about one particular component of the combination.

The searcher has another option if the searcher fails to find the source or sources for the information and the information that is being sought. The searcher may try to collect information about a topic that is related to the topic for which the searcher is seeking information and, from that related information, prepare an estimate of what the actual information that was sought may have been.

To illustrate, a business may wish to determine what are the holiday sales figures for a certain retail store during a certain period of time—possibly to determine the merits of the execution of a certain investment strategy or for market intelligence purposes. It is not likely that the desired information—the exact sales figures—is publicly available—or could be easily obtained in some way—such as by the direct observation of all the purchases made within the retail store. One option that the business may pursue is to redefine the question for which information is sought, generate information relevant to the redefined question and, from that information, generate an answer that may be used to provide an estimate relevant to the original question.

One example of this estimation process is the following. Given that a business searching for the actual sales figures for a store cannot likely obtain this information, the searcher may seek to determine the number of shoppers that came to the store for a given period of time and, from that number, extrapolate the sales activity. To determine whether the estimate may accurately portray the store's sales activity for the given period of time, the searcher may then compare the estimated sales activity with, for example, the sales activity at the same store but at a different period of time or for another store or relative to some industry average or reported sales activity for the company overall which may include a chain of multiple stores.

As another example, a person or entity may wish to determine how much manufacturing activity is taking place at a certain facility again possibly to determine the merits of a certain investment strategy, for market intelligence purposes, or for one or more other reasons. The information that is sought—the exact level of manufacturing taking place at the facility—may not be publicly available or easily obtained in some way—such as by the direct observation of the manufacturing activity—given that public access to the facility may not be permitted. The person or business seeking the information may redefine the question for which the information is sought, generate information relevant to the redefined question, and, from that information, generate an estimate relevant to the original question. For example, given that the actual manufacturing activity taking place at the facility may not be publicly known, the person or business may seek to determine what vehicles arrive and leave the facility, the number of such vehicles, and the time period in which the vehicles arrive and leave. The vehicles that are identified and counted may be passenger cars, train cars, and trucks. (In certain countries, bicycles—related activity may be relevant and counted.) A count of cars may permit an estimate to be generated of the number of workers at the facility. When and in what number the cars enter and leave the facility may permit an estimate to be made of whether one, two, or three shifts of workers are working at the facility. The number and types of trucks arriving and leaving the facility may permit an estimate to be generated of the volume of raw materials and components being received at the facility and the finished product that is being shipped from the facility. The number of train cars arriving and leaving the facility may permit similar estimates to be generated such as the amount of raw materials and components being received at the facility and the finished product that is being shipped from the facility. Any one or more sets of such information may allow the user to estimate whether and to what extent manufacturing is taking place at the facility. If the information is tracked over a period of time, an estimate may be generated whether the manufacturing activity is increasing, decreasing, or remaining the same. If the manufacturing activity at a different facility is known, a monitoring of that facility for worker or vehicle traffic and comparison of those numbers to the numbers generated for the target facility may allow a user to refine the originally generated estimates.

Similarly, if a user wishes to know whether and how much of an agricultural or forest product is being harvested in a certain area, the user may count the number of harvesting vehicles that are in the fields, the number of trucks that are on the road hauling product, or the number of vehicles that have arrived at storage facilities. While the types and numbers of vehicles that are associated with a certain activity may provide information from which an estimate of the scope of activity may be generated, data regarding the vehicle types and numbers may be difficult to obtain. A single source of such information may not exist. A business searching for this information would then need to gather the data. However, gathering such data may be time consuming and expensive.

Clearly, there is a demand for an improved system and methods by which a user can efficiently define a topic and obtain information from one or more information resources in order that the user can develop an easy-to-receive and review information product, the support for the substance of which may be accessible by the user. The present invention satisfies this demand.

SUMMARY OF THE INVENTION

The present invention relates generally to a system and methods for the selection and use of content. More specifically, the present invention relates to a system and methods through the use of which information of one or more types and from one or more information sources may be selected, accessed, analyzed, and managed in order to extract content from which synthesized information may be developed that may be used to produce an information product relevant to a selected topic, issue, subject, or other target. Certain embodiments of the present invention are configurable to permit a user to identify the target for which the synthesized information is sought, select the source or sources from which the information is drawn, identify content in the information relevant to the target to produce the synthesized information, and select the detail of and the form in which the synthesized information is presented in order to produce a customized information product. For purposes of this application, a "target subject", or more simply "target" means the person, group, entity, company, item, location, groups of locations, event, issue, question, problem, trend, topic, subject, or anything else for which the information is sought. Information of many types and from a wide variety of sources may be used for purposes of the present invention. Certain embodiments of the present invention may draw or extract content from the information for further analysis and the development—or, for purposes of this application, for the "synthesis"—of other information—termed "synthesized information"—concerning the target, including data, indices, signals, and other textual and graphical representations. In addition to the term synthesized information, the terms "additionally synthesized information" and "supplemental synthesized information" may be used in this application to identify that which may be developed by combining or modifying two or more bodies of synthesized information. By the use of the synthesized information, "information product" may be developed. Information product is the report type, visual display, audio communication, audio-visual communication, or format in which the synthesized information is communicated. Information product may be very simple in form such as a simple textual or graphical representation or sound.

The information used for purposes of the present invention may be made available or stored in a variety of information resources or obtained through the use of one or more devices or services and may be of any type that may be consumable by users such as, but not limited to any one or more of the following: images, text, numerical data, graphics, animation, audio, video, or any combination of those including content encountered as search results, through browsing or from communications with others through voice, text, or email, or other form of communication.

More specifically, certain embodiments of the present invention include a component by which one or more sources of types of information may be selected by a user. The user may aggregate some or all such information in one or more resources or "libraries" in order to facilitate the access to the information used to develop the content.

Certain embodiments of the present invention may provide a wide range of observable information that a user can access. Observable information is that information which has been or can be derived by direct observation or inspection of a target or some component, feature, or characteristic relevant to a target including through the use of observation or inspection apparatus and systems and from or through the use of third party sources. Observable information can also be collected by or for the user.

One type of observable information from which content may be drawn to determine the occurrence and scope of many different phenomena and events is imagery. Images may be used to chronicle the occurrence of and activity at an event or in a time period and as a tool to assist in developing an estimation of how many people are present at the event or location at the time each of the images is captured. Cameras carried aboard, for example, aircraft and satellites, or attached to tall or strategically-positioned buildings can capture images of and therefore the activity potentially within one or more large spaces or over large expanses of land. Images captured from such vantage points can show the number and types of vehicles on roadways, in parking lots of stores, or involved in some activity, such as manufacturing activity. By identifying and counting the number of vehicles, data may be generated that may provide an approximation of the information that is sought—such as the sales activity or the number of transactions that may have taken place in a store, or the manufacturing activity occurring at a production facility, or the crops ready for or actually being harvested.

While images may provide content on which estimates may be developed, the particular image or range of images that may provide such content may not be available. For example, satellite-based cameras can provide images only of that portion of the earth's surface over which the satellite is positioned. A searcher therefore is unable, for example, to obtain images of parking lots for the periods of time when the satellite is not in position to capture the images. Also, even if the satellite is in the proper position, a satellite can provide images only when the satellite's cameras have an unimpaired view of the earth's surface. Cloud cover, snow, rain, dust storms, pollution, or fog may obscure the view of the earth's surface and prevent clear (or any) images from being taken, for example, of one or more of the various stores' parking lots.

Also, even if the desired image or range of images are available, a searcher may be confident in drawing only a narrow range of conclusions from the content obtained from such image or images. For example, if a searcher was seeking to estimate the retail sales at a store based on satellite images captured of the retail store's parking lot, a count of the cars that appear in the satellite images taken of the parking lot may not inform the searcher which of the cars were those of shoppers and not of store workers, how many individuals were in each of the cars, and how many of these individuals actually made purchases—and therefore were shoppers, and not simply came to browse or to return merchandise. So, even if a satellite is in the proper position to capture images of a certain portion of the earth's surface, and the satellite's cameras view of the earth's surface is unimpaired, and the satellite does capture one or more images of the parking lot of a retail operation, what is happening inside the retail building is the subject of speculation. If the target is specific information regarding a store that is within a shopping mall, how does activity in the mall parking lot relate to sales within the one store is the subject of even more speculation.

Given that content drawn from a single source of information may not allow a searcher to generate an estimate in which the searcher is generally confident, certain preferred embodiments of the present invention permit a user to access information and draw content provided by one or more other sources and/or generated through one or more other means. For example, certain embodiments of the present invention permit a user to access information developed through the use of instrumentation other than cameras in order to supplant, complement, or expand the utility of the images captured through the use of cameras.

One example of non-camera instrumentation from which observable information may be accessed by users of certain embodiments of the present invention is the one or more communication systems operated by third parties. Such communication systems include communication networks, cellular phone networks, data networks, websites, navigation technologies, and internet service providers by which the presence and location of individuals in a given area can be identified. These systems include those that use cellular telephones and smart devices and may include a Global Positioning System, other satellite, cell-tower triangulation technologies, social networking systems, and other communication technologies including text/SMS, email, and Twitter. Some or all these technologies allow a wide variety of information to be developed concerning individuals including the location of the individuals. Credit card, debit card, and payment data provide information regarding the present and past location of individuals and the transactions in which they may have been involved. Because individuals may have multiple communication devices, some or all of which may be mobile, observable information may include information captured in multiple locations or at multiple points in time. The capture of such information may be accomplished by using a recording device.

For purposes of this application, a recording device may be any system, apparatus, or component by which a person may record or have recorded at least some observable information and thereby develop information relevant to the target. A sensor may be one type of a recording device. Motion detectors are types of sensors that can collect observable information regarding activity measurable relative to the detector. Examples of motion detectors include those by which the number of vehicles entering a parking lot, the number vehicles crossing a portion of a roadway, and the persons entering or passing through a door, other portal, or passageway may be identified. Sensors may also include those that measure the activity experienced by a communication or data network, website, or internet service provider. Embodiments of recording devices also may rely on human observations or input relevant to a topic. A camera may be one type of a recording device. Examples of a camera include a still camera, digital camera, video camera, webcam, camera integrated with a mobile phone, traffic camera, security camera, satellite camera, aerial mapping camera, aerial laser measurement (LiDAR), aerial or satellite radar measurement (SAR), aerial thermal mapping (heat), vehicle-mounted cameras (Google Streetview, or other views generated from car, truck, van, train, helicopter, airplane, space shuttle, or boat, to name a few), and can include audio recording devices used with pneumatic tubes to measure car movements.

Embodiments of recording devices may include also some of the functionalities of a rendering instrument. For purposes of this application, a "rendering instrument" is any machine by which a representation—including a visual representation or audio representation—relevant to a target may be generated. A visual representation may be any representation relevant to a target and may include some expression such as a graph, table, or chart.

Advantageously, certain embodiments of the present invention may provide access to a plurality of sources of information such as satellite imagery, aerial imagery, cellular phone data, GPS data, and data collected by other sensors. Content drawn from such information may provide a variety of information products including that which may identify whether economic activity is increasing, generally stagnant, or declining.

Certain embodiments of the present invention may include a content delivery system through the use of which information may be processed, received, and delivered to one or more end users. For example, certain embodiments of the present invention may enable a user to generate information product in a simplified form. Advantageously, such a simplified form can be sent through a variety of communication systems and received on a variety of communication devices including even a simplified mobile communication device. The simplified form may be that which is termed for purpose of this application as a signal—such as one or a few words, designs, colors, or other symbols (such element or elements that may form a signal generically termed "symbol")—having some pre-determined significance to a user. The signal may be the information product or may be included as a component within a multi-component information product.

Certain embodiments of the present invention facilitate the development of a user information product that may be proprietary to the user. More specifically, certain embodiments of the present invention are directed to a system that permits an analysis to be conducted of the externally available information developed for a target business and the internal information obtained by a business in order that the user may produce an information product that the user may consider to be proprietary.

More specific certain embodiments of the present invention are directed to what is termed for purposes of this application as the TrafficSignals system and methods. Certain embodiments of the TrafficSignals system and methods may permit a user to identify a specific economic activity as the target—such as the amount and types of customer traffic at a retail operation or a restaurant chain—and develop or have developed one or more information products providing selected information regarding the target. The TrafficSignals system and methods will be discussed to illustrate the range of information products that may be developed through the use of certain embodiments of the present invention.

The present invention and its attributes and advantages will be further understood and appreciated with reference to the detailed description below of presently contemplated embodiments, taken in conjunction with the accompanying drawings.

DESCRIPTION OF THE DRAWINGS

The invention, and its attributes, objects, and advantages may be further understood and appreciated with reference to the detailed description in conjunction with the appended drawings provided to illustrate and not to the limit the invention.

FIG. 4C illustrates one preferred embodiment of synthesized information developed from content drawn through the use of one preferred embodiment of the present invention.

FIG. 7A through FIG. 7L each illustrate a representation of an information product prepared through the use of a preferred embodiment of the present invention.

DETAILED DESCRIPTION OF SPECIFIC EMBODIMENTS OF THE INVENTION

Figure 1:
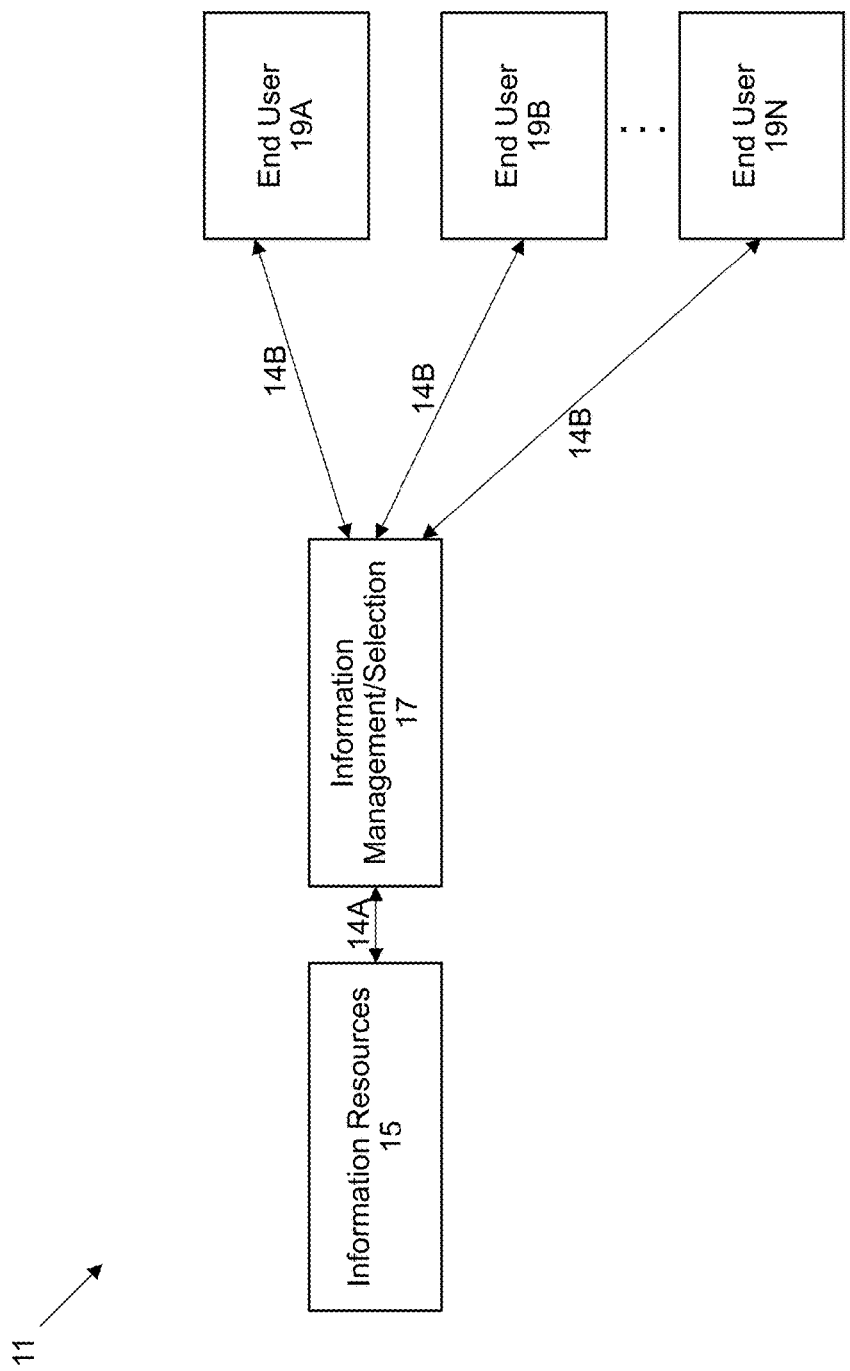
FIG. 1 is a block diagram illustrating one preferred embodiment of a system according to the present invention by which information may be selected and managed so that content may be drawn from it for the development of information product.

One preferred embodiment of a system 11 according to the present invention by which information may be collected, obtained, sourced, selected, managed, and processed so that content may be drawn from it relevant to a target for the development of synthesized information that may be distributed as an information product is shown in FIG. 1. System 11 illustrated in FIG. 1 includes an information resources component 15 and an information management/selection component 17.

More specifically, the information resources component 15 may be configurable to obtain information from one or more third party providers or sources. Such provider or providers or sources may offer the information that may be useful for purposes of the system on an ongoing basis, or upon request, or as needed. The information provided by the one or more third party providers may require that the information be used only generally contemporaneously or in some other limited context or application. The information may also be sourced, in part or wholly, by or for the user or users thereby possibly allowing the user or users to better define the information resources component 15, and thereby make the search and selection process more efficient and to develop an information product that includes the user's proprietary information. The information resources component 15 may include that which is obtained from governmental and public domain sources. The information resources component 15 may retain information in one or more databases or other storage resources that may be segregated such that only certain users or end users may access only certain information and draw content as needed.

Figure 2:
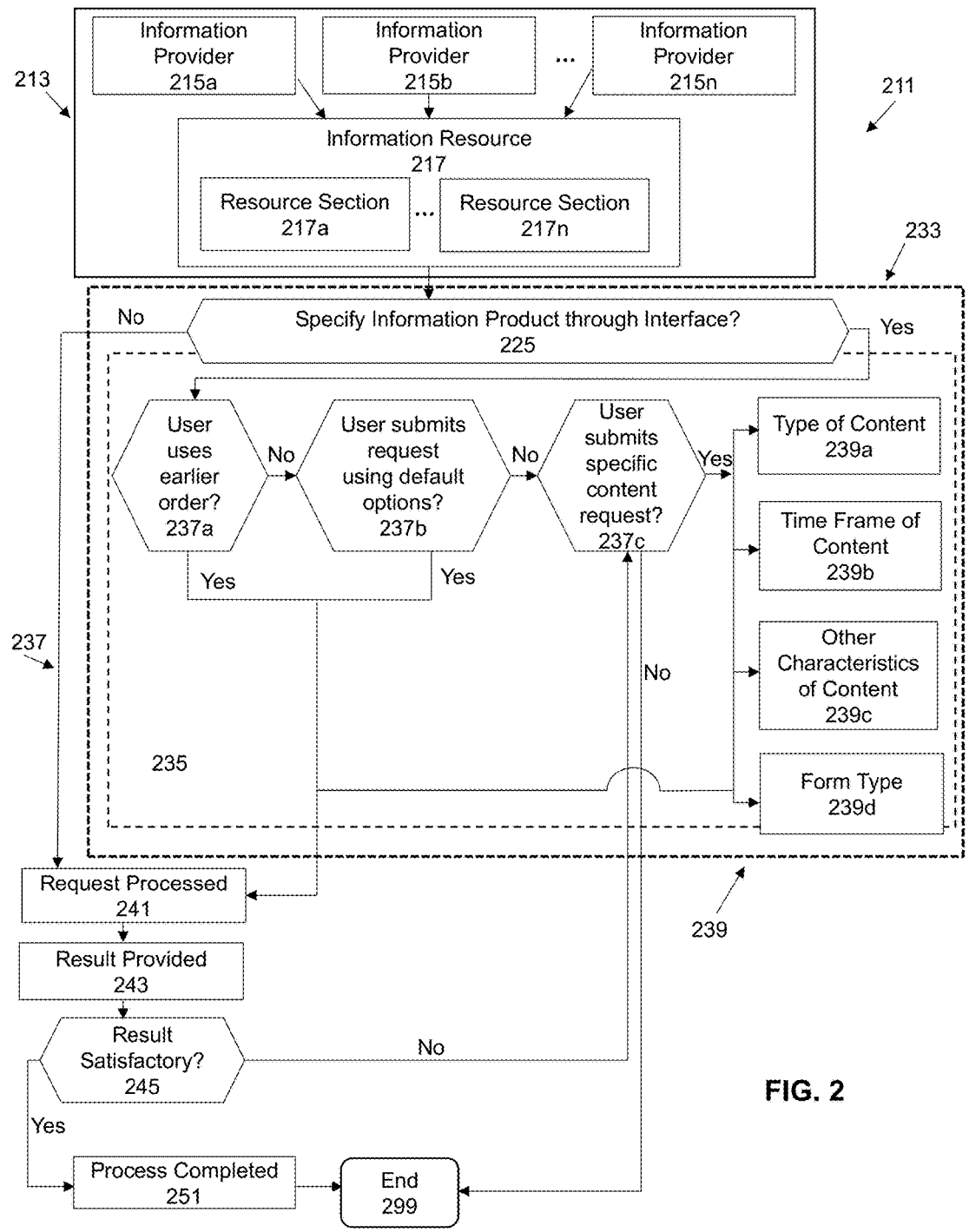
FIG. 2 is a flowchart showing the operation of a certain preferred embodiment of the present invention.

Information collection and aggregation component 213 shown in FIG. 2 illustrates one embodiment of how information may be obtained from one or more sources or providers 215a through 215n for retention in an information resource component 217. The information collection and aggregation component 213 shown in FIG. 2 includes an information resource component 217 having one or more resource sections 217a through 217n in which information—such as that obtained from one or more providers 215a through 215n by the one or more users and/or information developed or otherwise sourced by or for the user or users—may be retained in storage for access. Some of the information that may be made available through the information resource component 217 includes information including, but not limited to observational information—including images that may be captured in real time from one or more cameras, including satellite and other aerial cameras and terrestrial-fixed cameras and information obtained from communication devices—and contextual information—more specifically, information drawn from satellite, aerial, or terrestrial imagery, social media information, cell phone usage data, data obtained from any GPS-enabled device, maps, credit card data, sensor data, sales data, traffic data, census data, and information drawn from property titles, government leases, grants, and registrations. Some or all such information may be collected or aggregated in one or more resource "libraries" or sections 217a through 217n from which content may be drawn.

The information that is obtained for, stored within, and accessible through the information resources component 15 is selected, processed by, and otherwise managed through the use of the information management/selection component 17. The information management/selection component 17 may communicate with and access the information within the information resources component 15 such as through the communication network 14A. By managing, requesting, selecting, analyzing, and balancing the content drawn from the information made available through the information resources component 15, an information product may be developed for use by the user or users of the management/selection component 17 and/or distribution to or access by one or more end users 19A, 19B, 19N such as through communication network 14B. Communication networks 14A and 14B may be different networks or the same network. The information product may be the provision of an information service through the communication network 14B. The information product may be a service to which the one or more end users 19A through 19N may subscribe. In such a context, an information service provider accesses, manages and selects from the information available through the information resources 15 to draw the content from which the service provider will develop the information product that will be sent to the one or more end users 19A through 19N, such as according to a controlling subscription that the user may have established with the service provider. The information product may also be a customized product prepared according to specifications of one or a number of end users 19A through 19N such as on an "as-needed" basis. The information management/selection component 17 may be configured also to allow one or more end users 19A through 19N to access, manage, and select information from the information resources 15 and in order to draw content that the one or more end users seek, such as to develop an information product. Transmission through the communication components 14A, 14B may be achieved through one or more transmission systems and methods including but not limited to landline, fiber optic link, wireless, satellite, and microwave communications.

FIG. 2 illustrates a flow chart showing the operation of one of the preferred embodiments of a system 211 according to the present invention. System 211 includes an information collection and aggregation component 213 by which information, that may be obtained or collected from one or more providers 215a through 215n and/or obtained from one or more other sources or by the user or users, may be made accessible or available, aggregated, and/or stored in the information resource component 217, such as through the use of one or more resource sections 217a through 217n. Resource sections 217a through 217n may be one or more databases or storage "libraries". More specifically, the one or more of the information providers 215a through 215n may be those that may have and make available information that one or more users or end users may determine is relevant to a target. Also, any one or more of the information providers 215a through 215n may render such information-gathering services and collect information regarding a target upon request and render such information-gathering services. The information may be observable information. Additionally, any one or more of the information providers 215a through 215n may be one or more sources of contextual information including that which appears in a printed form and as data.

Information that may be obtained from certain information providers 215a through 215n may reside in one or more databases that may provide imagery captured by cameras, for example, mounted on satellites and lower flying craft including drones, and mounted adjacent to roadways, transportation facilities including rail stations, airports, and trucking and shipping facilities, and in or adjacent to buildings. One or more of the information providers 215a through 215n may provide content to a user as requested by the user, such as on an ad hoc basis, such as by making observations regarding a target as requested by a user. For example, the user may know in advance that certain imagery of or data regarding a certain target using a certain sensor or filter has not likely been captured. The user may request one or more content providers to capture that certain imagery and upload it or otherwise make it available to the user for use in the system 211. As another example, such imagery may be that which was captured by a satellite or drone-mounted camera having one or more filters or sensors to detect features or qualities of one or more targets in the non-visible portion of the light spectrum. An infrared sensor, for example, may capture such imagery. An example of the many types of data that may be made available for use within the system 211 is that which may be collected by a sensor or meter that identifies the movement of humans, animals, or vehicles through a "movement portal"—that is, a specific area in which the sensor or meter may detect movement and capture movement data. A sensor measuring the opening and closing of a door or the turning of a revolving door may provide such data.

The information collection and aggregation component 213 embodiment of the system 211 shown in FIG. 2 facilitates the aggregation of the content made available by information providers 215*a* through 215*n* at information resource 217. Advantageously, the aggregation of the information in component 217 facilitates efficient searching for information and the selection of content from it by allowing a user to access one resource rather than multiple sources. Embodiments of the system 211 may include an information resource 217 that includes one or more sections 217*a* through 217*n* in which information or the content drawn from it may be segregated or partitioned, such as by a user, and/or according to, for example, the target, type of content, time period, or the metadata identifying, for example, the source of the information, the content that was drawn from it, the date or time of creation or access to the information thereby facilitating even more efficient searching, selection, and use.

The illustrated embodiment of the system 211 includes a request entry component 233 (shown in FIG. 2 in bolded broken line) by which a user may define the certain information that the user is seeking to obtain from the use of the information collection and aggregation component 213. The illustrated embodiment of the system 211 permits the user to enter a request for the information that the user is seeking 225 such as through a graphical user interface ("GUI"). Examples of displays that may be produced by one such user interface system embodiment are shown in FIG. 5A through FIG. 5F and FIG. 5H and include an interactive display into which a user may enter at least certain specifics of the search request. One embodiment of the interface may be a subscriber page that may be accessed through an Internet-based web portal provided by a web server. Such a subscriber page may be created by an administrator by entering information into a database that is particular to a certain subscriber or subscribers through a system administration module (not shown). The establishment of an account and a subscriber page by the administrator may facilitate the searching of the system's resources by the subscriber.

If the user does not wish to obtain an information product such as a signal, a report, or some other information product more customized to the user's needs, but instead one of the one or more default products that may be obtained through the use of the system, the search may be directed, for example, to all the information that is in the resource 217 or all the certain content that is contained in one of the resource sections 217*a* through 217*n* of the information resource 217. The general request may be processed 241 and the information product provided to the user 243.

However, advantageously, certain embodiments of the system 211 may include a request configuration component 235 through the use of which a user may configure a detailed request and thereby obtain a customized information product. Certain embodiments of the system 211 may include a configuration component 235 that may have one or more configuration steps 237 and one or more content definition steps 239. The illustrated embodiment of the system 211 includes a request configuration component 235 (shown in FIG. 2 in non-bolded broken line) having three such configuration steps 237*a*, 237*b*, 237*c* and four such content definition steps 239*a*, 239*b*, 239*c*, and 239*d*. Other embodiments of the system 211 may include fewer or more such configuration steps 237 and content definition steps 239.

More specifically, regarding the configuration steps 237 in the FIG. 2 illustrated embodiment, configuration step 237*a* may allow a user to specify that a certain search of the information resource 217 be conducted and a certain information product produced based on an earlier order. The system 211 may allow a user to enter also a standing order, that is, to have a search run which the user has defined in the past and run again at one or more certain times (e.g., today and once again in a month) or at a certain rate (e.g., every day at the same time). The request may be processed 241 and the result (that is, the synthesized information as an information product) provided 243.

If the user chooses not to reuse a past request or enter a standing order for information specified by the user, the embodiment of the system 211 illustrated in FIG. 2 allows the user to make a request for an information product by using default search settings 237*b*. For example, the system 211 may define a certain search as one that draws upon satellite imagery of the parking lots of certain stores in a certain geographical area and the data of vehicle traffic flow in that same area. Another request using default settings may be one for the satellite imagery of the parking lots of certain stores and the cell phone usage data from the same or a subset of the certain stores. The result is processed 241 and the result provided 243. The user may enter a repeat order or a subscription to have such a search conducted on, for example, new satellite imagery and have such imagery compared to content drawn from one or more historical satellite images.

If the user chooses not to request that a search be run according to default settings established within the system 211, the user may make submit a specific content request 237*c* by entering such request through the use of one or more content definition steps 239.

More specifically, the embodiment of the system 211 illustrated in FIG. 2 may permit a user to define the type or types of content that the user is seeking 239*a* to be drawn from the information obtained from the information resource 217. Such content may be developed from one or more types of observable information and/or contextual information. For example, the user may specify that the content be drawn from only cell phone usage data, data from sensors, or camera imagery, or combinations of such information.

The embodiment of the system 211 shown in FIG. 2 may permit the user to define also the time frame of the information from which the content is drawn 239*b*. Accordingly, if the user wishes to obtain content through the interactive display during a certain period of time, the user may specify that limitation by entering it through the interactive display. FIG. 5D and FIG. 5E illustrate embodiments of an interactive display by which the time frame of the content may be specified.

The embodiment system 211 shown in FIG. 2 may permit the user also to identify further definition of the content that is sought by entering other characteristics of the desired content through the interface 239*c*. If the type of content that was specified through component 239*a* was camera imagery taken, for example, by a satellite, plane, or drone, such other characteristics may include resolution, pixilation, amount of cloud cover, date of creation, date of modification, time of day of creation, and type of camera.

The system 211 shown in FIG. 2 may permit the user to define also the information product—for example, the signal, the form, type of report, or visual display—by which the results may to be provided to the user 239d. For example, if the user wishes to know about the current versus historical economic conditions of a certain publicly traded business—based on content drawn from satellite imagery—in order that the user may make a prompt determination whether to buy or sell stock in the business, the user may wish to obtain a very simplified information product that is receivable and reviewable on even a smartphone or other simplified mobile communication device. The simplified information product may be a signal—such as a transmission or distribution of one or more words, designs, colors, sounds or other symbols (each such element or elements that may form a signal generically termed "symbol").

Once the request is entered, the request may be processed 241 and the result provided to the user 243. The embodiment of the system 211 shown in FIG. 2 advantageously may ask the user whether the information product that was provided is satisfactory 245. If the result is not satisfactory, the embodiment of the system 211 shown in FIG. 2 may permit the user to reconfigure the request by further defining the request 237c. If the result is satisfactory, the process is completed 251. Completion of the process may include payment for the services rendered and, upon receipt of the payment, providing, for example, not the low resolution images that may have been provided during step 243 but high resolution images or providing complete data sets rather than partial data sets. The completion of the steps may end the process 299.

Figure 3:
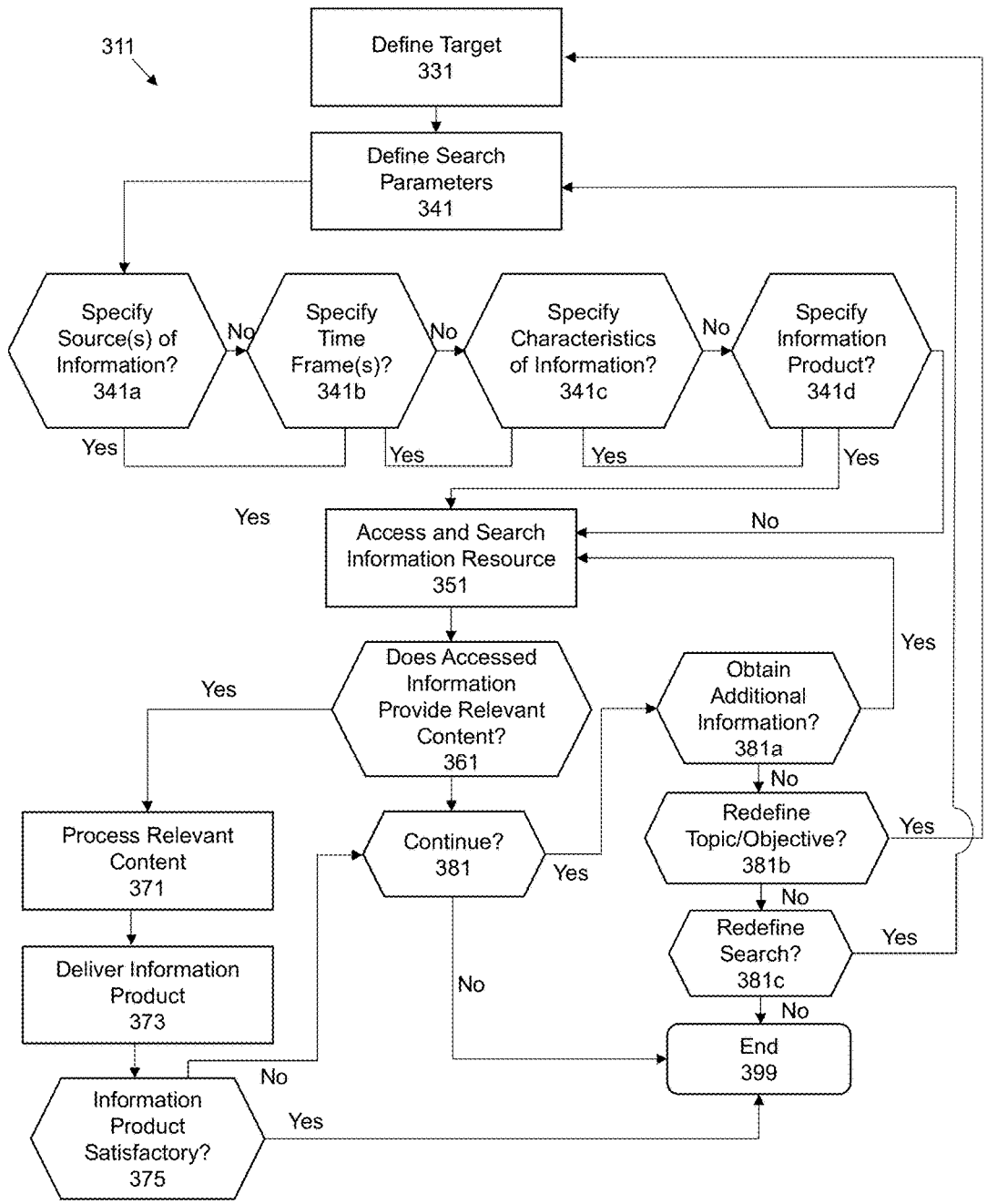
FIG. 3 is a flowchart showing the operation of another preferred embodiment of the present invention.

FIG. 3 illustrates another embodiment of a system 311 according to the present invention through the use of which the information management/selection component 17 shown in FIG. 1 may be accomplished. More specifically, the illustrated system 311 permits a user to define a specific request—such as that defined as component 237c in FIG. 2—that may be entered through the interface according to component 225 in the system 211 shown in FIG. 2. System 311 allows a user to define the target—that is, the question, topic, or objective—of the search 331 and the parameters of the search with specificity 341 if the user chooses to do so. The user may specify the one or more sources of the information 341a, the time frame represented by or relevant to the information or content 341b, other characteristics of the information that is sought 341c, and/or the type of the information product—for example, the form in which the search results are provided 341d.

Once the specific request is defined, an information resource—such as the information resource 217 shown in FIG. 2—may be accessed and the search 351 conducted. The illustrated system 311 may ask the user whether that which was provided to the user was that which the user was seeking 361—that is, relevant to the target. If the search results are satisfactory to the user, the accessed information is further processed 371 and the results delivered 373 as the information product—for example, in the form, signal, or display type specified by user at 341d. However, while the content may have been acceptable at 361, the information product may not be satisfactory. The illustrated embodiment of the system 311 asks the user whether the information product is satisfactory 375. If it is, the process may be completed 399. If it is not, the system 311 permits the user to continue the use of the system 381 and reconfigure the request or, if the user does not wish to continue the search process, the user may end the search 399. If the user wishes to continue the search, the FIG. 3 illustrated system 311 permits the user to obtain additional information from which to draw content 381a, redefine the topic or objective 381b, and/or redefine the search 381c. With those new parameters, the search may then be conducted and ultimately an information product including content may be provided to the user.

Figure 4A:
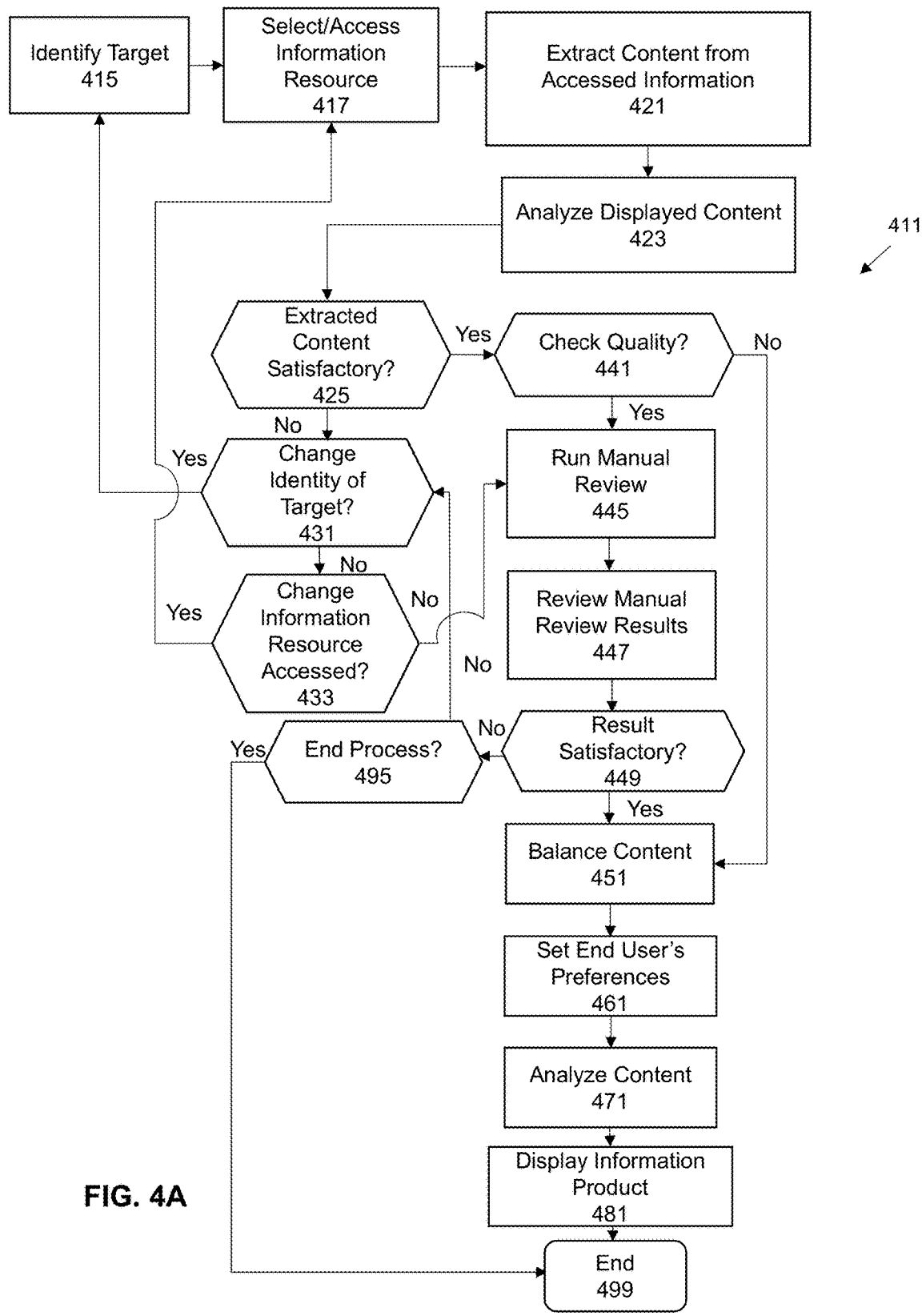
FIG. 4A is a flowchart showing the operation of another preferred embodiment of the present invention.

FIG. 4A illustrates another preferred embodiment of the present invention and more specifically a system 411 that includes components by which the content may be drawn from the information resource automatically and/or manually. System 411 permits the identification of the target 415 and the selection and access to some portion or all the information resource 417. The information resource may be developed or have access to information from one or more sources or providers including such as the information resource 217 shown in FIG. 2. The embodiment of the present invention illustrated in FIG. 4A permits the user to choose whether and by which process to extract the content from the selected information. An automatic process may be used to perform the extraction process. For purposes of this application, an "automatic" process or review is one that is conducted through the use of one or more computers configured to analyze information and develop content from it. The system 411 may be configurable to permit the extraction of certain content from certain information through a partially or semi-automatic process or wholly manual process (collectively termed "manual" process) 421. For purposes of this application, a "manual" process or review is one in which a person conducts at least some part of the analysis of certain information for purposes of developing selected content. Further details of embodiments of the extraction process will be provided below with the descriptions of FIGS. 4B and 4C.

The content extracted through the execution of extraction step 421 is made available (such as on one or more computer displays) for review and analysis by the user 423 and a query issued whether the extracted content is satisfactory 425. If the extracted content is not satisfactory, embodiments of the present invention may provide the user with certain options. For example, the illustrated embodiment of system 411 permits the user to change the identity of the target—that is, for example, change the focus of the search 431—or the scope or substance of the information resource 433 from which the content is drawn or to subject the information that was selected to a largely manual review 445. If the extracted content appears to be satisfactory, the user can seek to confirm the quality of the content 441 by conducting a manual or partially manual review of some or all the information that was selected relative to the content that was drawn from the selected information 447.

The following describes one of the preferred embodiments of the present invention by which certain content may be extracted from certain information. The system processes may be automatic. The manual review of information—such as that may be the subject of steps 445, 447—may be conducted through the use of the following processes. More specifically, this embodiment illustrates the system may be configured to select certain information—one or more satellite images of a specific target business operation—in order that certain content may be extracted—specifically the capacity of the parking lot associated with the business operation and the extent to which the parking lot is filled with vehicles—and synthesized information developed from which a specific information product—termed "TrafficSignals"—may be produced. One objective of the TrafficSignals information product is to provide a user with an estimate of the economic activity of a target business. The user may be able to estimate the economic activity of a target business—for example, the retail sales at one or more stores operated by the business—, by the number of vehicles that are in the parking lot or lots associated with such store or stores and possibly whether and how the number of vehicles in this defined area changes over a given period of time.

Figure 4B:
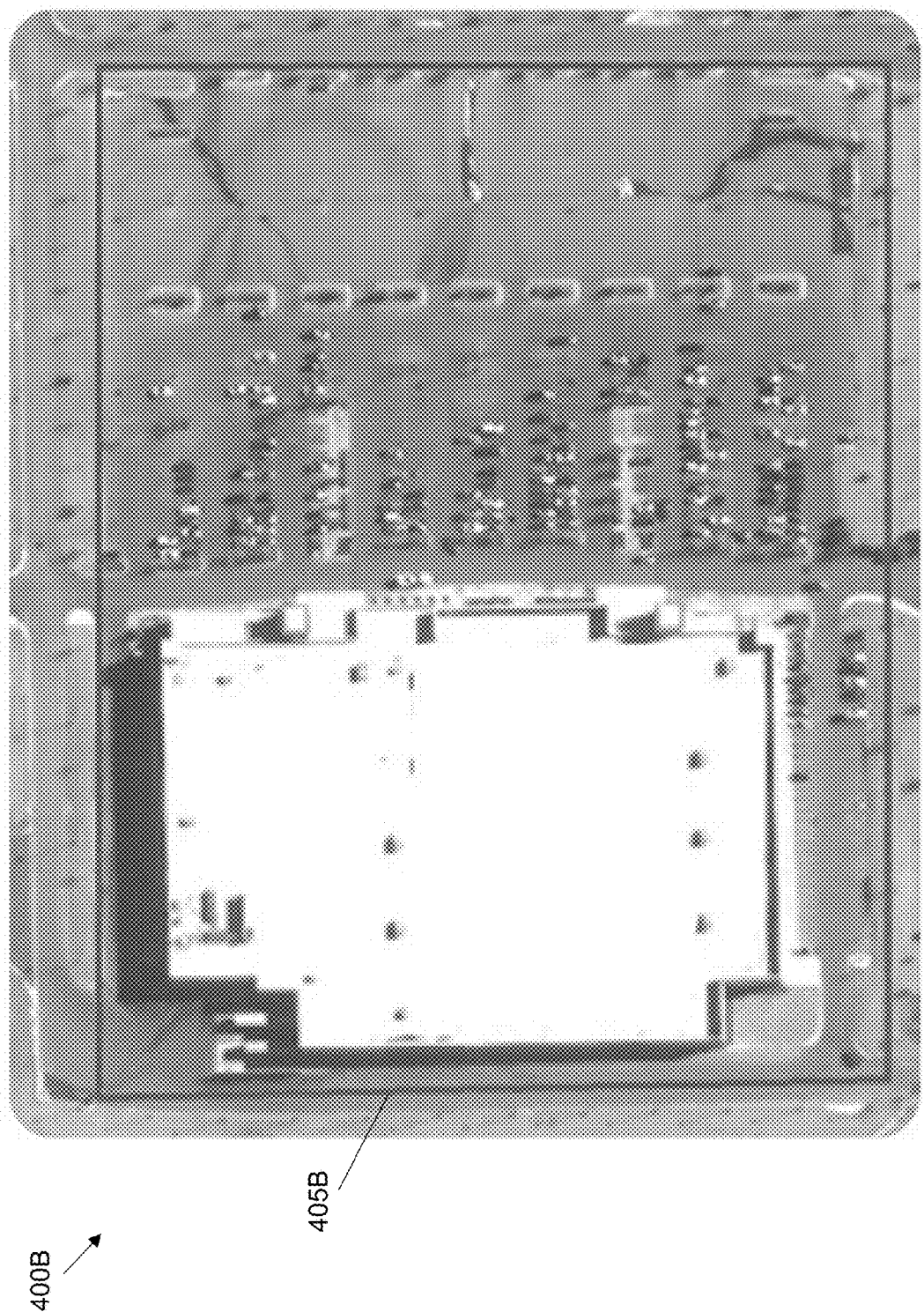
FIG. 4B is a representation of an image prepared through the use of a preferred embodiment of the present invention.

To determine the number of vehicles in the parking lot or lots of such store or stores, the system 411 may automatically or the user may manually access, for example, the information resource provided by the system and select one or more images—such as ones taken by a satellite or air-born vehicle of the store and its parking lot or parking lots. FIG. 4B illustrates an example of such a satellite image 400B of a single store and its parking lot that may be available within an information resource provided through the system. The selected image may be modified in order to define more accurately the information from which the content may be drawn. The FIG. 4B image has been modified by the insertion of a border 405B to define the geographic extent of the store and its parking lot. This border may be automatically located within each image using geo-reference points. In some cases, the line or lines defining a border may be drawn automatically using feature extraction software that may determine the outlines of the parking lot and the location and midpoints of building entrances. Such a border may be defined also by the insertion of a line or a shapefile manually one time for each store or company that may be analyzed. That same border may be automatically used for some or all other images that may be analyzed. For example, the same border may be used if the images are of the same store or company but differ only in that the images were captured at different times. The border may be manually moved into place, for example, if there is error in the automatic location. To obtain a count for a store that is in a shopping mall with a large shared parking lot, one embodiment of the system may place the border such that, for example, that only the first 20 rows of parking spaces are captured within it. For a store located in a strip mall with small shared parking lots, one embodiment of the system places a border between stores using the midpoint between the entrances and extends the border all the way to the end of the parking lot.

Vehicles within the bordered area defined by the border line may be counted for purposes of determining the number of vehicles in the parking lot. The number of parking spaces that exist within the bordered area may be counted also. By determining the extent to which vehicles are parked in the parking spaces existing in the bordered area, the "fill rate"— that is, the percentage of parking spaces that are occupied by vehicles within the defined parking lot—can be calculated. An examination of satellite image 400B shown in FIG. 4B reveals that 400 parking spaces are available in the parking lot within the area defined by the border 405B and that 151 of the 400 parking spaces are occupied by vehicles, providing a "fill rate" of 37.8%. Through the use of step 421 shown in FIG. 4A, the user may extract such content—that is, the number of parking spaces in the bordered area, the number of vehicles present in the bordered area, the fill rate (that is, the number of parking spaces in which cars are parked in the defined parking lot)—or other content from the image or images by an automatic process, a manual process, or a combination of both (a "semi-automatic" process). One or more images, such as the original satellite image, the satellite image 400B as modified with the addition of the border 405B, or other image may form some or all of the information from which content is drawn—for example, the fill rate—, synthesized information developed, and an information product produced that may be distributed to a user of the system according to the present invention. Even if the extracted content appears to be satisfactory—for example, the system has provided what appears to be an accurate fill rate for the given image, and therefore the user chooses not to change the identity of the target—that is, for example, change the focus of the search 431—or change the information selected from the information resource 433 from which the content is drawn—, the user may wish to conduct a review of some or all the information that was selected and from which content was extracted 445 such as for quality control purposes. Such a review by a user may be a semi-automatic or wholly manual process. Embodiments of the system may be configurable to permit a user to conduct such a review while the system continues to be engaged in the process of collecting information and extracting content from it for purposes of developing an information product. Advantageously, such embodiments permit a user to check for quality while the system is working to develop the chosen information product, not afterwards, and therefor may improve the efficiency of the operation.

One embodiment of such a review procedure requires that a user do a "hand count". For purposes of this application, a "hand count" is an analysis conducted by one or more individuals of certain selected information—such as one or more satellite, aerial, or other images—for which the one or more individuals seek to determine the presence, number, and/or other aspect of a certain feature. The user may then compare the hand count total with the total obtained through the extraction step 421 to determine the accuracy of that which was performed as the extraction process or the accuracy of the hand count process. Among the features that may be the subject of such a hand count are the presence and number of parking spaces and the number of vehicles in an area defined within an image of a business operation.

For quality control purposes for purposes of the review step 423, the content extracted from the information may be compared to historical information and, if the newly extracted content appears aberrant, the system 411 may identify the information as being suitable for a manual review. For example, the content obtained from the extraction step 421, and as part of the review step 423, may be one or more totals of the vehicles parked in one or more parking lots or the fill rates. Such vehicle count totals may be compared with, for example, a historical count—such as a historical average of car counts—for the same or similarly-situated parking lot. The historical count data may be available by accessing one or more of the resource sections 217a through 217n of the information resource 217. If the new count totals exceed a specified standard deviation— either above or below the mean—, the information from which the new counts were obtained can be manually reviewed 445.

For quality control purposes, the user may consider also the parking lot images from which the highest vehicle count totals were obtained and the parking lot images from which the lowest vehicle count totals were obtained and, by accessing historical data that may be available in one or more of the resource sections 217a through 217n, compare those totals with a certain percentage of the highest and lowest historical totals obtained for the same or similarly-situated stores.

Once the review of the information 449 is completed, embodiments of the system 411 may provide the user with one or more options. As one example, the embodiment shown in FIG. 4A, permits the user to choose whether to end the process 495 if the user is not satisfied with the extracted content. If the user chooses to end the process, the process is ended 499. Such ending process may include payment for services rendered, logging out, or one or more other steps. If the user is not satisfied with the result but chooses not to end the process, the illustrated embodiment of the system 411 provides the user with the option of changing the identity of the target 431, or the information resource that was accessed 433, or re-conduct the manual review of the information that was selected 445.

If the content extracted from the process 421 was satisfactory and the user does not wish to conduct a quality check or the result from the manual review was satisfactory 449, the embodiment of the system 411 illustrated in FIG. 4A permits the user to refine the content 451 into a final result. The refining of the content into a final result will be discussed more fully below with respect to, for example, the embodiment illustrated in FIG. 8A.

The FIG. 4A illustrated embodiment of the system 411 allows the user to define the information product that is produced by establishing the user's preferences with respect to that product 461. For example, the system 411 permits the user to select, for example, what information for what target is subjected to the extraction step 421, what parameters to set for the content that is to be drawn from the information, to what analysis or analyses should the information and content be subjected, what synthesized information is developed from the content extracted from the selected information, and the display type that will be used to display the information product.

The system 411 will then analyze the content based on the preferences that were set 471 and the information product will be displayed 481, such as through a computer display. The satisfactory display of information product ends the process 499.

FIG. 4C illustrates one example of the synthesized information that may be developed through the use of certain embodiments of the system by an analysis of selected information and the content extracted from it. The information that was subjected to processing to obtain the content, such as through the use of the system 411 shown in FIG. 4A, comprises a group of images—such as the one shown in FIG. 4B—captured over the identified periods of time—the years 2013 and 2014. The FIG. 4C illustrated embodiment of the synthesized information is an informative product—a report 401C that includes a business identification area 405C—in which the subject to which the analysis is directed is identified through the use of a term or symbol that is recognizable or specified at least by the user. With respect to the illustrated embodiment of the report 401C, the term that is used is a recognized stock "ticker"—"PNRA"—that identifies the Panera Bread Company.

More specifically, the FIG. 4C illustrated embodiment of report 401C provides information synthesized from satellite images taken for each of the certain identified months—October, November, and December—for each of the two identified years—2013 and 2014—plus provides areas in which a summary developed for each of these fourth calendar quarters may be entered.

The embodiment of the report 401C illustrated in FIG. 4C includes time designation areas 411C which identify the periods of time during which the information that was used to produce the synthesized information that is the subject of the report 401C was taken. The time designation areas 411C shown in the illustrated embodiment comprise year designation areas 413C, individual month designation areas 415C, and a multi-month designation area 417C.

The illustrated embodiment of the report 401C identifies for what more specific time period or periods the information was obtained that was analyzed to extract the content and develop the synthesized information. The illustrated embodiment of the report 401C includes a Reporting Period 421C column for each of the two identified years that identifies the time period for each of the identified months within which images were captured and that were processed to provide content.

From the information obtained in order to prepare report 401C—that is, satellite images—specific content was extracted—that is, the number of parking spaces within the bordered area defined within each of the images and the number of vehicles parked in the parking spaces—and a "fill rate" calculated—that the system enters in the fill rate identification areas 431C for each of the designated months. This fill rate synthesized information developed from the parking space content and the vehicle count content extracted from the satellite image information may be used to estimate the economic activity at, and possibly the financial health of the one or more Panera Bread stores that were captured in the images used to prepare the report 401C—but possibly more broadly all Panera Bread stores. The embodiment of the report shown in FIG. 4C illustrates the additional information that may be developed from the content extracted from the satellite images and the fill rate synthesized information. This additionally synthesized information or supplemental information—"Sequential Monthly Growth"—is developed by comparing the fill rate for each month relative to the preceding month. The FIG. 4C illustrated embodiment of the report 401C provides "Sequential Monthly Growth" areas 441C in which the supplemental synthesized information may be provided. By obtaining and comparing the monthly growth rate for one month of one year with the rate for the following year, additional synthesized information—"year-over-year traffic growth" information—may be developed. In the illustrated report 401C, the additional synthesized information—developed by comparing the fill rate for one month in one year (2013) with the fill rate for the same month for the subsequent year (2014) to determine the rate at which "traffic"—that is, the number of vehicles in the parking lots—has increased or decreased for the period of time—may be inserted in the "Year-over-Year Traffic Growth" area 451C of report 401C. The illustrated embodiment of the report 401C provides monthly entry areas 461C for Year-over-Year Traffic Growth for each of the identified months and a quarterly summary entry area 471C for Year-over-Year Traffic Growth for the fourth quarter of each of the identified years.

The content that may be drawn from information and analyzed for purposes of preparing the content which may be used to develop synthesized information, such as the report 401C, may be prepared for a single store that is tracked over a period of time. For businesses that have multiple stores, information may be drawn for a sample of or for all the stores that form the business. A sample size may be information drawn from information resources for certain stores of a business that are distributed in only one or certain limited geographical areas. A sample size may be information drawn for a selection of or all stores within all geographical areas in which the stores are located. The synthesized information may represent an average of the information drawn from the information obtained for each of the stores in the sample. For example, the fill rate provided in report 401C may represent an average of the fill rates for each of the stores in the sample for the given period of time. For the comparisons to be meaningful, the system may select images for generally the same period of time during the day.

Certain embodiments may provide to a user or permit a user to obtain additional information regarding the stores for which the images were selected such as whether all stores for a certain business were used for the analysis, whether stores only within a certain geographical area were used, and/or whether a sampling of stores was used and what was the sampling. Such supporting information may be provided with or separate from the synthesized information.

Figure 4D:
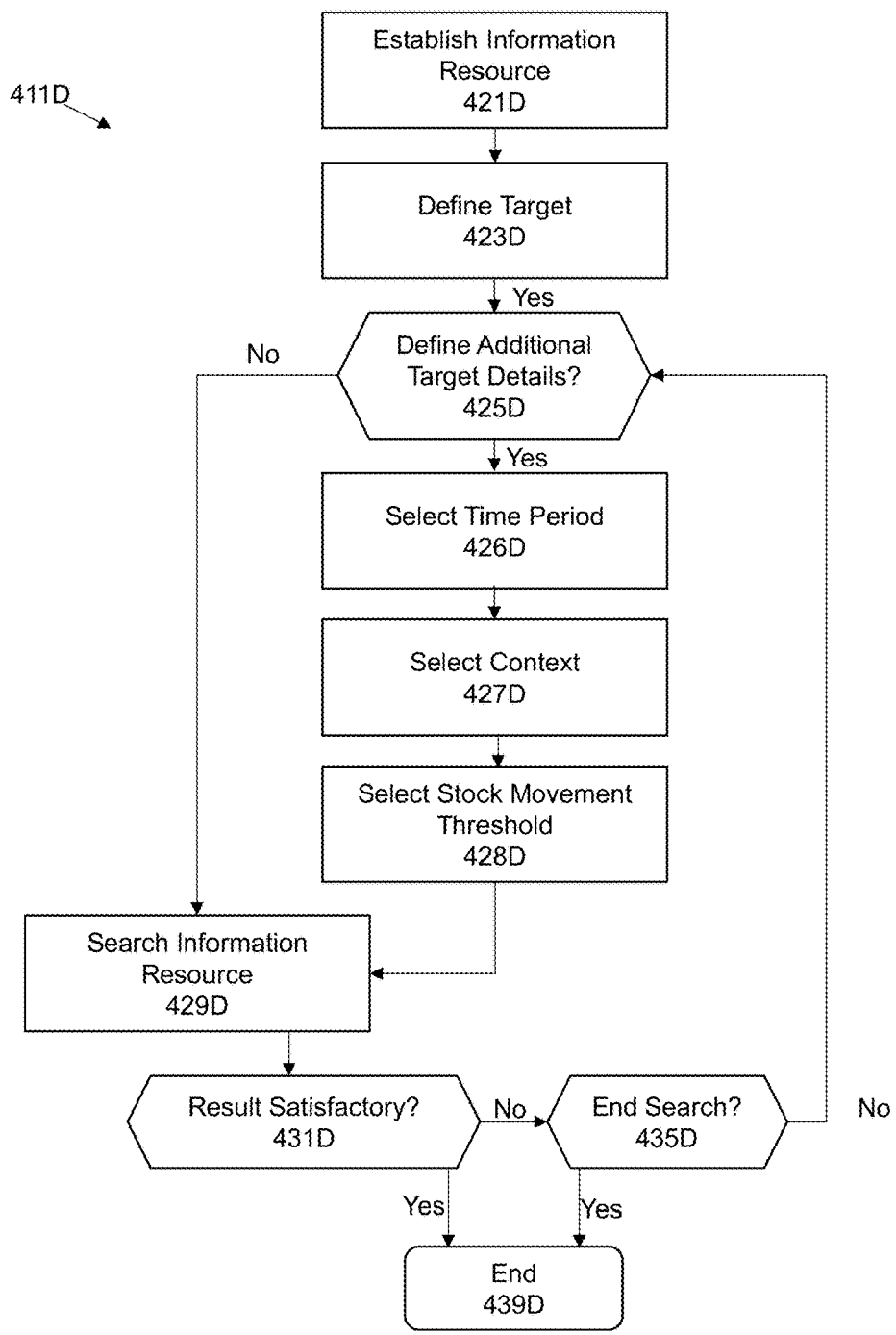
FIG. 4D is a flowchart showing the operation of another preferred embodiment of the present invention.

FIG. 4D illustrates one preferred embodiment of a system 411D according to the present invention by which an information resource—such as the one formed through the use of the information collection and aggregation component 213 shown in FIG. 2—may be developed and a search—whose scope may be defined—may be conducted for a certain target. More specifically, through the use of the system 411D, an information resource may be established 421D and the target, to which the search is directed, may be defined 423D. The embodiment shown in FIG. 4D illustrates a system 411D by which content may be developed for purposes of placing the movement of the stock price of a business in a greater context. If a user does not wish that a search regarding a target be directed to the entire information resource, the system 411D permits the user to configure the scope of the search 425D by identifying the time at which the information was collected 426D, whether and what additional information is available to place the more recent information in context 427D, and the stock movement threshold 428D, which when exceeded, causes what is termed for purposes of this application a certain information product—a "signal"—to issue. The information resource may be searched 429D based on the definition of the target. Content developed from the execution of the illustrated steps may be provided to the user as an information product— including as a signal—and a query issued whether the result—the information product—is satisfactory 431D. If the result of the search is not satisfactory, a query is issued whether to end the search 435D or to refine or further refine the details of the target 425D. Once the process is completed 437D, or the user decides to end the search 435D, the search is completed 439D.

FIG. 5A through 5H illustrate certain preferred embodiments of the present invention and more specifically computer generated graphical interface displays through the use of which a user, such as an end user may interact with and configure the system in order to define the target for which t certain information is sought and some of the information products that may be provided through the computer display. Further for illustration purposes, FIG. 5A through FIG. 5H show the operation of the present invention in order to develop and provide TrafficSignals information products to one or more end users.

Figure 5A:
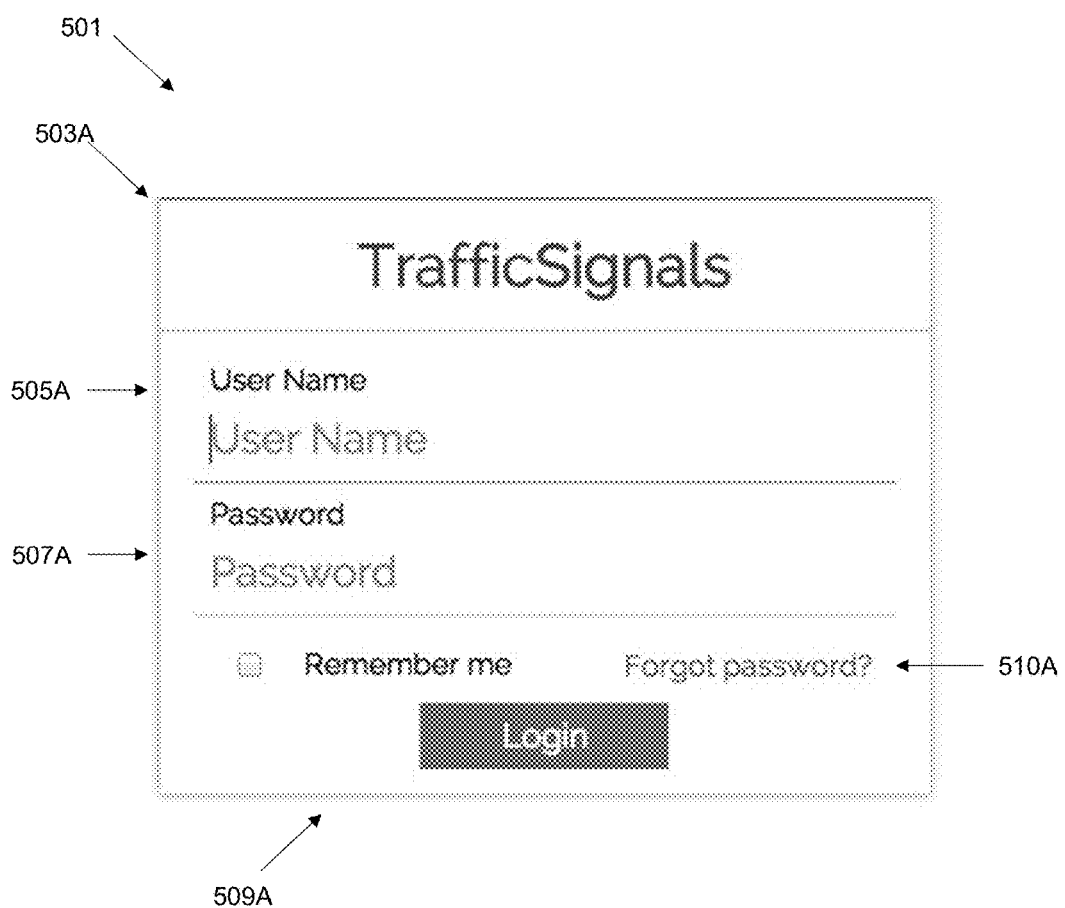
FIG. 5A is a representation of a login screen that allows end users to securely access information products that may be customized for them within the TrafficSignals application.

FIG. 5A illustrates one component, login screen 503A, of certain of the preferred embodiments of user interface 501 by which, for example, an end user may interact with and specifically log into an account established through the use of the system in order to obtain TrafficSignals information products. The illustrated embodiment of the screen 503A includes a name entry feature 505A into which, for example, an end user may enter a name, a password entry feature 507A into which an end user may enter a password, and a Login button 509A which, upon entry of the requested information, an end user may engage in order to seek access to the system. A "Forgot password?" component 510A permits an end user to obtain or reset a password by obtaining a verification code via email.

Figure 5B:
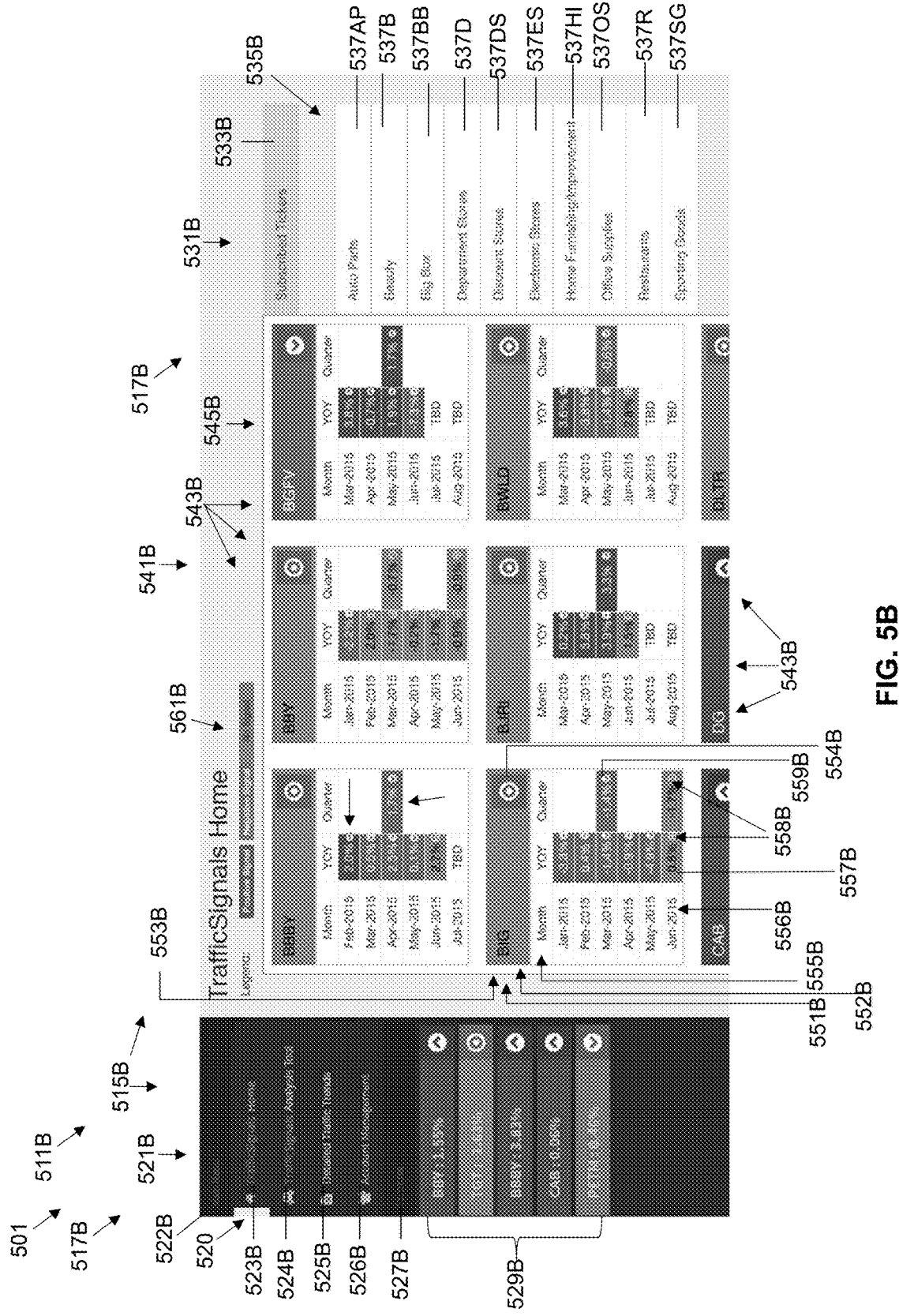
FIG. 5B through FIG. 5H each illustrate components of a graphical user interface by which a user may configure the system formed in accordance with an embodiment of the present invention and other information product.

FIG. 5B illustrates one embodiment of the screens of certain embodiments of the end user interface 501 specifically by which an end user can select the target and obtain the desired information product directed to the target. The illustrated embodiment of the selection screen 511B may be that which is displayed from the use of the user interface 501 after the end user logs into the system, such as through the use of user interface screen 503A shown in FIG. 5A. The illustrated embodiment of the selection screen 511B includes two selection groupings 515B—each termed also a "menu" for purposes of this application—and a content display area 541B. Each of the selection groupings 515B may include one or more selection identifiers 517B that inform the end user what one or more selections may be available and areas of the interactive display screen—or "buttons"—that the end user may engage to enter a selection. One of the selection groupings 515B of the illustrated embodiment is a main sidebar 521B identified with the "Main Menu" heading 522B and positioned in the FIG. 5B illustrated embodiment to the left of the content display area 541B. The other selection grouping shown in the FIG. 5B embodiment is a specification sidebar 531B positioned in the FIG. 5B illustrated embodiment to the right of the content display area 541B.

The illustrated embodiment of the main sidebar 521B includes a series of selection identifiers 517B. By the engagement of one or more of such buttons, an end user, for example, may enter one or more selections and thereby further configure the system. Such one or more selections permits an end user to better define the target and obtain one or more known information products more efficiently.

More specifically, the embodiment of the main sidebar 521B illustrated in FIG. 5B includes a "TrafficSignals Home" selection button 523B—that permits an end user to return to the screen 511B during the use of the end user interface 501. By such return, the end user may obtain the selections and information that the screen 511B provided before the end user engaged one or more buttons and new information or one or more screens were displayed. Advantageously, the interface 501 may include an engagement identifier 520 that, by its appearance adjacent to a selection identifier 517B, informs the end user that the identifier has been engaged. The embodiment of the screen 511B illustrated in FIG. 5B includes an engagement identifier 520 that is adjacent to and has an appearance that contrasts with the "TrafficSignals Home" selection button 523B to inform the end user that this button has been engaged. The engagement identifier 520 may be in a contrasting color and/or pattern. In certain embodiments of the present invention, the engagement identifier 520 will appear adjacent to each button that has been engaged. The embodiment of the main sidebar 521B illustrated in FIG. 5B includes other selection identifiers 517B.

The engagement of the "TrafficSignals Analysis Tool" selection button 524B displays one or more information product selection screens. Embodiments of other information product selection screens that may be displayed upon engagement of button 524B are shown in FIG. 5D and FIG. 5E and will be explained in greater detail below.

By the engagement of the "Detailed Traffic Trends" selection button 525B, a customization screen will be displayed. One embodiment of such a customization screen is shown in FIG. 5F and will be explained in greater detail below. The sidebar 521B may include additional features.

The embodiment of the main sidebar 521B illustrated in FIG. 5B includes an "Account Management" selection button 526. By the engagement of the "Account Management" button 526B, an account management screen is displayed to the end user. Through the use of such screen, an end user may determine the status of the end user's account and make specific financial and administrative choices regarding it and may select the target—that is, the specific one or more businesses for which the end user wishes to receive information such as when the end user logs into the graphical end user interface and otherwise proceeds through the use of other of the computer display screens. One embodiment of an account management screen is illustrated in FIG. 5G.

Embodiments of the end user interface 501 may permit an end user to obtain specific information regarding one or more certain targets by identifying them as "Favorites". The display produced from certain embodiments of the user interface 501 include a main sidebar 521B having a "Favorites" section 527B such as shown in FIG. 5B. Through such section 527B, an end user advantageously may receive one or more certain specific information products 529B selected by the end user and prepared through the analysis of content drawn from one or more bodies of information. In the illustrated embodiment, five information products 529B are provided in a vertical arrangement within the main sidebar 521B. Each of the illustrated embodiments of the information products 529B is a generally horizontally-aligned panel that identifies in a left portion the target for which information is provided through the information product with the use of a grouping of letters. It is well known that when a company issues securities to the public marketplace, it selects an available unique ticker symbol by which investors can place trade orders. Stocks listed and traded on U.S. exchanges have symbols with up to three letters (if traded on the NYSE) and up to four letters (if traded on the NAS-DAQ). The illustrated embodiment of the information product uses such unique ticker symbols not to represent a particular security listed on an exchange or that is otherwise traded publicly but the company that is publicly traded. To the right of the company identifier in the illustrated embodiment of the information product 529B is a numerical display providing some information specific for the identified company. The information may be data, such as the synthesized information developed from the content extracted from selected information or some other information. In the illustrated embodiment, the data is a numerical display showing the performance of the identified company for a selected period of time. To the right of the numerical display is an additional display. In the illustrated embodiment, the additional display is a symbol that provides a succinct summary of an analysis performed for the selected target. While a variety of symbols may be used to convey the selected information, the symbol shown in each of the embodiments of the information products illustrated in FIG. 5B is one of a set of graphemes. The illustrated set of graphemes is comprised of a caret, an inverted caret, and a circle. These graphemes may quickly inform the end user of the performance of the identified business. The caret grapheme may inform the end user that the identified business target has experienced an increase, the inverted caret grapheme may inform the end user that the business has experienced a decrease or a decline, and the group of circular shapes may inform the end user that the business has experienced little change in performance for the period of time selected by the end user. Other information may be used instead of or with use of each of the graphemes to convey such increase or positive, decrease or negative, or unchanged or not measurable performance such as color—for example, green, red, or yellow, respectively—or sound. Certain embodiments of the present invention include an operation display area 541B in which additional information may be provided to an end user during the operation of the system and in accordance with the selection or selections made by an end user. With the engagement by the end user of the "TrafficSignals Home" selection button 523B, the embodiment of the end user interface 501 shown in FIG. 5B includes a selection screen 511B 1B that provides in the operation display area 541B information products 543B regarding each of a number of preselected targets. With the engagement by the end user of a selection provided through the specification sidebar 531B—positioned to the right of the operation display area 541B—one or more other information products may be provided.

In the illustrated embodiment of the selection screen 511B, each of the information products 543B is organized as a "tile" shape within a grouping 545B of other "tile" shapes. Each illustrated tile within the tile grouping 545B provides a compact collection of synthesized information selected by the end user that advantageously can be readily distributed to and accessed by an end user even in a limited mobile environment. The embodiment of each of the tiles 543B illustrated, for example, in FIG. 5B and FIG. 5C includes a tile heading 551B having a company identifier 552B. In the illustrated embodiment, the company identifier 552B is the NYSE or NASDAQ ticker symbol that is appropriate for each of the target businesses: BBBY, BBY, BGFV, BIG, BJRI, BWLD, CAB, DG, and DLTR. More specifically with reference to one of the information products, the tile having the company identifier 552B "BIG" provides synthesized information regarding the retailer, Big Lots, Inc.

The tile heading 551B may include one or more forms of synthesized information. In the illustrated embodiment, the tile heading 551B includes two forms of synthesized information—a heading background 554B and a grapheme 554B—each providing specific synthesized information to the end user. The illustrated embodiment of the heading background 554B informs the end user of target performance through a color. A legend 561B advising the end user of the significance of the color of the heading background 553B may be provided as a component of the illustrated embodiment of the selection screen 511B.

Embodiments of each tile 543B may include other synthesized information in addition to the heading background 553B and the grapheme 554B. Each of the illustrated embodiments of the tiles 543B provides synthesized information organized in columns with time period headings 555B. In the illustrated embodiment, the synthesized information is "Year Over Year" ("YOY") parking lot traffic data 557B for an identified month 556B for the target as well as cumulative parking lot traffic data for the quarter 559B. The parameters by which the data shown in each tile is produced by use of the parameters established through the use of, for example, FIG. 2A and FIG. 3B. In the illustrated embodiment, a grapheme 558B is included with the YOY month data 557B and the quarter data 559B to efficiently inform the end user what the synthesized data reveals about the estimated performance of the target business for the month. Certain embodiments of the interface 501 permit an end user to obtain more information regarding an identified target by engaging (for example, "clicking on") the information product 543B directed to the target or by engaging the TrafficSignals Analysis Tool button 524B.

Through the use of certain preferred embodiments of the present invention, an end user may obtain one or more information products directed to an industry or industries or one or more sectors within the industry. The specification sidebar 531B—positioned to the right of the content display area 541B—provides another selection grouping that allows an end user to obtain one or more selected information products. The illustrated embodiment of the specification sidebar 531B provides a grouping of retail and restaurant sectors 535B. The specification sidebar 531B may include a title area 533B that may provide an end user with some information about the nature of the grouping 535B that is collected in the specification sidebar 531B. In the illustrated embodiment, the title area 533B informs the end user that the grouping 535B provides information product regarding a selection of businesses for which a subscription was obtained and that are identified by their "tickers".

Each of the illustrated members of the grouping 535B is a button by the engagement of which additional information may be provided within the content display area 541B. While the grouping 535B may display one sector button, the illustrated embodiment of the grouping displays a plurality of buttons for "Auto Parts" 537AP, "Beauty" 537B, "Big Box" 537BB, "Department Stores" 537D, "Discount Stores" 537DS, "Electronic Stores" 537ES, "Home Furnishing/Improvement" 537HI, "Office Supplies" 537OS, "Restaurants" 537R, and "Sporting Goods" 537SG. The grouping 535B may change depending on the target chosen by the end user. For example, if the end user chose as a target information regarding crops, and "CropSignals" information product chosen, the sector buttons may permit the selection, for example, of U.S. Winter Wheat, or U.S. Corn, or some other crop and/or some other country or region. If the target was information regarding industrial production, and "FactorySignals" information product chosen, the sector buttons may permit the selection of different industrial or manufacturing companies or manufacturing plants.

Certain other preferred embodiments of the present invention may permit the end user to efficiently obtain content drawn from information relevant to targets other than those in the retail industry. For example, an end user may obtain one or more information products directed to other sectors within a separate industry through the use of the input screen 511. For example, if the sidebar 521 includes a "CropSignals" target selection button and an end user engages it, the sector selection bar 521C will show various commodity sectors—such as Wheat, Corn, or another commodity. By the selection of one of those commodities, say Wheat—then all of the different types or areas of wheat may show up in the main content areas, such as "U.S. Winter Wheat", "South American Spring Wheat", "Kansas Winter Wheat", etc. The types of information that may be provided for each such crop may include year-over-year growth in healthy crop areas that may be shown as a percentage.

Figure 5C:
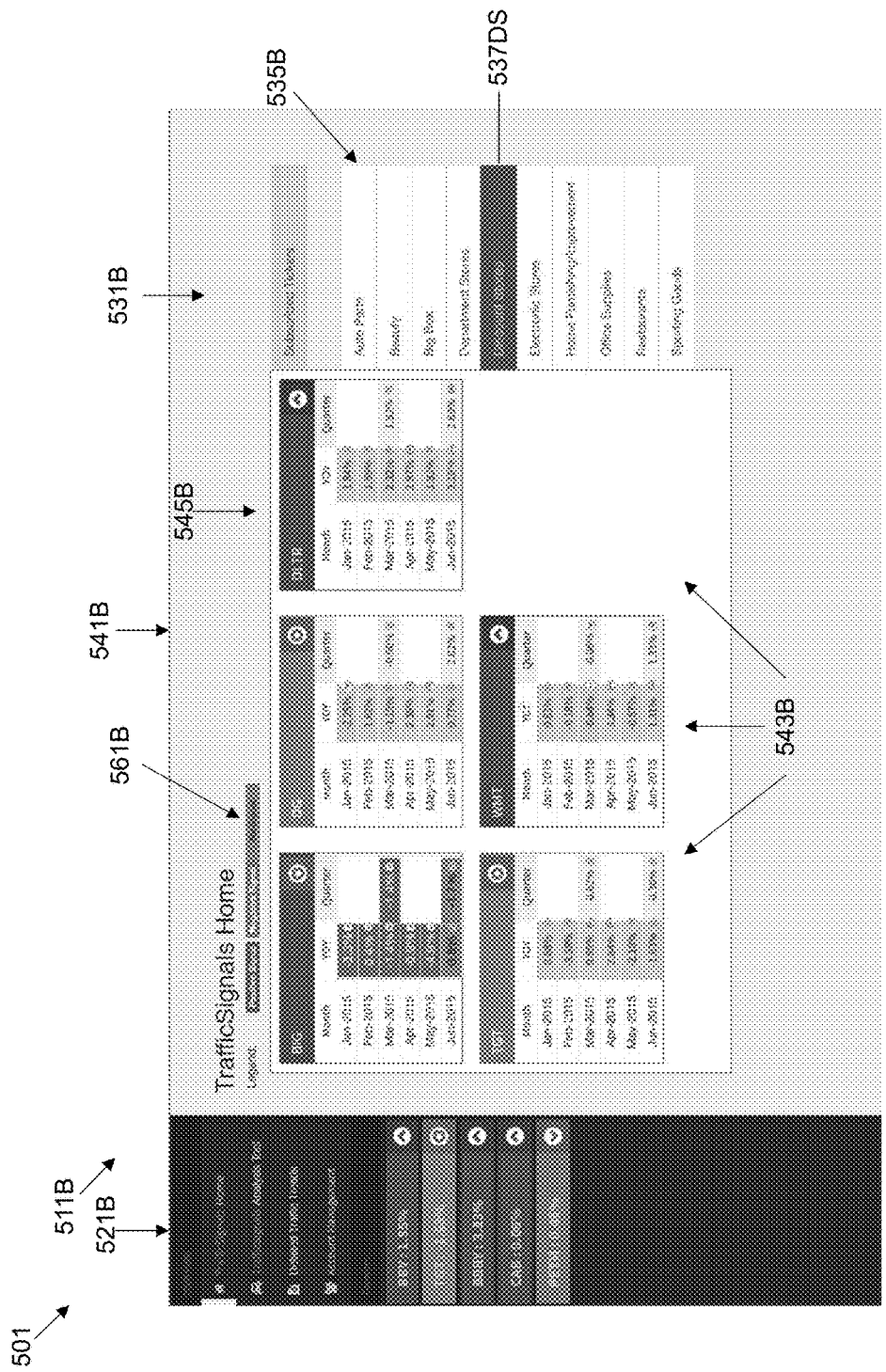
Figure 5D:
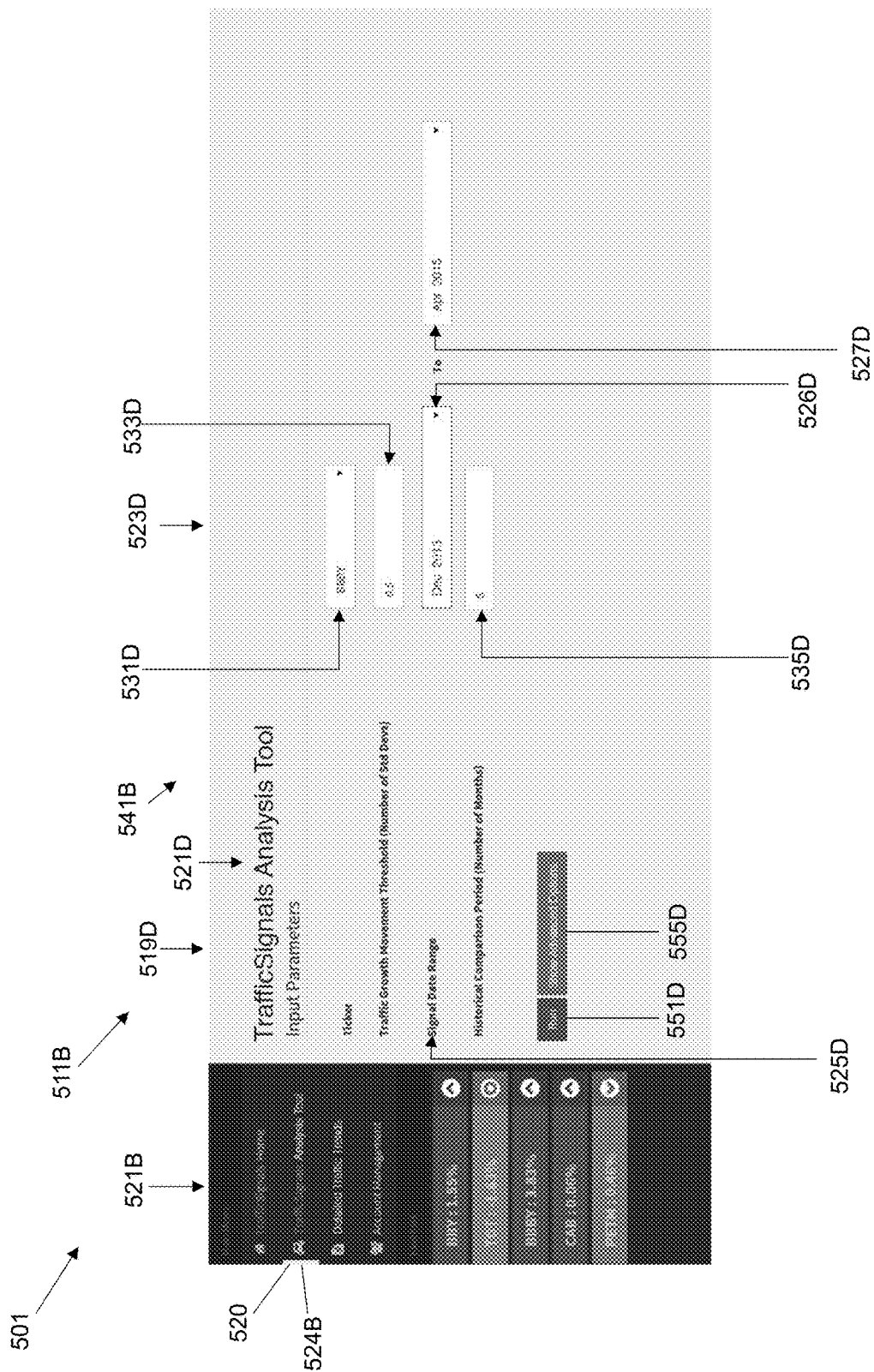
Figure 5E:
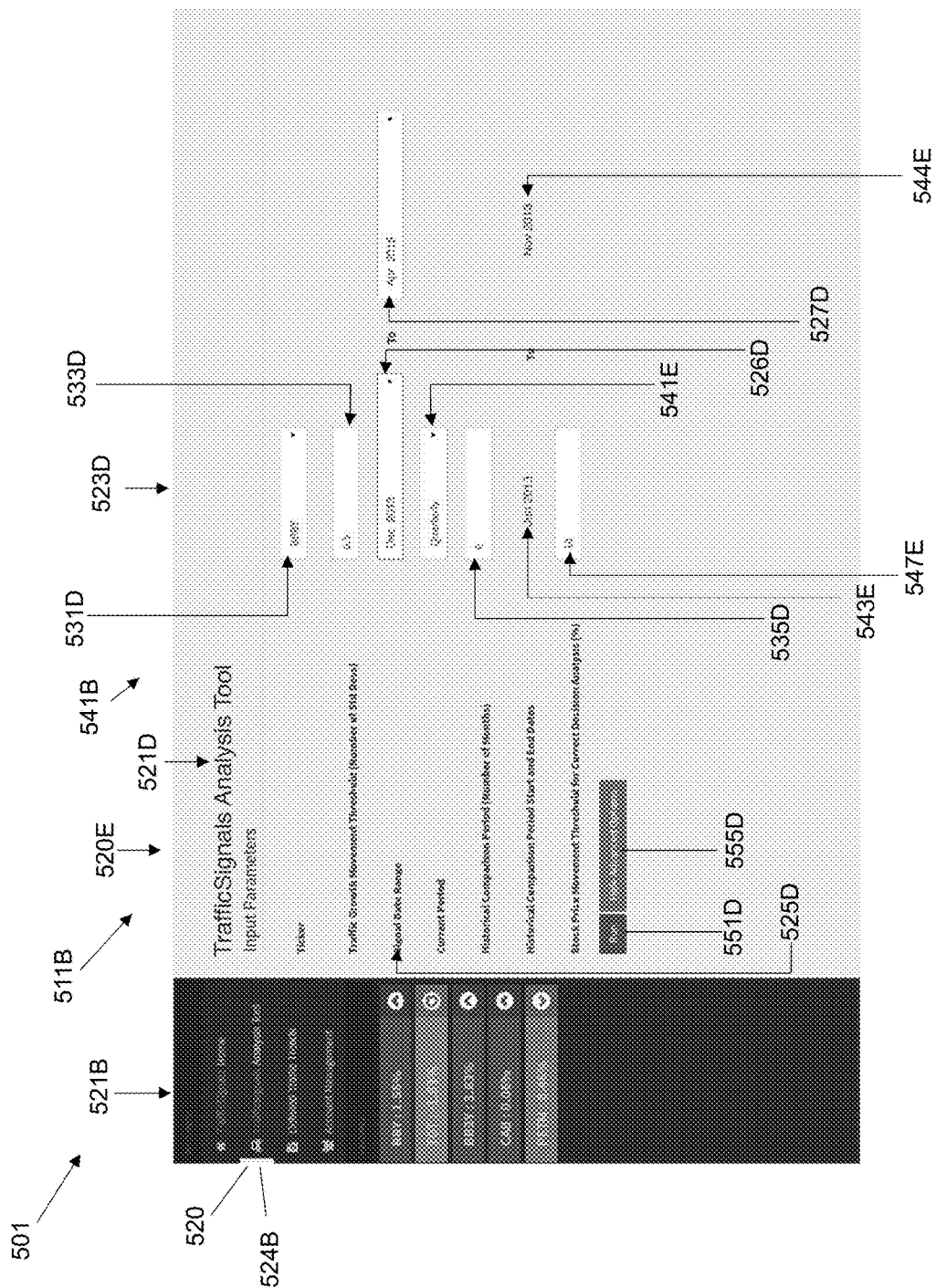
Figure 5F:
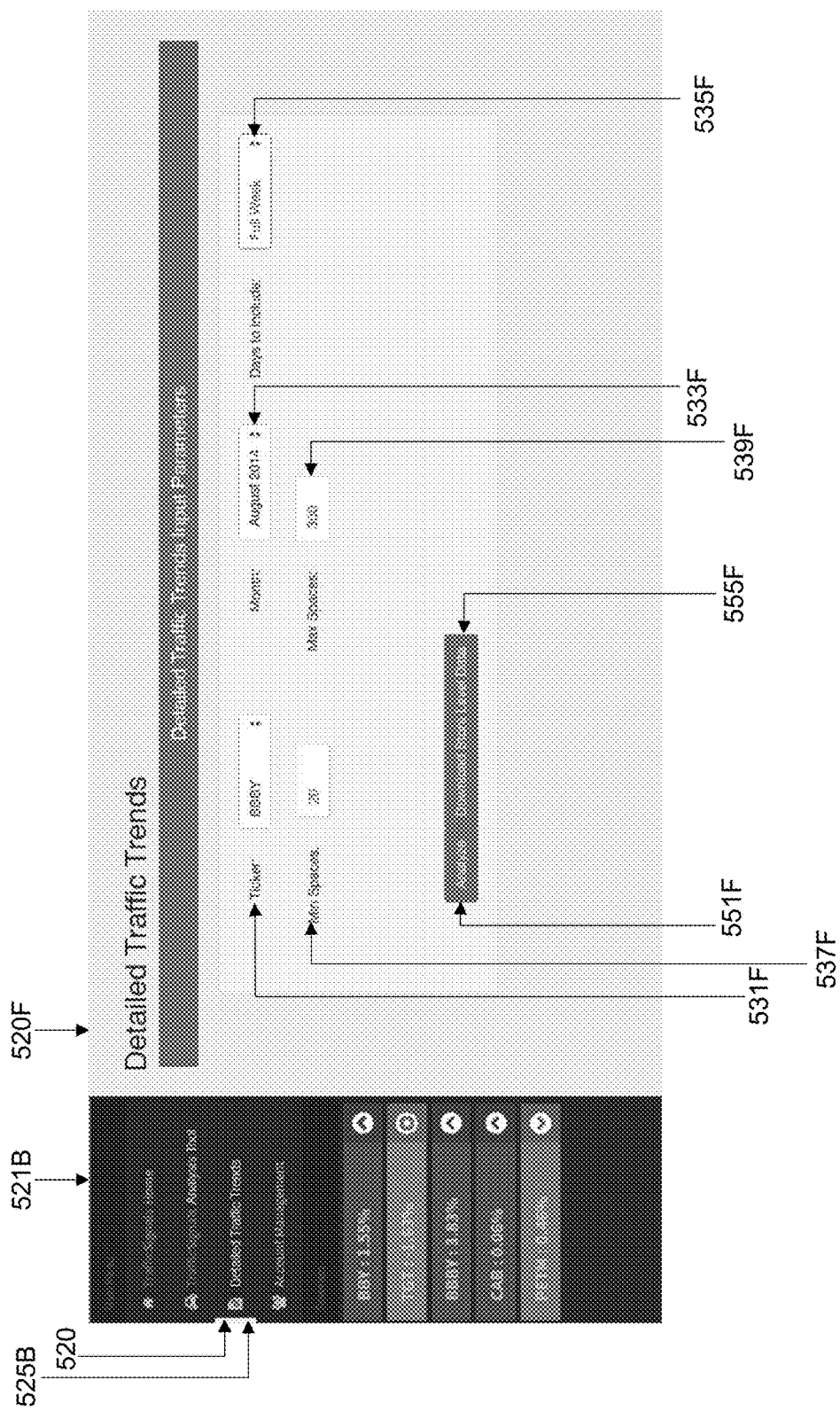
Figure 5G:
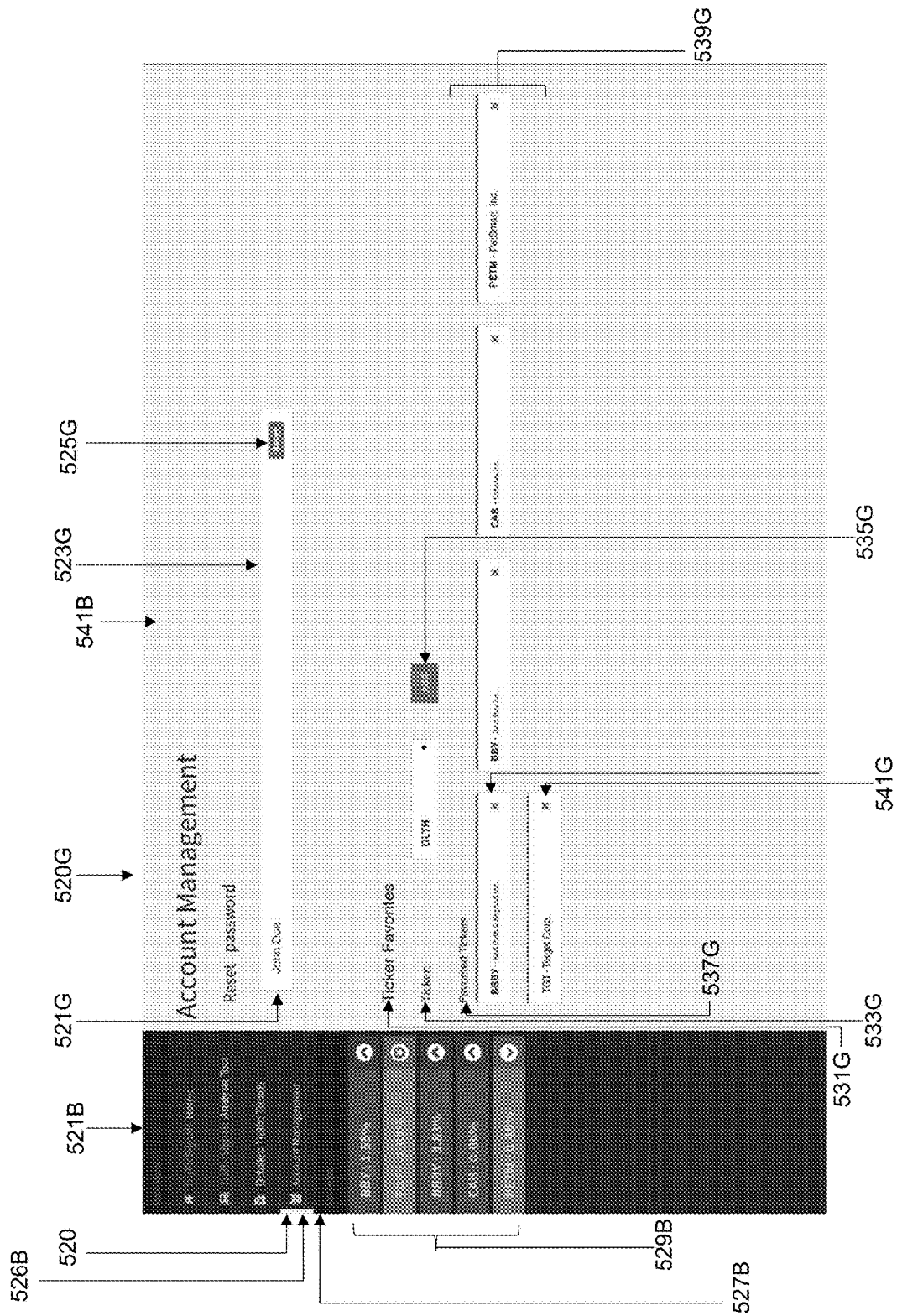
Figure 5H:
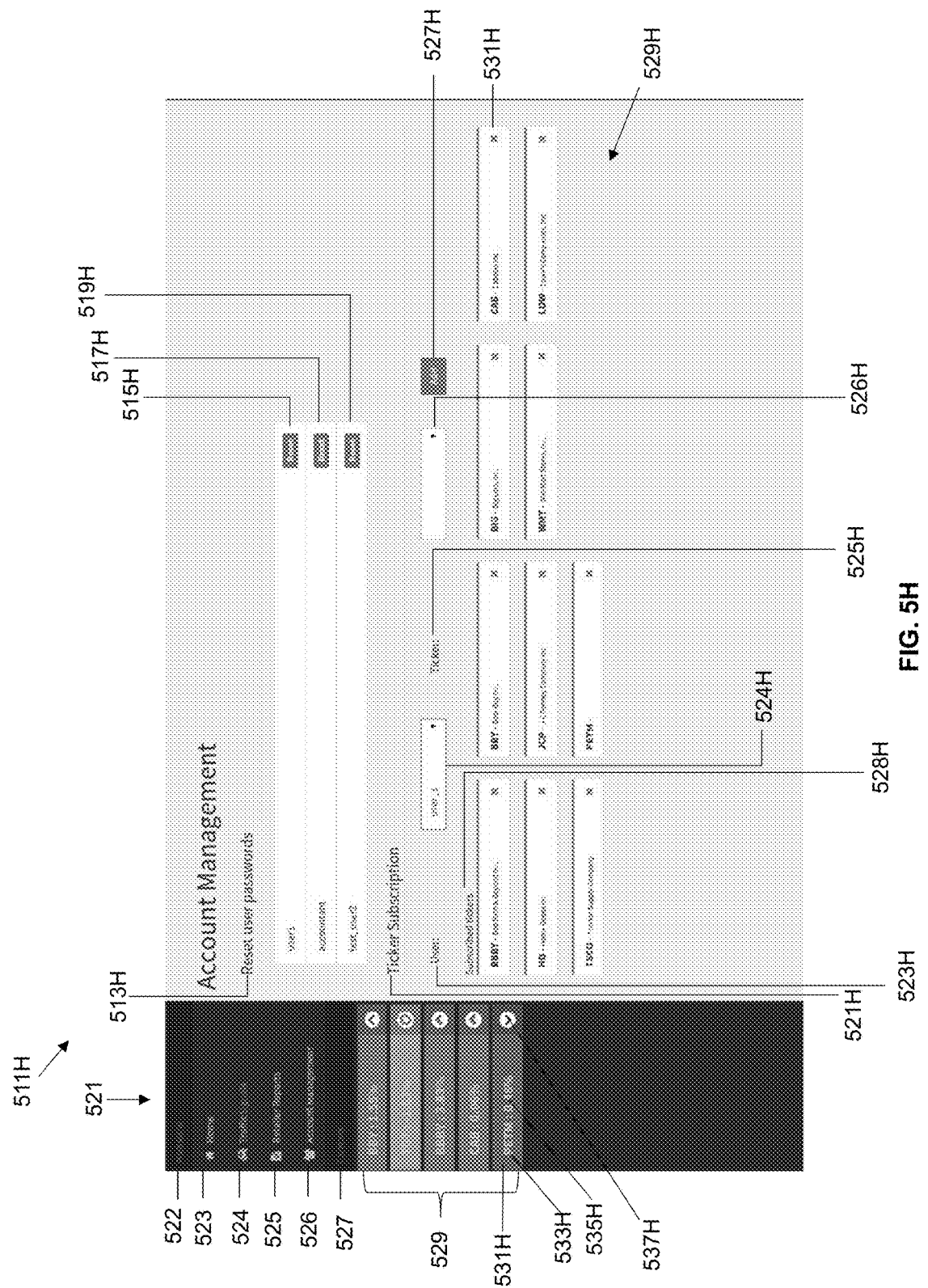

FIG. 5C shows (through the display of a contrasting region) that the end user has engaged the "Discount Stores" button 537DS of the grouping 535B. By the engagement of button 537DS, information product may be provided within the content display area 541B. The illustrated embodiment of the selection screen provides the information product as a grouping 545B of tiles, each tile 543B organized and providing the synthesized information described above with respect to FIG. 5B.

The illustrated embodiment of the main sidebar 521B may include one or more target selection buttons 524 that allow an end user to select broadly a certain target for which information is sought. More specifically, the embodiment of the sidebar 521 illustrated in FIG. 5B includes a target selection button 524—identified as "TrafficSignals". By the engagement of the "Traffic Signals" button, one or more information products may be provided to the end user that were developed from the content drawn from information showing the number of automobiles or other vehicles in one or more areas at one or more times. Other embodiments of the sidebar 521 may include, for example, a target selection button 524—identified as "CropSignals"—by the engagement of which one or more agricultural-related information products may be provided to the end user (not shown). Additional embodiments of the sidebar 521 may include one or more target selections buttons by the engagement of which the system acts according to certain pre-set configurations, for example, to draw content from information that may be stored in one or more information resources and to develop and provide to the end user one or more information products.

By the engagement of the TrafficSignals Analysis Tool button 524B of the certain embodiment of the selection screen 511B available through the illustrated embodiment of the end user interface 501, the content display area 541B may display an interactive screen by which an end user may configure the system, make one or more selections, and obtain information. The embodiment of the interactive screen 519D illustrated in FIG. 5D includes a title area 521D that confirms to the end user that the end user engaged the TrafficSignals Analysis Tool and that the screen accepts input parameters selected by the end user in order to define—through the input of one or more various parameters—the certain information that the end user is seeking to obtain such as from information resource 217 available through the embodiment of system 211 illustrated in FIG. 2. The interactive screen 519D may include one or more parameter input areas 523D by which an end user may designate the information product which the end user is seeking to obtain. In the illustrated embodiment of the interactive screen 519D, three parameter input areas 523D are provided in order that an end user may define such customized information product. The illustrated embodiment of the interactive screen 519D provides also a selection information area 525D that is a hybrid component in that the end user is not only informed of what information is available for analysis given the selections made by the end user through the use of the interactive screen 519D but, once the end user is provided with that availability information, permits the end user to select all or a subset of the identified information. Other embodiments may provide more or fewer input areas 523D and one or more additional hybrid areas. More specifically, the illustrated embodiment permits an end user to define an information product in which content concerning the level of traffic that has taken place for a specific more contemporary period of time is identified and compared with that historical traffic level information in order to determine whether and to what extent the traffic level has changed and by which, for example, the economic health of the specific target may be estimated. The content regarding the level of traffic may be drawn from satellite image information or other information and synthesized. The level of traffic may be the number of vehicles in a parking lot or other defined space associated with the identified target. The information product may be simplified such as a signal in order that it may be easily accessed even in a mobile environment.

In the FIG. 5D illustrated embodiment, the input area 523D includes a "Ticker" area 531D in which the end user may identify the business target for which the end user is seeking information. Ticker area 531D may be presented as a "drop-down" menu identifying one or more businesses such as through, for example, various arrangements of characters. In the illustrated embodiment, the end user has selected the ticker "BBBY" which configures the system to provide an information product—such as a report—for the company, Bed Bath and Beyond.

The illustrated embodiment of the interactive screen 519D includes an additional parameter input area 523D by which an end user may define a customized information product—the Traffic Growth Movement Threshold 533D. The illustrated embodiment of the Traffic Growth Movement Threshold input area 532D allows the end user to select the number of standard deviations above or below the average traffic growth from the previous period of time defined by an end user. To permit an end user to more easily define such a previous period of time, the interactive screen 519D may include a Historical Comparison Period input area 535D. The illustrated embodiment of the Threshold input area 533D permits an end user to enter the number of standard deviations by which the analysis is to be conducted. The system may permit the end user to enter a whole number or a fraction or, absent such selection, may utilize a default of 0.5. In the illustrated interface, a standard deviation of 0.5 is shown. As a result of this choice, if the cumulative quarterly traffic growth for the current month is 0.5 standard deviations above or below the average traffic growth as determined from an analysis of the prior 6 months (as selected through the use of the Historical Comparison Period input area 535D), the illustrated embodiment of the system will generate a positive or negative signal, respectively. If the standard deviations are not above or below the 0.5 threshold, no signal will be generated.

The illustrated embodiment of the interactive screen 519D shown in FIG. 5D includes a Signal Date Range information area 525D that may inform the end user of the earliest date 526D and the latest date 527D for which the information resource has information for the target selected above—"BBBY"—through the use of the Ticker area 531D and that thereby may be analyzed in order to generate a customized information product. The Signal Date Range information area 525D, may provide the information in a variety of forms including as through the illustrated embodiment of abbreviated month and year designations, "December 2013", "April 2015". In the illustrated embodiment, the end user is informed that the information resource has information for the identified business "BBBY" for the period of time running from December 2013 through April 2015.

Certain embodiments of the present invention may permit the Signal Date information area 525D to provide information that is complementary to the selection made through the use of the Historical Comparison Period input area 535D. For example, embodiments of the Historical Comparison Period input area 535D may permit an end user to select the earliest information that is available through the entry of a period of time in area 535D and the Signal Date information area 525D may inform the end user the period of time after the selected earliest period of time for which information is available. To further illustrate, if a period of 6 months is selected by the end user through entry of a "6" in the Historical Comparison Period input area 535D, the Signal Date information area 525D may inform the end user the period of time after that 6 month period of time for which additional information is available. Once the information is provided to the end user through the information area 525D, the end user may change the dates shown in information areas 526D, 527D in order to define the contemporary information that is compared to the historical information defined through the selection made through the use of area 535D. In certain embodiments, the comparison period may be a minimum of one month and a maximum that may be limited only by the amount of historical data in the system.

The Historical Comparison Period input area 535D of the illustrated embodiment of the interface allows an end user to define the range of historical information (by the number of months) that is collected and analyzed and compared with the contemporary information defined through the use of the Signal Date Range information area 525D in order to define the information product. The input area 535D permits an end user to define the number of months or may include a default setting—for example, 6 months—that would be shown absent the entry of a selection by the end user. For many targets, a 6 month period of time provides a sufficiently balanced body of information for comparison purposes. The illustrated embodiment shows that 6 months has been chosen.

The interactive screen 519D permits an end user to select a target business and obtain all the information that the system has complied for that business by engaging the "RUN" button 551D. If the end user wishes to obtain a more specific information product, the end user may engage the "Show Advanced Options" button 555D.

By clicking the Advanced Options button 555D, an Advanced Options interactive screen 520E such as the embodiment shown in FIG. 5E is displayed that may provide certain additional selection and information features that are additional to those provided by screen 519D by which the end user may further configure the system. These Advanced Options allow the end user to further customize their reports and the information products they are receiving from the system. One additional selection feature of the Advanced Options interactive screen 520E is the "Current Period" input area 541E—in which, through a drop down menu, the end user may designate the amount of time included in calculations for which the information product is provided as either daily, weekly, monthly, quarterly, or annually. Embodiments of the system may calculate the cumulative growth in traffic for a single month when monthly is chosen and for the first month in a quarter, the first and second months of a quarter combined, and all three months of a quarter combined when quarterly is chosen for purposes of determining whether to generate a signal. The embodiment illustrated in FIG. 5E shows that "Quarterly" has been chosen.

An additional feature that may be provided through the Advanced Options interactive screen 520E is a Historical Comparison Period Start and End Dates information component 543E, 544E by which the end user may be informed what is the historical period start date and the historical period end date given the entry selected for the Historical Comparison Period input area 535D and the entry selected for the Signal Date Range information area 525D. The dates 543E, 544E may be displayed automatically when the selections are made through areas 535D, 525D. Given that in the illustrated embodiment, 6 months has been entered in area 535D, and the areas 526D, 527D inform the end user that comparison information has been selected for the period of time, December 2013 to April 2015, the Historical Comparison Period Start and End Dates are accordingly June 2013 and November 2013, respectively.

An added feature that may be provided through the Advanced Options interactive screen 520E is the Stock Price Movement Threshold for Correct Decision Analysis (%) input area 547E. Through a selection entered in this area, the end user may define a percentage by which the stock price for the target designated in 531D must change in order to define the accuracy of a signal. The illustrated embodiment of the input area 547E has been set at 10%.

Once the end user has entered the additional selections, and therefore defined the information product that the end user is seeking through the interactive screen 520E, the end user may have the specified analysis conducted by engaging the "RUN" button 551D. However, if, at any point after receiving the Advanced Options screen 520E, the end user wishes to return the previous screen 519D the end user may engage the Hide Advanced Options selection button and screen 519D will replace screen 520E.

FIG. 5F shows one embodiment of a customization screen 520F that may be displayed to an end user by the engagement of the "Detailed Traffic Trends" selection identifier 525B of the main sidebar 521B. By the engagement of the identifier 525B, the end user is provided with one or more additional selections that permit the end user to further configure the system to more specifically define the target and customize the information product provided to the end user. Such selections may permit an end user to define the estimated size of a specific target, relevant demographics, and time periods for which the synthesized information was captured.

More specifically, FIG. 5F illustrates a simplified embodiment of such a customization screen 520F. FIG. 5F illustrates one of the preferred embodiments of the present invention and more specifically a computer generated graphical user interface display through the use of which an end user may interact with and configure the system in order to define the target for which the end user is seeking certain information and some of the information products that may be provided through the computer display. The illustrated embodiment of the customization screen 520F of the user interface includes a retailer input component 531F—identified in FIG. 5F as "Ticker"—by which an end user may define the specific business target of the search and therefore the subject of the analysis and the company information product that may be provided as a result of the search and analysis. While a variety of components may be used by which the end user may input the target selection, the illustrated embodiment of the input component 531F permits the end user to make the selection of the business through the use of a "drop-down" menu of arrangement of characters.

The embodiment of the customization screen 520F illustrated in FIG. 5F includes also a time period identification component 533F by which the end user may specify the time period during which the information was captured for purposes of producing the synthesized information. The illustrated embodiment of the identification component 533F includes a time drop down menu by the use of which the end user may define the month and year for which the synthesized information is sought. To further specify the information, the illustrated embodiment of the customization screen 520F includes a day's identification component 535F—identified as "Days to include"—in which a user through the use of a drop down menu may define the length of time during which the information was captured to produce the synthesized information. The drop down menu may, for example, permit an end user to select "Weekdays Only", "Weekends Only", or, as illustrated, "Full Week". The term "Full Week" may refer to all days within the given month and may show all the available data for the month. In contrast, the term "Weekdays Only", may provide an end user with the synthesized information developed from information captured for all the Mondays, Tuesdays, Wednesdays, Thursdays, and Fridays within the month identified through the selection made through the use of component 533F. The selection of the term "Weekends Only" may provide an end user with only the synthesized information developed from information captured for all Saturdays and Sundays in the selected month.

The embodiment of the "Detailed Traffic Trends" customization screen illustrated in FIG. 5F provides selection components 537F, 539F by which the end user may obtain information for a target of a specific estimated size. The illustrated embodiment includes a "Min Spaces" identification component 537F by which an end user may define a minimum number of parking spaces that may be associated with a specific business target and a "Max Spaces" identification component 539F by which the end user may define a maximum number of parking spaces that may be associated with a specific business target. Through the use of such selection elements, an end user may obtain synthesized information for all stores of the identified business that provide such parking accommodations to customers. Such information may be important to an end user because the size and spaces available in a parking lot are considered to be a proxy for the size or the format of the store associated with the parking lot. For example, stores known as "SuperTarget" are typically larger versions and often have parking lot sizes that are greater than the parking lots of regular Targets. If an end user wished to estimate and compare, for example, the difference in performance between "SuperTarget" stores and "Target" stores, the end user may set the "Max Spaces" component 539F to 300 spaces and permit the system to conduct the analysis and provide the desired information product. This may provide results primarily for Target stores. However, if the end user wished to obtain an information product for "SuperTarget" stores, the end user may set the Min Spaces component 537F to 300 spaces and not designate any value in the Max Spaces component 539F. Because of the size of the parking lots that are designated, content will be drawn from the information resource only for stores having such large parking lots associated with them and an information product may be provided primarily for "SuperTarget" stores.

Figure 7A:
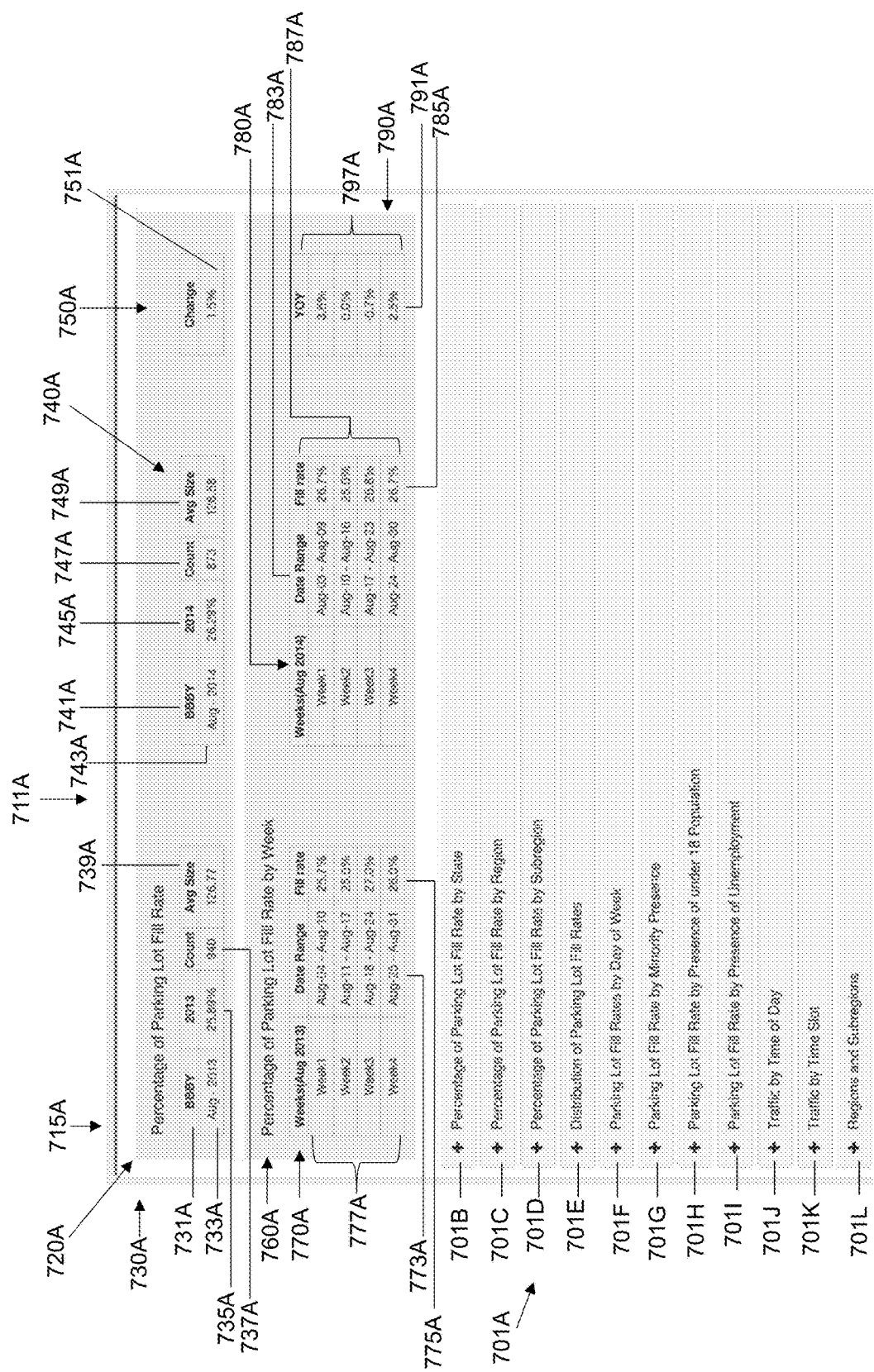

The embodiment of the customization screen 520F illustrated in FIG. 5F permits the end user who completes the selection process to engage the "Analyze" component 551F. By such engagement, the end user may have the system seek synthesized information that corresponds to the selections that were entered through the use of the customization screen 520F. One example of the information product that may be provided to the end user through the engagement of the "Analyze" component 551F is illustrated in FIG. 7A and will be discussed below.

The customization screen 520F may include one or more components by which the end user may obtain additional synthesized information. The embodiment of the screen 520 F illustrated in FIG. 5F permits an end user with the option of downloading the same information that may be shown in a specific report by engaging the "Download Store Level Data" component 555F. By such engagement, the end user may obtain the synthesized information such as in a .csv or .xls format.

FIG. 5G illustrates one embodiment of a screen 520G that may be displayed to an end user by engagement of the Account Management selection identifier 526B in main sidebar 521B. The screen 520G permits an end user to manage those who may access to and have use of the system and the information products generated by it. The illustrated embodiment of account management screen 520G includes a password reset selection component 521G. An end user may be provided with a password prior to first using the system and may reset it through component 521G. The embodiment of the reset selection component 521G shown in FIG. 5G includes a password identification component 523G—that shows the name of the end user that is currently logged into the system. By engaging a password reset button 525G, an email may be sent to the end user with a link that allows the end user to change the end user's password.

The FIG. 5G illustrated embodiment of the account management screen 520G includes also a "Ticker Favorites" component 531G by which an end user may identify and manage the certain business or businesses selected by the end user as a "Favorite". The business or businesses selected through this feature may be shown in the "Favorites" section 527B of the main sidebar 521B, such as shown in FIG. 5B. Through such a section 527B, an end user advantageously may receive one or more certain specific information products 529B selected by the end user and prepared through the analysis of content drawn from one or more bodies of information. In the illustrated embodiment, five information products 529B are provided in a vertical arrangement within the main sidebar 521B. The embodiment of the Account Management screen 520G illustrated in FIG. 5G includes a Favorites addition component 531G that permits an end user to enter a new business identification component 533G. By engaging the "Add" button 535G, the business identified through its Ticker designation is added to the Favorites list 539G—identified with the title "Favorited Tickers" designation 537G—presented in the operation content display area 541B—and to the Favorites list 529B in the main sidebar 521B. If an end user wishes to remove one or more of the identified Favorites, the end user may engage the "X" removal button 541G provided with each of the Favorites.

FIG. 6A through FIG. 6G illustrate various additional embodiments of the information products that may be developed through the use of embodiments of the system.

Figure 6A:
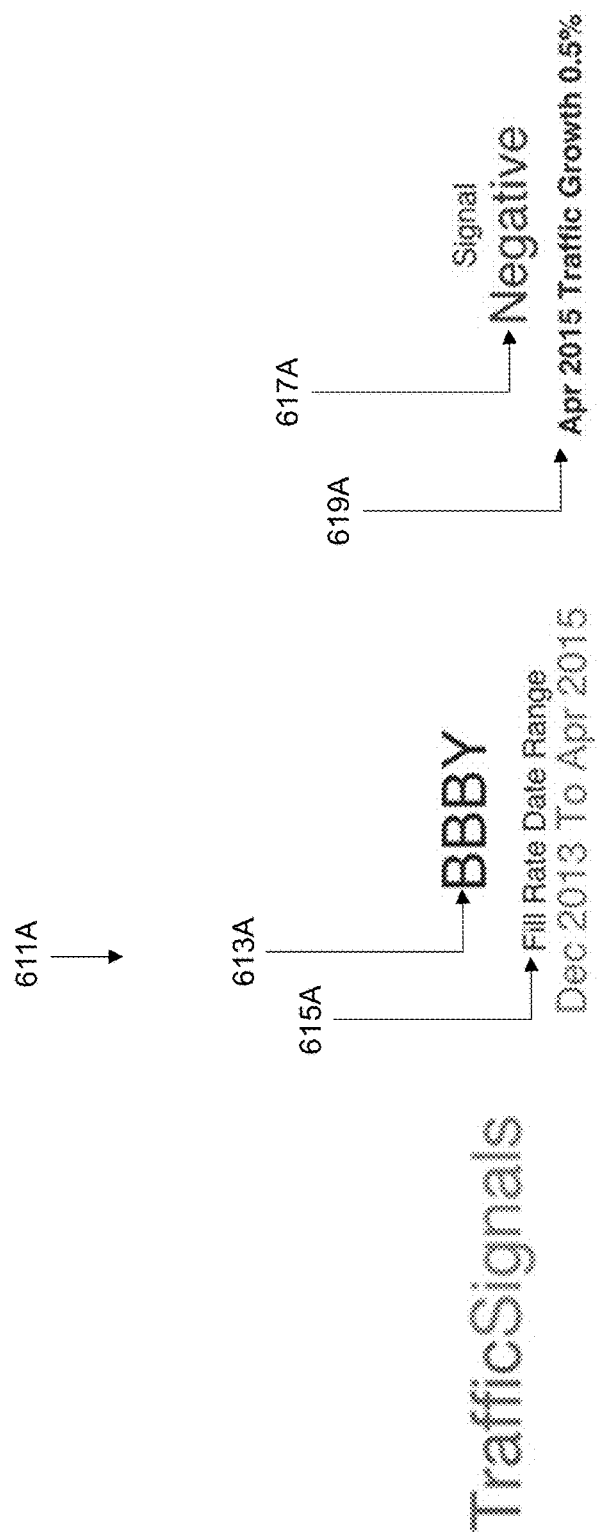
FIG. 6A through 6G each illustrate a representation of an information product prepared through the use of a preferred embodiment of the present invention.

FIG. 6A illustrates an embodiment of a simplified TrafficSignals information product 611A that may be provided to an end user when the "Run" button shown in FIG. 5D and FIG. 5E is engaged. This information product 611A provides a target confirmation component 613A that confirms that the end user sought information regarding a certain business—in the FIG. 6A illustrated embodiment, "Bed Bath and Beyond" identified through the ticker symbol "BBBY"—and synthesized information confirmation component 615A regarding that business—"Fill Rate Date Range"—selected by the end user through the use of the "Signal Date Range" component 525D shown in input screens 519D, 520E illustrated in FIG. 5D and FIG. 5E. More specifically, the "Fill Rate Date Range" in this embodiment will correspond to the information entered through the use of the "Signal Date Range" component 525D of the FIG. 5D and FIG. 5E illustrated embodiments, that is, "December 2013" To "April 2015". The embodiment of the information product illustrated in FIG. 6A includes also a signal information section 617A that provides a summary to the end user of the performance measured for this identified business for the stated month ("April 2015"). In the illustrated embodiment, the summary includes a "Negative" signal component. As shown with respect to the TrafficSignals Home screen shown in FIG. 5B through and FIG. 5G, the signals may be a "Positive Signal", "Negative Signal", or "No Signal" component. The illustrated embodiment of the information product 611A provides additional traffic data 619A for the current month ("April 2015"), specifically, current traffic growth ("0.5%") for the month.

Figure 6B:
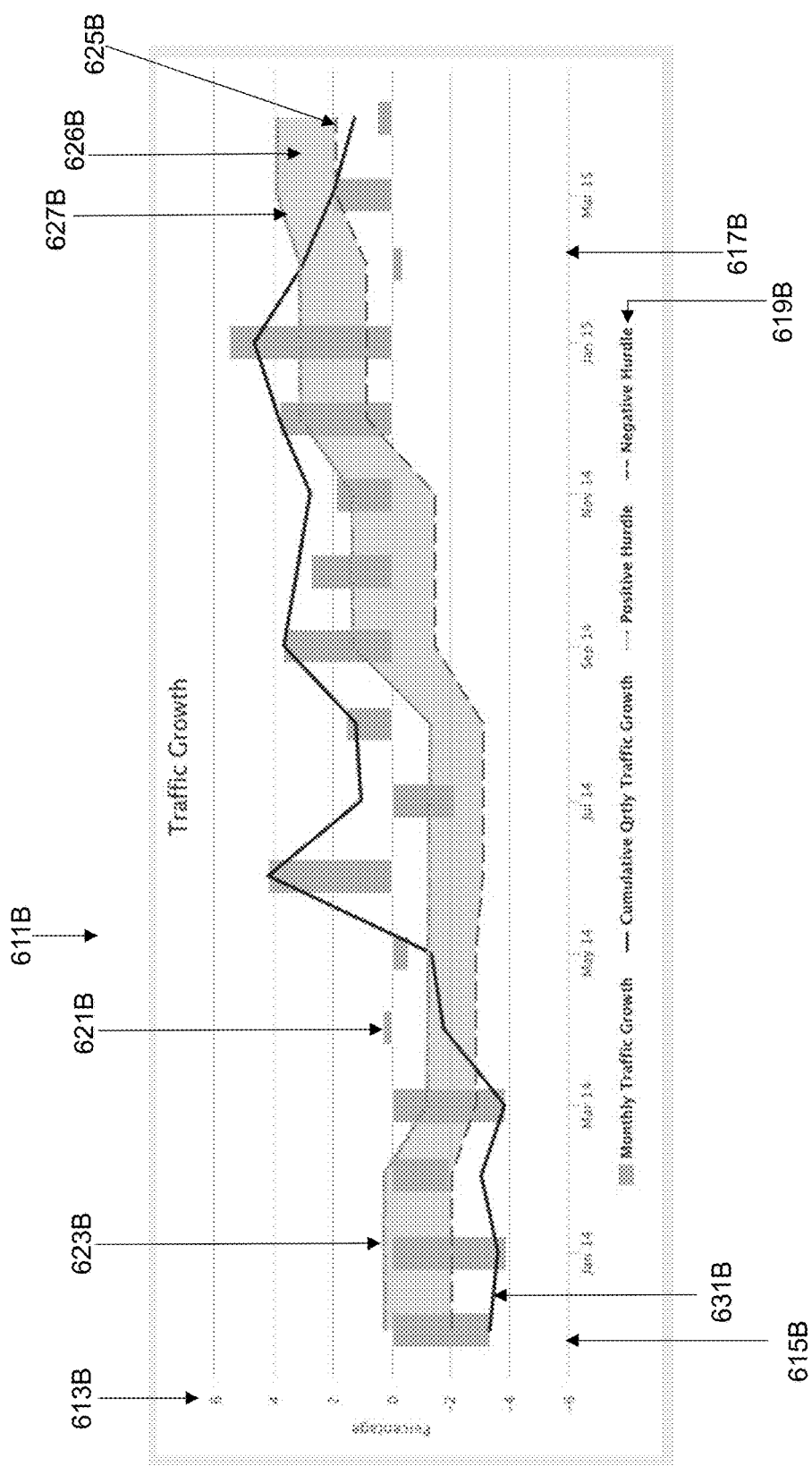

FIG. 6B illustrates another type of information product that may be developed from synthesized information prepared from content through the use of certain embodiments of the present invention. The illustrated Traffic Growth computer generated display 611B shows the change in the Traffic Growth—that is, whether it has experienced an increase or a decrease in the number of vehicles parking in its parking lots—for a target over time. The display 611B includes a y-axis 613B—that represents the year-over-year traffic growth percentage—, a x-axis 615B demarcated by monthly periods of time 617B—that represents the months chosen in the signal history date range through the use of the components 526D, 527D provided in the interactive displays illustrated in FIG. 5D and FIG. 5E, and a display legend 619B. The information product 611B may also include one or more displays of synthesized information developed by the system for the target identified through the use of the TrafficSignals Analysis Tool interactive screen 519D or interactive screen 520E. In the FIG. 5D and FIG. 5E illustrated embodiments, the end user selected the ticker "BBBY" which configures the system to provide an information product for the company, Bed Bath and Beyond. The embodiment of the information product 611B illustrated in FIG. 6B includes a monthly year-over-year traffic growth display features 621B for the identified target shown.

Additionally, the information product 611B illustrated in FIG. 6B displays the positive standard deviation hurdle—determined from the monthly variation within the historical comparison period—by a dotted gray line 623B. In the illustrated example, 6 months prior to the first month shown in the display 611B was selected through the use of component 535D in FIG. 5D and FIG. 5E. In this example, the historical comparison period would be June 2013 to November 2013 (that is, 6 months prior to the first month, December 3013 selected through the use of component 526D. This historical comparison period may change with time—such as with each new quarter, as more recent months are included. To illustrate, in March 2014, the new historical comparison period would be September 2013 to February 2014. When the comparison period changes, so may the positive and negative standard deviation hurdles because they may be calculated based on the variation in monthly traffic growth within the comparison period.

The illustrated embodiment of the information product 611B represents the synthesized information developed through the use of the system to show negative standard deviation hurdles from the previous 6 months through the display of the dashed gray hurdle line 625B. The displayed line 625B may be located below the positive line on the bottom edge of the gray channel 629B that is formed between line 625B and line 627B. The information product 611B shows through the use of the gray channel 629B the extent to which the cumulative quarterly traffic growth must exceed either the upper or lower boundaries of the channel in order to generate a positive or a negative signal.

The information product 611B also shows the synthesized information developed through the use of the system to represent the cumulative quarterly traffic growth—generated from the monthly traffic growth numbers—through the black line 631 in the embodiment illustrated in FIG. 6B. In the first month of a quarter, the traffic growth for the first month and the cumulative quarterly traffic growth are the same. In the second month of a quarter, the cumulative quarterly traffic growth is the average of the traffic growth for the first and second months. In the third month of a quarter, the cumulative quarterly traffic growth is the average of all three months in the quarter. Positive or negative signals are determined each month by comparing the cumulative quarterly traffic growth with a selected number of standard deviations of the variability in monthly traffic growth for the historical comparison period (as defined through the use of component 535D in FIG. 5D or component 543E and 544E in FIG. 5E), which for example could be 6 months before the current quarter. If the cumulative quarterly traffic growth line 631B moves out of the "channel" and above the positive standard deviation hurdle or below the negative standard deviation hurdle, a positive or negative signal is generated. If the black line component 631B stays within the channel 629B and does not move above or below either hurdle, no signal is generated.

Figure 6C:
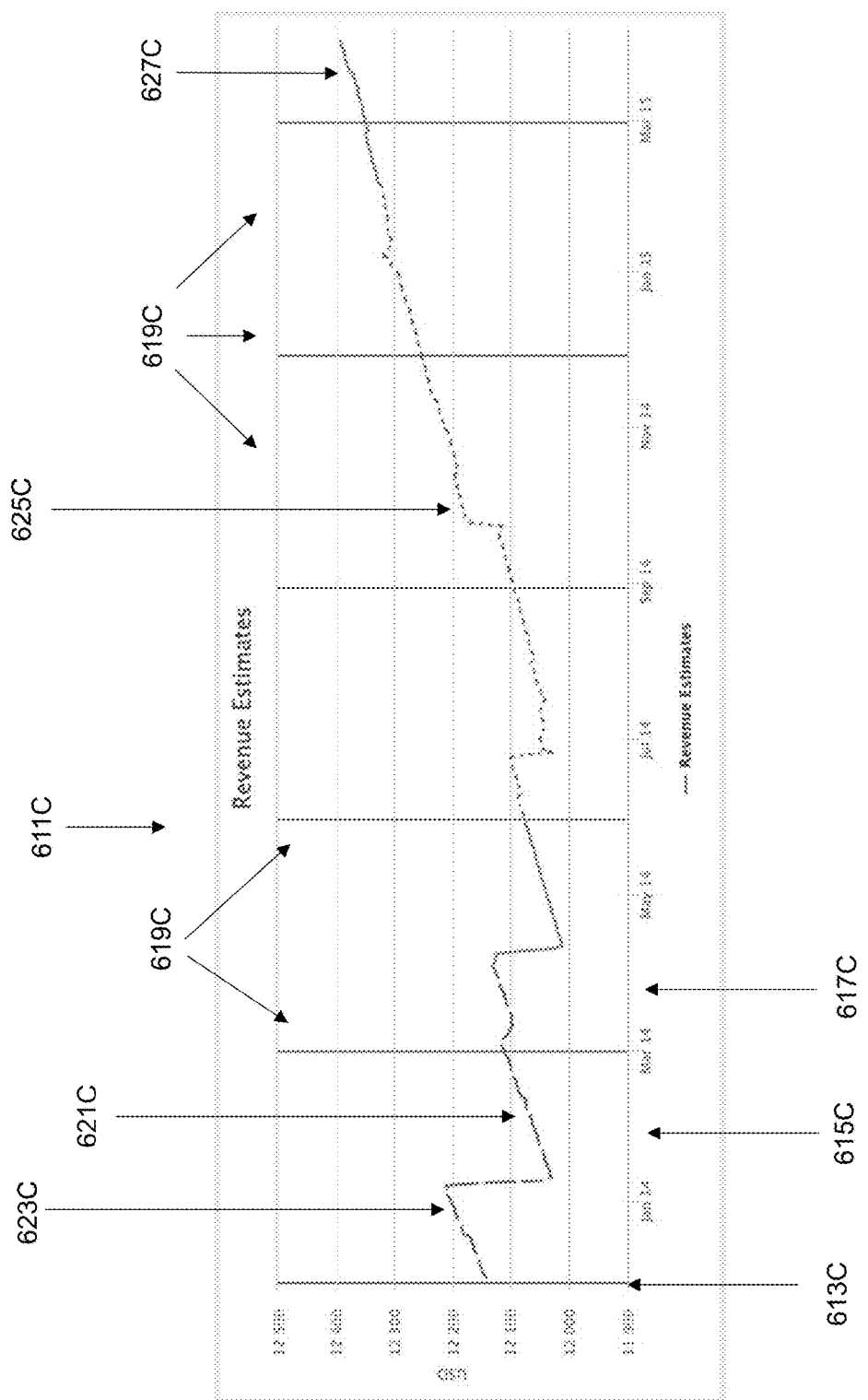

The system according to the present invention may be used to compare synthesized information developed through content drawn from one source—such as satellite or other aerial imagery—and content developed from another source. FIG. 6C provides an additional example of an information product 611C that may be generated through the use of synthesized information developed through an embodiment of the system. The information product 611C illustrated in FIG. 6C compares the certain traffic flow synthesized information—for example, that which may be developed from content drawn from satellite or other images—with synthesized information developed from separate estimates of revenue generated for a specified target.

More specifically, the embodiment of the information product 611C shown in FIG. 6C includes a y-axis 613C—demarcated in Billions of U.S. Dollars—; a x-axis 615C—demarcated in the months chosen through the use of the signal history date range inputs provided in interactive screens 519D, 520E shown in FIG. 5D and FIG. 5E—; and a series of vertical lines 619C—that illustrate the fiscal quarter end dates for the target. The target for which the synthesized information was drawn, for example, from satellite images and for which the revenue estimates were generated and are compared to produce the illustrated embodiment of the information product 611C was identified through the use of one or both of the interactive screens shown in FIG. 5D and FIG. 5E. The information product 611C advantageously may provide this comparison of TrafficSignals synthesized information with revenue estimate synthesized information through a simplified information product display component 621C. The illustrated embodiment of the simplified information product display component 621C is a line. The character of the line 621C may change depending on the synthesized information that is formed from the combination of the revenue estimates generated for a target and whether has been, for example, an increase or a decrease in the number of vehicles that are parked in the parking lots of the stories of the target retailer. The revenue estimates may be the equity analyst revenue consensus estimates for the target. This may be private information or may be public information sourced, for example, from Bloomberg. Such estimates may be the consensus/average of rolling 12-month or quarterly period revenue estimates obtained through the assistance of equity research analysts. If the parking lot information produces a negative signal for the same period of time as the revenue estimate, the line may be shown with a dash line display component 623C. If the parking lot information produces a positive signal, then the line may be shown through a dot line display component 625C. The line may be a solid line display component 627C when the parking lot information produces no signal. The illustrated embodiment of the information product 611C informs end users whether or not the signals generated by this system were useful or predictive of changes in revenue consensus estimates for the company or target being shown.

Figure 6D:
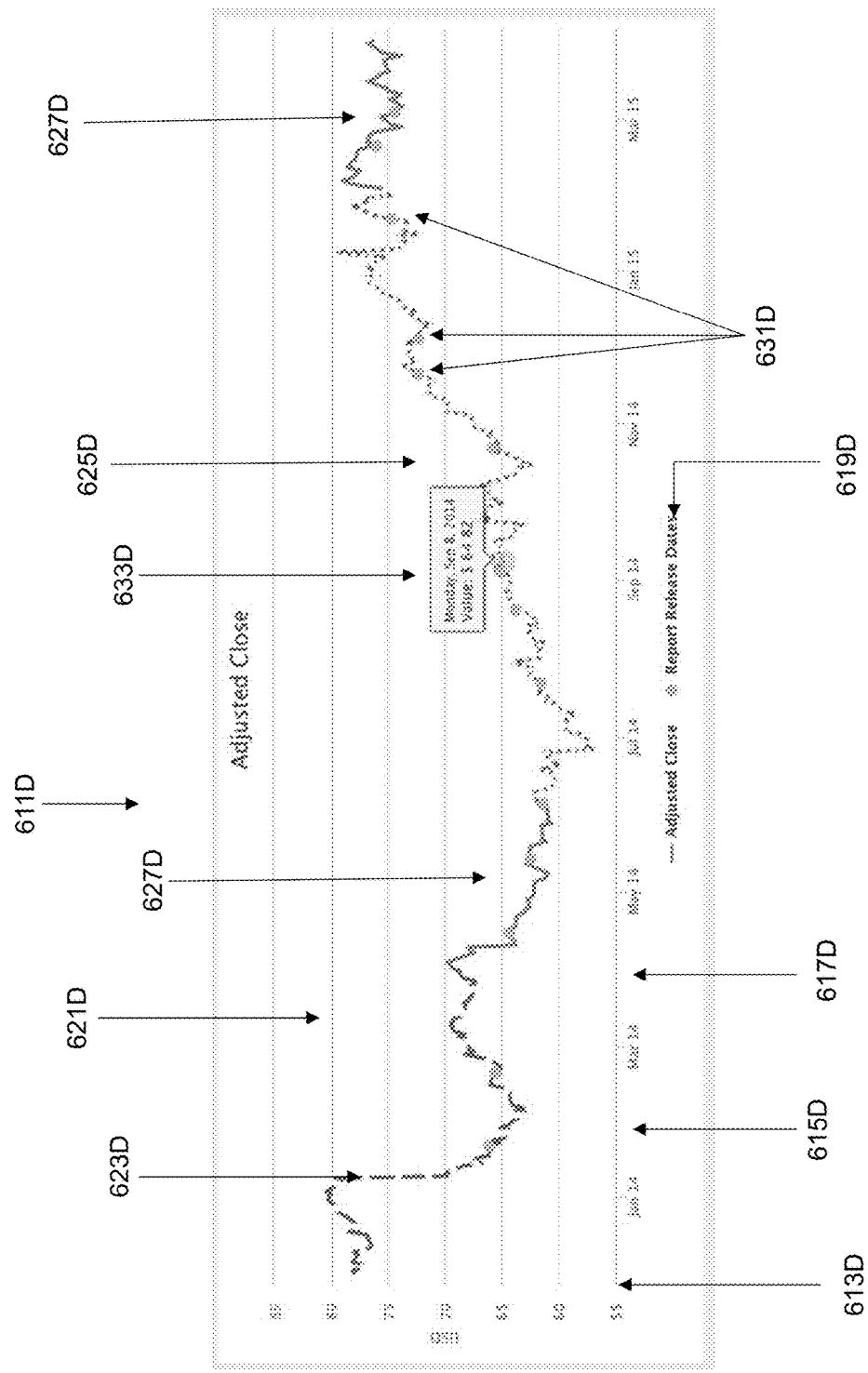

FIG. 6D illustrates the use of the system according to the present invention to compare synthesized information developed through content drawn from one source—such as satellite or other aerial imagery—and content developed from another source. The information product 611D illustrated in FIG. 6D compares the traffic flow synthesized information—for example, that which may be developed by drawing content drawn from satellite or other images—with synthesized information developed from the adjusted close price of the common stock of the identified target over time.

The information product 611D advantageously provides the comparison of TrafficSignals synthesized information with adjusted close stock price through a simplified information product display component 621D. The illustrated embodiment of the simplified information product display component 621D is a line. The character of the line 621D may change depending on the synthesized information that is formed from the combination of the adjusted close stock price obtained for a target and whether there has been, for example, an increase or a decrease in the number of vehicles that are parked in the parking lots of the stories of the target retailer.

More specifically, the embodiment of the information product 611D shown in FIG. 6D includes a y-axis 613D—demarcated in U.S. Dollars—, a x-axis 615D—demarcated in the months chosen through the use of in the signal history date range inputs provided in interactive screens 519D, 520E shown in FIG. 5D and FIG. 5E—, and a legend 619D. The target for which the synthesized information is provided may be identified through the use of the "Ticker" area 531D provided in the interactive screens shown in FIG. 5D and FIG. 5E. The target that is the subject of the information product 611D illustrated in FIG. 6D is the certain retail operation, Bed Bath and Beyond, and the product 611D informs the end user at what price the retailer's stock closed over time relative to the number of vehicles that parked in the BBBY parking lots and whether that vehicle number increased, decreased, or stayed the same.

If the parking lot information produces a negative signal for the same period of time as the stock price, the line is shown as a dash line display component 623D. If the parking lot information produces a positive signal, then the line is shown through as a dot line display component 625D. When the line is a solid line display component 627D color, the parking lot information produced by the system generated no signal.

The embodiment of the information product 611D illustrated in FIG. 6D includes symbols 631D that inform the end user when an information product was released so that the end user may know whether and to what extent there may be some correlation between the information product release data and the stock price. While symbols 631D of a variety of types may be used to provide the release date information to the end user, the embodiment illustrated in FIG. 6D displays the information through circular report release shapes 631D.

The "Adjusted Close" information product 611D may include information displays that are shown to the end user only upon taking one or more additional steps, thereby allowing the end user to obtain a primary level of information from the display and additional levels of information only when the end user seeks such information. The embodiment of the information product 611D illustrated in FIG. 6D provides a second level of information—a "callout"—as an additional interactive element of the product 611D that may appear, for example, only when the end user hovers over a portion of the line 621D for a selected period of time. The illustrated embodiment of the callout 633D provides the date and the adjusted close price for the target at the period of time shown through the use of the X-axis 615D. By showing adjusted close price with signals overlaid, end users can determine whether or not the signals generated by this system were useful or predictive of changes in adjusted close price for the target being shown. This example target and date range is the same example as FIG. 6C.

Figure 6E:
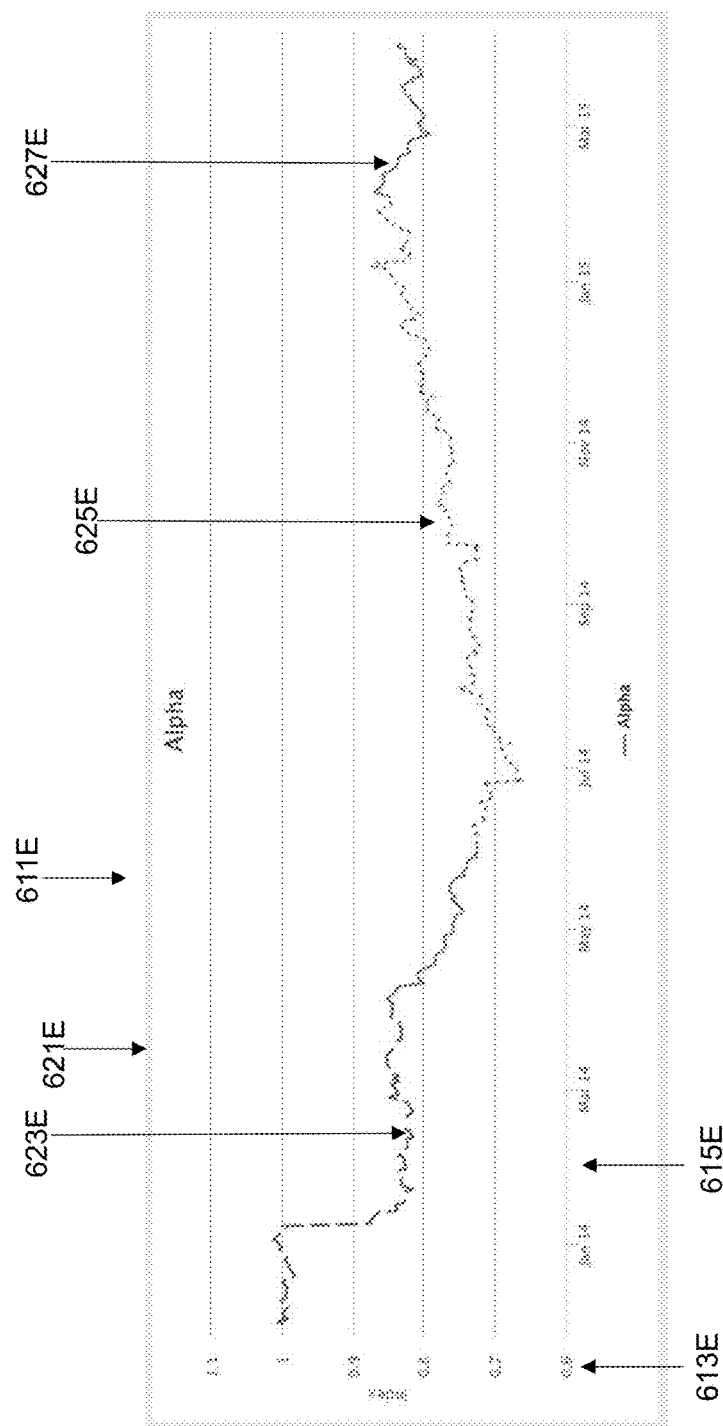

FIG. 6E illustrates the use of one of the embodiments of the system to produce an information product 611E by which the TrafficSignals synthesized information may be compared to the content developed from another source. This other content compares the performance of the stock of the identified target with the performance of a larger group of stocks. More specifically, FIG. 6E illustrates a chart displayed as a screen illustrating the performance of an individual stock by removing overall market performance.

FIG. 6E illustrates an information product—"Alpha"—that illustrates how the stock of a company is performing relative to a benchmark and relative to the information that the TrafficSignals tool is providing. The benchmark may be, for example, the Standard & Poor's 500 (S&P 500), an American stock market index based on the market capitalizations of 500 large companies having common stock listed on the NYSE or NASDAQ. While there may be many ways of calculating "Alpha", the illustrated embodiment uses a simplified method of subtracting price performance for the S&P 500 from stock price performance for the identified business target, Bed Bath & Beyond. For example, if the target's stock price is up 10% but the S&P 500 price is up 5%, then Alpha for the target is 5%.

More specifically, the embodiment of the information product 611E shown in FIG. 6E includes a y-axis 613E—showing the Index as percent change in the calculated "Alpha"—and a x-axis 615E—demarcated in the months chosen through the use of in the signal history date range inputs provided in interactive screens 519D, 520E shown in FIG. 5D and FIG. 5E. The target for which the synthesized information is provided was drawn, for example, from satellite images and for which the stock price values were obtained and compared to produce that is the subject of the illustrated embodiment of the information product 611E may be identified through the use of the "Ticker" area 531D provided in one or both of the interactive screens shown in FIG. 5D and FIG. 5E. As with the above examples, the target that is the subject of the information product 611E illustrated in FIG. 6E is the certain retail operation, Bed Bath and Beyond, and the product 611E informs the end user how the target's stock has performed relative to the chosen benchmark relative to the number of vehicles that were parked in the target's parking lots and whether that vehicle number increased, decreased, or stayed the same.

The information product 611E advantageously provides the comparison of TrafficSignals synthesized information with Alpha through a simplified information product display component 621E. The illustrated embodiment of the simplified information product display component 621E is a line. The character of the line 621E may change depending on the synthesized information that is formed from the combination of the Alpha calculated for a target and whether there has been, for example, an increase or a decrease in the number of vehicles that are parked in the parking lots of the stories of the target retailer.

If the parking lot information produces a negative signal for the same period of time as Alpha value, the line is shown with a dash line display component 623E. If the parking lot information produces a positive signal, then the line is shown through a dot line display component 625E. When the line is a solid line display component 627E color, the parking lot information produced no signal was generated by the system. By combining the alpha growth performance data with the TrafficSignals data, the end user is visually informed whether, for example, the decline in the performance of the company's stock was matched by a decline in the traffic in the company's store parking lots. If the end user believes that there is a correlation, the end user may estimate whether such a correlation may continue into the future and therefore whether decisions regarding trades in the stock of this company may be determined by the patterns of traffic in the company's stores parking lots.

Figure 6F:
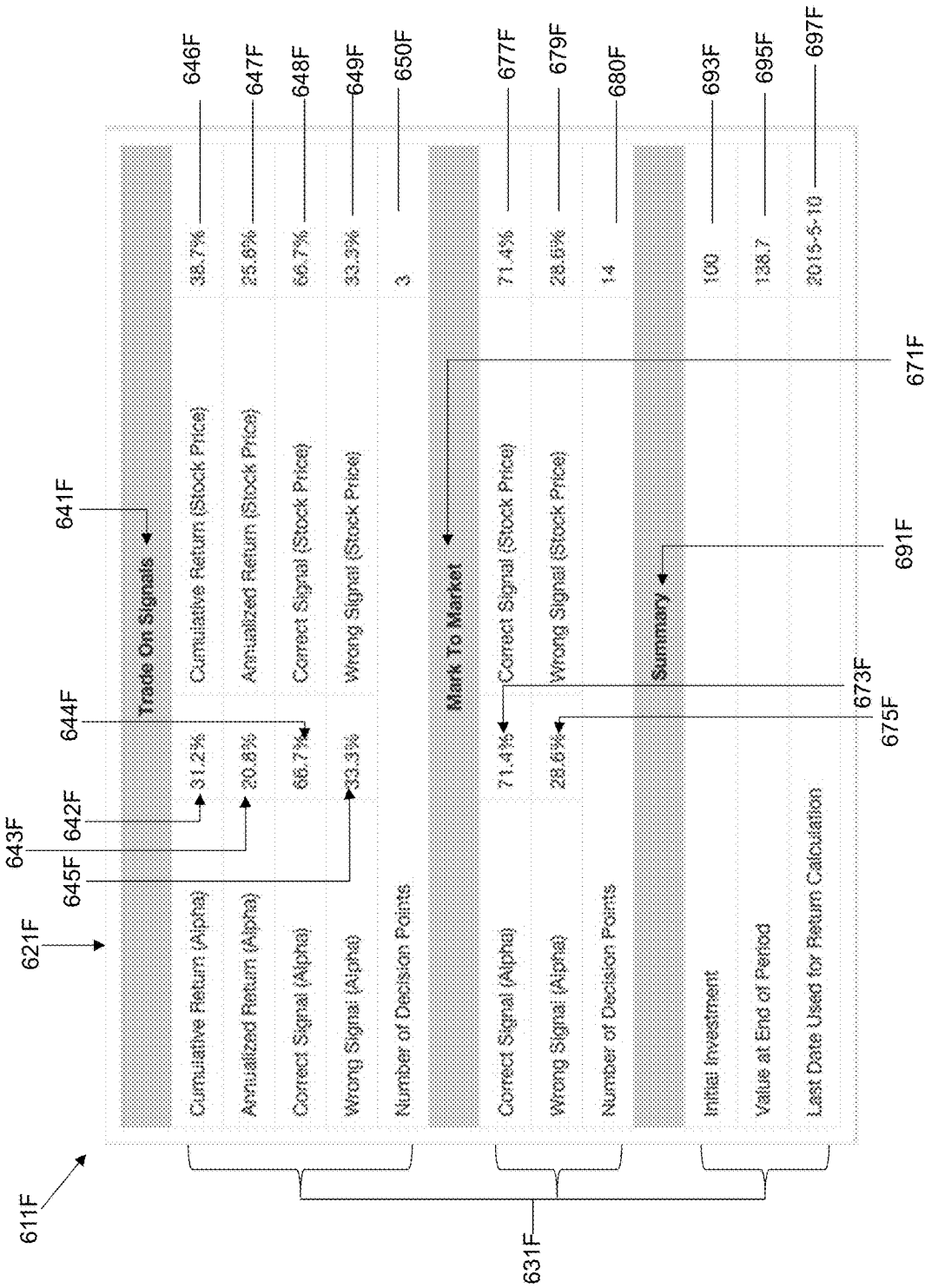

Embodiments of the system may be configured to provide one or more other information products that provide an end user with additional information by which the end user may estimate whether the TrafficSignals information product accurately portrays the economic condition of a target. FIG. 6F illustrates an embodiment of an information product 611F that may be generated through the use of an embodiment of the system according to the present invention by which an end user may obtain an index 621F of a plurality of separate such information products. In the illustrated embodiment of the information product 611F, the index 621F identifies a plurality of groupings 631F of such information products through an end user interface screen that more specifically inform an end user what TrafficSignals information products are available by which an end user may estimate the economic health of a business target.

The embodiment of the groupings 631F displayed to an end user through the information product 611F illustrated in FIG. 6F include a "Trade On Signals" grouping 641F, a "Mark to Market" grouping 651F, and a "Summary" grouping 661F.

The "Trade On Signals" grouping 641F of information products informs the end user whether and to what extent the TrafficSignals information provides an accurate estimate of the economic health of a business target and therefore how confident an end user may be in using the TrafficSignals information as such an estimate. The "Trade On Signals" grouping 641F provides an estimate of the accuracy of the TradeSignals information products by showing the end user what returns the end user may have made if the end user had invested in the stock of the business target according to the TrafficSignals information. The embodiment of the system develops synthesized information relative to a specific time period. One such time period is that during which the TrafficSignals value is negative. The other is positive. For purposes of the embodiments of the information products illustrated in FIG. 6F, no synthesized information is developed if no signal is produced. When the signal changes from a positive to negative or negative to positive, the development of the one information product is completed and a new one begins. For example, if the synthesized parking information provides a positive signal for 3 months and turns to no signal in the 4th month, the stated value is determined for the 3-month period with positive signals. A new calculation would start when the no signal ceases, and a new positive or negative signal is generated. The "Trade on Signals" grouping 641F shown in FIG. 6F includes: a "Cumulative Return (Alpha)" information product 642F—that is a percentage which represents the return that the stock of the target business generated less the performance for a chosen benchmark—such as the S&P 500 index—for the period of time defined by the single signal (positive or negative), during the Signal Date Range that the end user chose through the use of the entry elements 526D, 527D provided in the interactive screens 519D, 520E shown in FIG. 5D and FIG. 5E; an "Annualized Return (Alpha)" information product 643F—that is a percentage of the return the stock of the target business generated on an annual basis if the stock was traded according to the TrafficSignals information product generated during the chosen Signal Date Range entered through the use of entry elements 526D, 527D; a "Correct Signal (Alpha)" information product 644F that informs the end user on how many occasions the Alpha generation of the target was in the same direction as the signal for a given period of time; a "Wrong Signal (Alpha)" information product 645F that informs the end user on how many occasions the Alpha generation of the target over the period was in the opposite direction as our signal; a "Cumulative Return (Stock Price)" information product 646F which informs the end user the total return the end user may have received from trading on the TrafficSignals information product (only during positive and negative signal periods) during the selected Signal Date Range; an "Annualized Return (Stock Price)" information product 647F is the annualized return an end user may have received from trading on the TrafficSignals information product (only during positive and negative signal periods) during the selected Signal Date Range; a "Correct Signal (Stock Price)" information product 648F that is a percentage of the occasions when the stock price return over the period was in the line with the TrafficSignals information product; a "Wrong Signal (Stock Price)" information product 649F that is a percentage of the occasions when the stock price return over the period was in the opposite direction as the TrafficSignals information product; and, a "Number of Decision Points" Trade On Signals information product 650F that is the number of occasions when the TrafficSignals information product changed to a different signal (positive or negative only) and resulted in a calculation of the returns for the previous period of time.

The embodiment of the additional information product 611F shown in FIG. 6F includes a "Mark to Market" grouping 671F that informs the end user of the predictive value of the signals information by measuring the change in stock or alpha return for every month which have a positive or negative signal, and determining if the stock or alpha return was in the same direction as signal for that month. For example, if there were 3 months of positive signals and in the 4th month there was a no signal generated, the "Trade on Signals" analysis would only calculate the return as a decision point after the move from a positive signal in month 3 to a "No Signal" in month 4. The "Mark to Market" analysis would calculate the return as a decision point for each of the 3 months with positive signals. Embodiments of the "Mark to Market" analysis may not calculate a return as a decision point when a "No Signal" is generated.

More specifically, the FIG. 6F embodiment of the "Mark to Market" grouping 671F includes the following components: a "Correct Signal (Alpha)" information product 673F that informs the end user on the percentage of occasions when the TrafficSignal information product was in line with the Alpha generation over the period; a "Wrong Signal (Alpha)" information product 675F which informs an end user the percentage of occasions on which the traffic signal was not in line with the Alpha generation over the period; a "Correct Signal (Stock Price)" information product 677F that informs an end user when the stock price return over the period was in the same direction as the traffic signal; a "Wrong Signal (Stock Price)" information product 679F that informs an end user when the traffic signal was in the opposite direction of the stock price return over the period; and a "Number of Decision Points" information product 680F that informs an end user of the total number of decision points that were available for the entire period of time.

The FIG. 6F illustrated embodiment includes a "Summary" grouping 691F that includes the following components: an "Initial Investment" information product 693F that identifies a stated investment amount (in this illustrated embodiment U.S. $100); a "Value at End of Period" information product 695F that informs the end user how much the end user may have made if the end user had made trading decisions based on the traffic signal information using the "Trade on Signals" strategy; and a "Last Date Used for Return Calculation" information product 697F that informs the end user of the most recent date of stock price and other market information that is included in the system and used for calculations (usually the prior trading day).

Figure 6G:
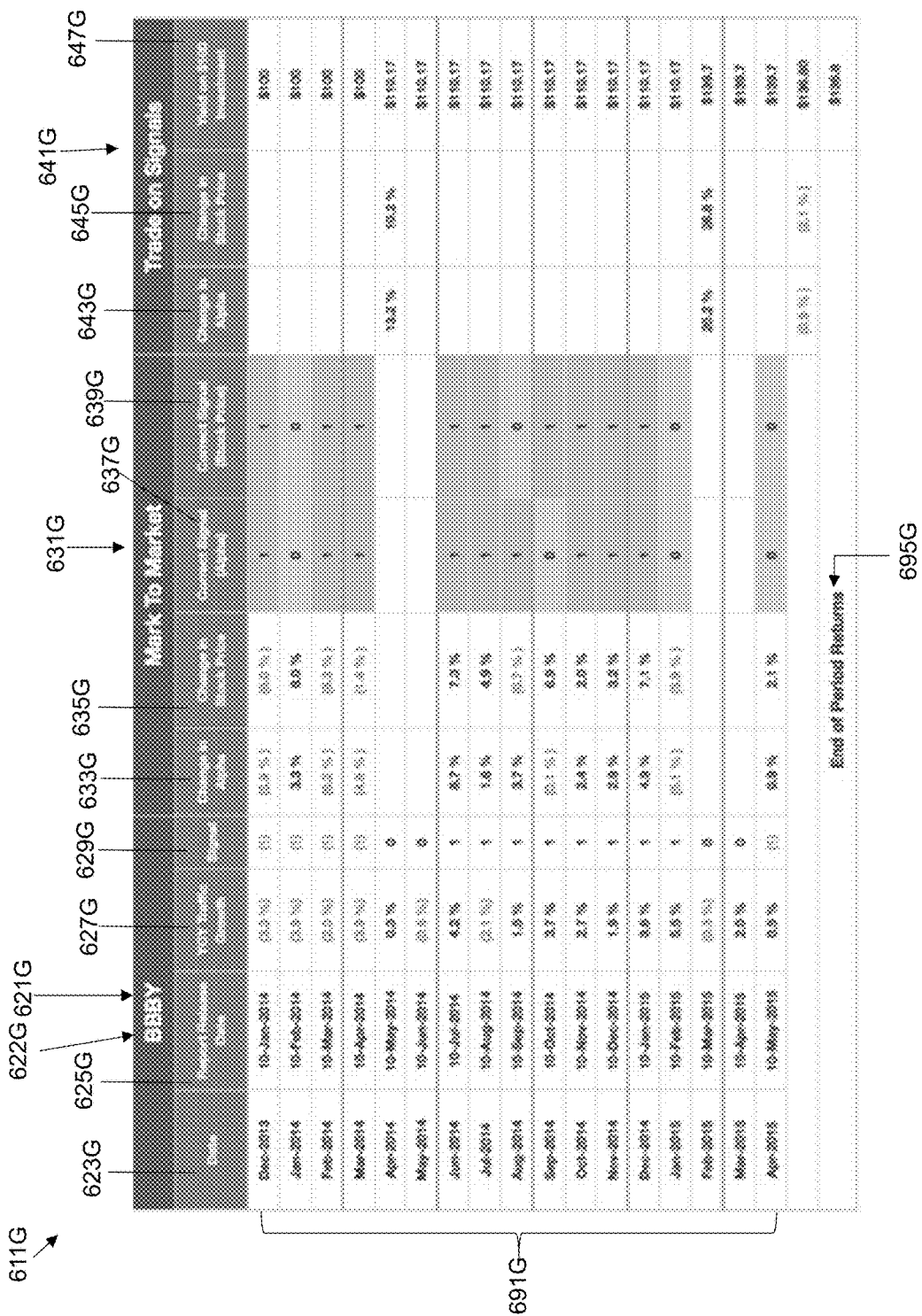

FIG. 6G illustrates an additional embodiment of an information product 611G that may be generated through the use of an embodiment of the system according to the present invention. FIG. 6G includes a variety of information including the following components: a target identity information product 621G; a "Mark to Market" information product 631G; and a "Trade on Signals" information product 641G.

More specifically, the embodiment of the target identity information product 621G illustrated in FIG. 6G confirms the target that is the subject of the information product 611G by entry of a designation in the Ticker designation element 622G. The subject of the FIG. 6G information product 611G is "Bed Bath and Beyond" according to the ticker designation entered into designation element 622G. The embodiment of the target identity information product 621G illustrated in FIG. 6G includes also a date designation component 623G. In the illustrated embodiment, the date designation component 623G informs the end user of the month and year on which the information was collected from which content was drawn for the development of the monthly information product. The target identity information product 621G includes also: a "Report Release Date" component 625G which informs the end user the date on which the signal was made available for the target for the month identified in the date designation component 623G; a year-over-year (or "YOY") Traffic Growth information product 627G that informs the end user of what year-over-year traffic growth was measured for the target for the month identified through component 623G; a signal information product 629G that informs the end user of the signal that was generated for the target for the month through symbols—the symbol "1" to identify a positive, a "(1)" to identify a negative, and a "0" to identify that no signal was generated for the subject target for the identified month.

The embodiment of the "Mark to Market" information product 631G illustrated in FIG. 6G provides the following grouping of additional information products: "Change in Alpha" information product 633G; "Change in Stock Price" information product 635G; "Correct Signal (Alpha)" information product 637G; and "Correct Signal (Stock Price)" information product 639G.

The embodiment of the "Trade on Signals" information product 641G, provides the following grouping of information products: a "Change in Alpha" information product 643G; a "Change in Stock Price" information product 645G; and a "Yield on $100 Investment" information product 647G.

The information product 611G illustrated in FIG. 6G advantageously provides the information identified above for a plurality of months 691G in order that an end user may compare and contrast that which is revealed through the information products. The information product 611G informs the end user that all the relevant information products for the identified target have been provided through a notice component 695G.

By engaging the "Analyze" component 551F provided through the embodiment of the Detailed Traffic Trends customization screen 520F illustrated in FIG. 5F, one or more information products may be provided to the end user. One of the embodiments of the information products that may be provided to an end user through the engagement of the "Analyze" feature is shown in FIG. 7A. The embodiment of the information product 711A illustrated in FIG. 7A advantageously provides certain traffic-related synthesized information as the information product and provides ready access to the end user to a wide variety of more detailed synthesized information developed through the use of the system by simply engaging features of the information product. This information product shows the results of the analysis of the year-over-year parking lot fill rates for a company target and breaks out this information into a plurality of factors.

More specifically, the embodiment of the "Detailed Traffic Trends" information product 711A illustrated in FIG. 7A provides a parking lot fill rate summary 715A of the synthesized information developed from parking lot fill content that was selected through the use of the selection screen shown in FIG. 5F for chosen monthly and weekly periods of time. The illustrated embodiment of the parking lot fill rate summary 715A includes a monthly fill rate information product 720A and a weekly fill rate information product 760A.

The illustrated embodiment of the monthly fill rate information product 720A includes a historic monthly parking lot fill rate summary 730A, a contemporary monthly parking lot fill rate summary 740A, and a monthly rate change information product 750A.

The illustrated embodiment of the historic summary 730A provides a target confirmation 731A—that identifies the target selected through the use of component 531F—and a time period component 733A—that identifies a time period that is prior to the one that was selected by the end user through the use of the screen 520F and for which comparative information will be drawn and an information product developed. For purposes of developing the parking lot fill rate summary 715A, an embodiment of the system was configured in order that a time period was selected as one year prior to the time period selected for the time period component 733A through the use of screen 520F—that is, August 2013. The summary 730A includes a monthly fill percentage component 735A—which is the average parking lot fill rate for the identified particular time period for each monthly sample of store observations, a sample size information product 737A that identifies the sample size for the identified target that resulted from ordering a representative sample of available satellite imagery over target locations during a particular time period extracting data for store observations from this imagery, and then further balancing the sample by eliminating data for store observations in each monthly sample that may be classified as "outliers" or are over/under represented in order to make the monthly sample more comparable with other monthly samples, and an average store information product 739A—that provides an estimate of the average size of the stores of the target that were sampled during the stated time period based on the average number of parking spaces at the stores of the target for which information was created and content drawn.

The contemporary monthly parking lot fill rate summary 740A provides the same type of information as the historic monthly parking lot fill rate summary component 730A but for the time period selected through the use of selected month/year from the inputs on FIG. 5F. More specifically, contemporary summary 740A provides a confirmation of the target identity 741A, a contemporary time period component 743A—that identifies a time period for that period which was selected by the end user through the use of the screen 520F—, a contemporary monthly average parking lot fill rate 745A for the identified contemporary time period month for the entire sample, a contemporary monthly sample size information product 747A, and an average store information product 749A that identifies the sample size for the identified target. The illustrated embodiment of the Monthly rate change information product 750A compares the historic and contemporary parking lot fill rates for the identified target and monthly time periods and informs the end user whether and to what extent the rates differ. What is the month for which content may be drawn may depend on the identified target's publically available fiscal and reporting calendar. The days included within each selected month may be a calendar month or a 4 or 5 week fiscal month.

The embodiment of the summary 715A developed from parking lot fill content selected through the use of the selection screen shown in FIG. 5F includes also a more detailed weekly fill rate information product 760A. The weekly fill rate information product 760A provides an end user with synthesized information developed for each week of the month for which the historic monthly parking lot fill rate summary 730A, the contemporary monthly parking lot fill rate summary 740A, and the monthly change product 750A were provided.

More specifically, the embodiment of the weekly fill rate information product 760A illustrated in FIG. 7A includes a historic weekly fill rate information product 770A, a contemporary weekly fill rate information product 780A, and a weekly change product 790A for identified weekly periods of time that are within the monthly periods of time for which information product was provided through the monthly fill rate information product 720A.

The embodiment of the historic weekly parking lot fill rate summary 770A illustrated in FIG. 7A provides a historic weekly fill rate information product (by percentage) 775A for each of a series of separate historic weekly entries 777A that encompass a range of identified historic dates 773A. The embodiment of the contemporary weekly parking lot fill rate summary 780A provides a contemporary weekly fill rate information product (by percentage) 785A for each of a series of separate contemporary weekly entries 787A. Weekly rate change at encompass a range of identified contemporary dates 783 information product 790A compares the historic and contemporary weekly change in parking lot fill rates for the identified target and weekly time periods 797A and informs the end user whether and to what extent the weekly rates 791A differ.

In addition to the parking lot fill rate summary 715A, the "Detailed Traffic Trends" information product 711A may identify and provide easy access also to one or more additional information products that were produced from the synthesized information developed from parking lot fill content that was selected through the use of the selection screen shown in FIG. 5F. Such identification and easy access may be facilitated through an information products collection component 701A. The embodiment of the "Detailed Traffic Trends" information product 711A illustrated in FIG. 7A includes a collection component 701A that identifies through separate engagement features 11 additional information products 701B through 701L. When an end user interacts with the screen by engaging one or more such information product engagement features—such as by "clicking" on one of these titles or on a symbol—for example, the illustrated + sign to the left of each title –, a new screen will be displayed to the end user to provide the requested information product.

By engaging the "Percentage of Parking Lot Fill Rate by State" feature 701B, a State Fill Rate Percentage screen 711B is displayed to the end user. FIG. 7B illustrates one preferred embodiment of the screen 711B that provides the end user with the state-by-state details of the information that was summarized in the historic monthly parking lot fill rate summary 730A, the contemporary monthly parking lot fill rate summary 740A, and the monthly rate change information product component 750A of the embodiment of the monthly fill rate information product 720A illustrated in FIG. 7A. More specifically, the embodiment of the screen 711B shown in FIG. 7B provides a historic state parking lot fill rate component 730B, a contemporary state parking lot fill rate component 740B, and a state monthly rate change information product component 750B for the target identified in FIG. 5F and again in FIG. 7A.

The historic state parking lot fill rate component 730B provides a historic state identification component 732B that includes a list 733B of each of the states from which information was drawn for purposes of producing the synthesized information that was summarized in summary 730A, a state weekly fill percentage component 734B— which provides the end user with a list 735B of the average parking lot fill rate that was developed from the information obtained for the locations of the target within the identified state during the period of time within the historic period of time confirmed to end user through component 733A shown in FIG. 7A, and a historic "Count" component 736B that includes a list 737B of the number of locations for the target within the identified state from which information was obtained to develop the synthesized information. For any particular state, if the count is a "0", then no information was obtained for a target location within the identified state.

The contemporary monthly parking lot fill rate summary 740B of the screen 711B shown in FIG. 7B provides the same type of information as provided through the historic monthly parking lot fill rate summary 730B but for the contemporary period of time selected through the use of the component 533F of the interface 520F shown in FIG. 5F. More specifically, the summary 740B provides a contemporary state identification component 742B—that includes a list 743B of each of the states from which information was drawn for purposes of producing the synthesized information that was summarized in summary 740A, a contemporary state monthly fill percentage component 744B—which includes a list 745B of the average parking lot fill rate that was developed from the information obtained for the locations of the target within the identified state during the contemporary period of time selected through the use of the component 533F and confirmed though component 741A of the embodiment shown in FIG. 7A, and a contemporary "Count" component 746B that includes a list 747B that identifies the number of locations for the target stores used within the identified state from which information was obtained to develop for the synthesized information.

The state monthly rate change information product 750B informs the end user of the subject of the product through a title 752B and provides a list 753B showing the historic and contemporary change in parking lot fill rates for the identified target and monthly time periods and informs the end user whether and to what extent the rates differ for each of the identified state within the rate change collection 753B.

Figure 7C:
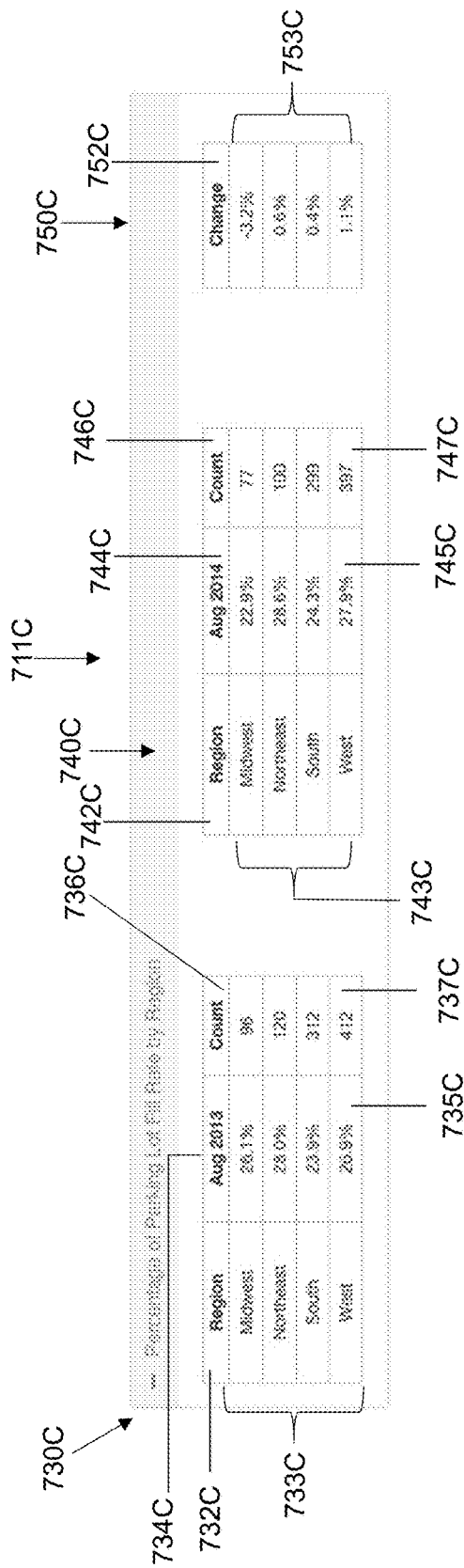

By engaging the "Percentage of Parking Lot Fill Rate by Region" feature 701C provided through the interface 711A shown in FIG. 7A, a regional summary screen display 711C is provided to the end user that summarizes the information provided through the information product shown in FIG. 7A on a regional basis. FIG. 7C illustrates one preferred embodiment of a regional summary screen 711C that provides a regional historic monthly parking lot fill rate summary 730C, a regional contemporary monthly parking lot fill rate summary 740C, and a regional monthly rate change information product component 750C of the embodiment of the monthly fill rate information product 720A illustrated in FIG. 7A.

The regional historic monthly parking lot fill rate summary 730C provides a historic region identification component 732C—that includes a list 733C of each of the regions from which information was drawn for purposes of producing the synthesized information that was summarized in summary 730A—, a historic regional weekly fill percentage component 734C—which includes a list 735C of the average parking lot fill rate that was developed from the information obtained for the locations of the target within each of the regions identified in region list 733C during the period of time within the historic period of time confirmed to end user through component 733A shown in FIG. 7A—, and a historic "Count" component 736C—that includes a list 737C of the number of locations for the target stores that were used within each of the identified regions from which information was obtained to develop for the synthesized information.

The regional contemporary monthly parking lot fill rate summary 740C of the screen 711C shown in FIG. 7C provides the same type of information as provided through the historic monthly parking lot fill rate summary 730C but for the contemporary period of time selected through the use of the component 533F of the interface 520F shown in FIG. 5F. More specifically, the summary 740C provides a contemporary regional identification component 742C—that includes a list 743C of each of the regions from which information was drawn for purposes of producing the synthesized information that was summarized in summary 740A—, a contemporary regional monthly fill percentage component 744C—that includes a list 745C of the average parking lot fill rates that were developed from the information obtained for the locations of the target within the regions identified in list 733C during the contemporary period of time selected through the use of the component 533F and confirmed though component 741A of the embodiment shown in FIG. 7A—, and a contemporary "Count" component 746C that includes a list of the number of locations for the target stores that were used within the identified region from which information was obtained to develop for the synthesized information.

The regional monthly rate change information product 750C informs the end user through a change title 752C of the identity of the information product 750C and includes a list 753C of percentages which show the comparison of the historic and contemporary change in parking lot fill rates for the identified target and monthly time periods and informs the end user whether and to what extent the rates differ for each of the identified regions within the rate change collection 753C.

Figure 7D:
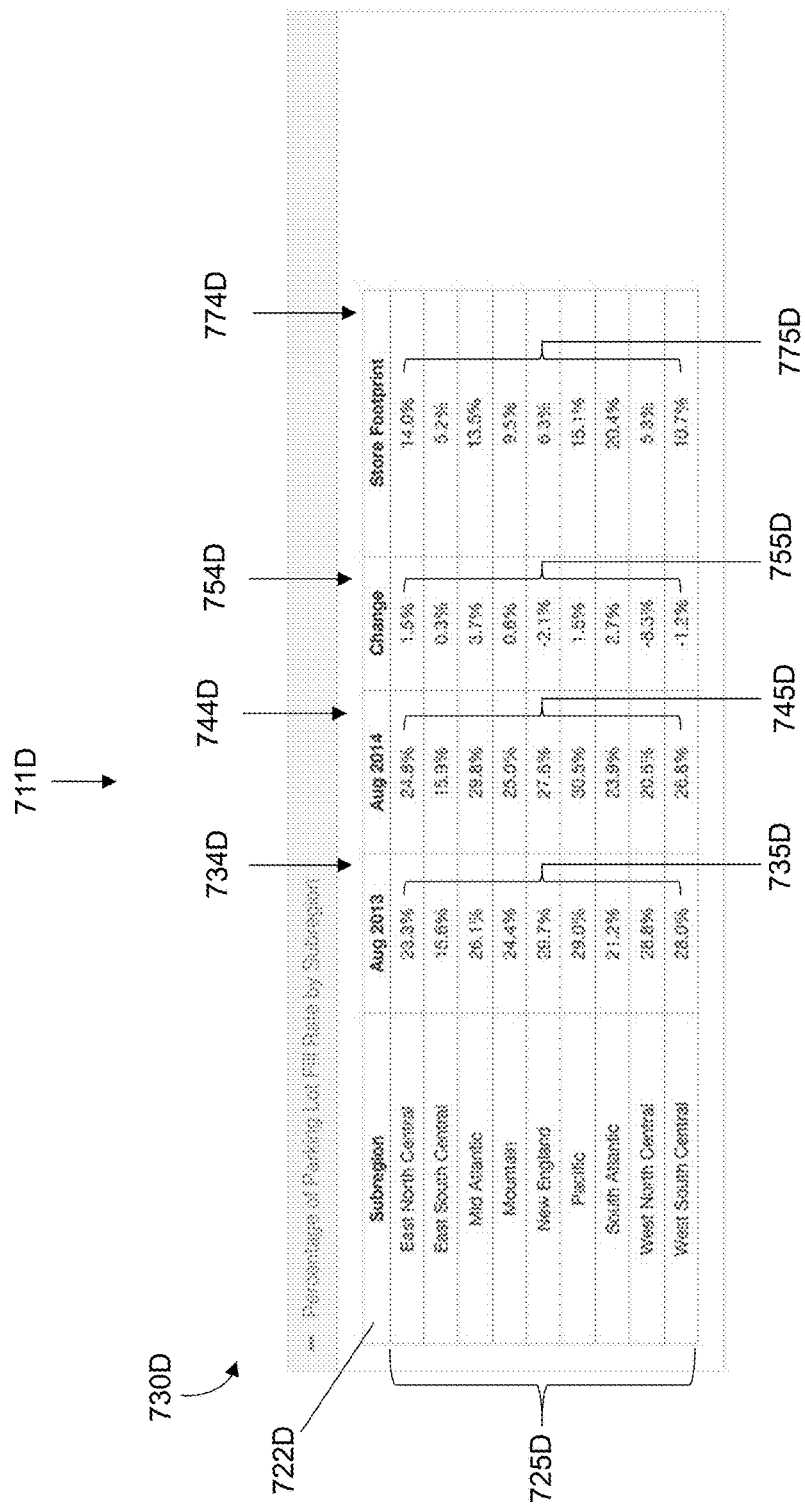

By engaging the "Percentage of Parking Lot Fill Rate by Sub-Region" feature 701D provided through the interface 711A shown in FIG. 7A, a sub-regional summary display screen 711D is provided to the end user that summarizes the information provided through the information product shown in FIG. 7A on a sub-regional basis. FIG. 7D illustrates one preferred embodiment of a sub-regional summary screen 711D that provides a sub-regional historic monthly parking lot fill rate summary 734D, a sub-regional contemporary monthly parking lot fill rate summary 744D, a regional monthly rate change information product component 754D, and a "Store Footprint" 774D of the embodiment of the monthly fill rate information product 720A illustrated in FIG. 7A.

More specifically, the illustrated embodiment of the sub-regional summary screen 711D provides a sub-region identification component 722D— that provides a sub-region identification list 725D in which each of the sub-regions from which information was drawn for purposes of producing the synthesized information that was summarized in summary 730A is identified—, a sub-regional historic monthly parking lot fill rate summary 734D—that provides a list 735D of the average parking lot fill rate that was developed from the information obtained for the locations of the target within each of the sub-regions identified in sub-region list 725D during the period of time within the historic period of time confirmed to end user through component 733A shown in FIG. 7A, a sub-regional contemporary monthly parking lot fill rate summary 744D—that includes a list 745D of which is the average parking lot fill rates that were developed from the information obtained for the locations of the target within the sub-regions identified in list 725D during the contemporary period of time selected through the use of the component 533F and confirmed though component 743A of the embodiment shown in FIG. 7A—, a regional monthly rate change information product component 754D—that includes a list 755D of percentages which show the comparisons of the historic and contemporary change in parking lot fill rates for the identified target and monthly time periods and informs the end user whether and to what extent the rates differ for each of the identified sub-regions within the rate change collection 753D—, and a "Store Footprint" 774D—that includes a list 775D showing the percentage of a target's total number of stores that are within the identified sub-region.

Figure 7E:
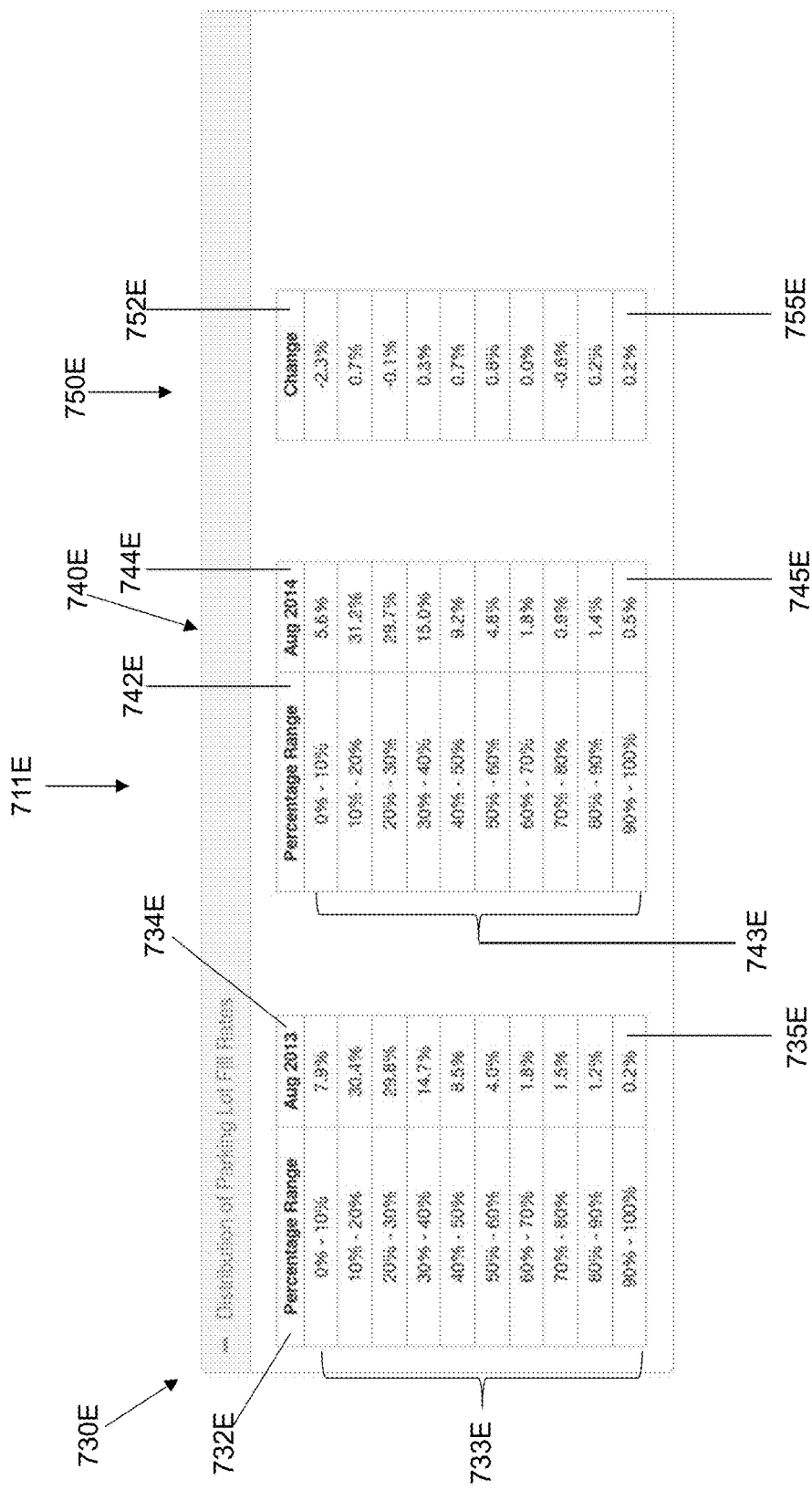

By engaging the "Distribution of Parking Lot Fill Rates" feature 701E, a Parking Lot Fill Rate Distribution screen 711E is displayed to the end user. FIG. 7E illustrates one preferred embodiment of the distribution screen 711E that shows how the fill rate percentage identified through component 735A of the screen 711A shown in FIG. 7A was achieved for the historic period identified through component 733A and for the contemporary period of time identified through component 743A of the screen 711A, and to what extent the fill rates changed.

More specifically, the embodiment of the distribution screen 711E shown in FIG. 7E provides a historic percentage range component 730E—that includes a range list component 732E that displays to an end user a range list 733E of percentages in which the synthesized information may be provided—and a historic parking lot fill rate distribution component 734E—that provides a distribution list 735E in which each entry within the list 735E shows the percentage of lots that were filled within the stated range for the historic period identified in 733A of the screen 711A shown in FIG. 7A. From the distribution screen 711E information product, for example, an end user would be informed that 7.9% of the parking lots that were sampled had fill rates that are less than 10% for the identified historic month of August 2013.

The embodiment of the distribution screen 711E shown in FIG. 7E provides also a contemporary percentage range component 740E that includes a range list component 742E that displays to an end user a range list 743E that duplicates the range list 733E and a contemporary parking lot fill rate distribution component 744E—that provides a distribution list 745E in which each entry within the list 745E shows the percentage of lots that were filled within the stated range for the contemporary period of time identified in component 743A of the screen 711A shown in FIG. 7A.

The embodiment of the distribution screen 711E shown in FIG. 7E provides a distribution change information product component 750E—that includes a change list component 752E in which a change list 755E is displays to an end user the percentages showing the comparisons of the historic and contemporary distribution values.

Figure 7F:
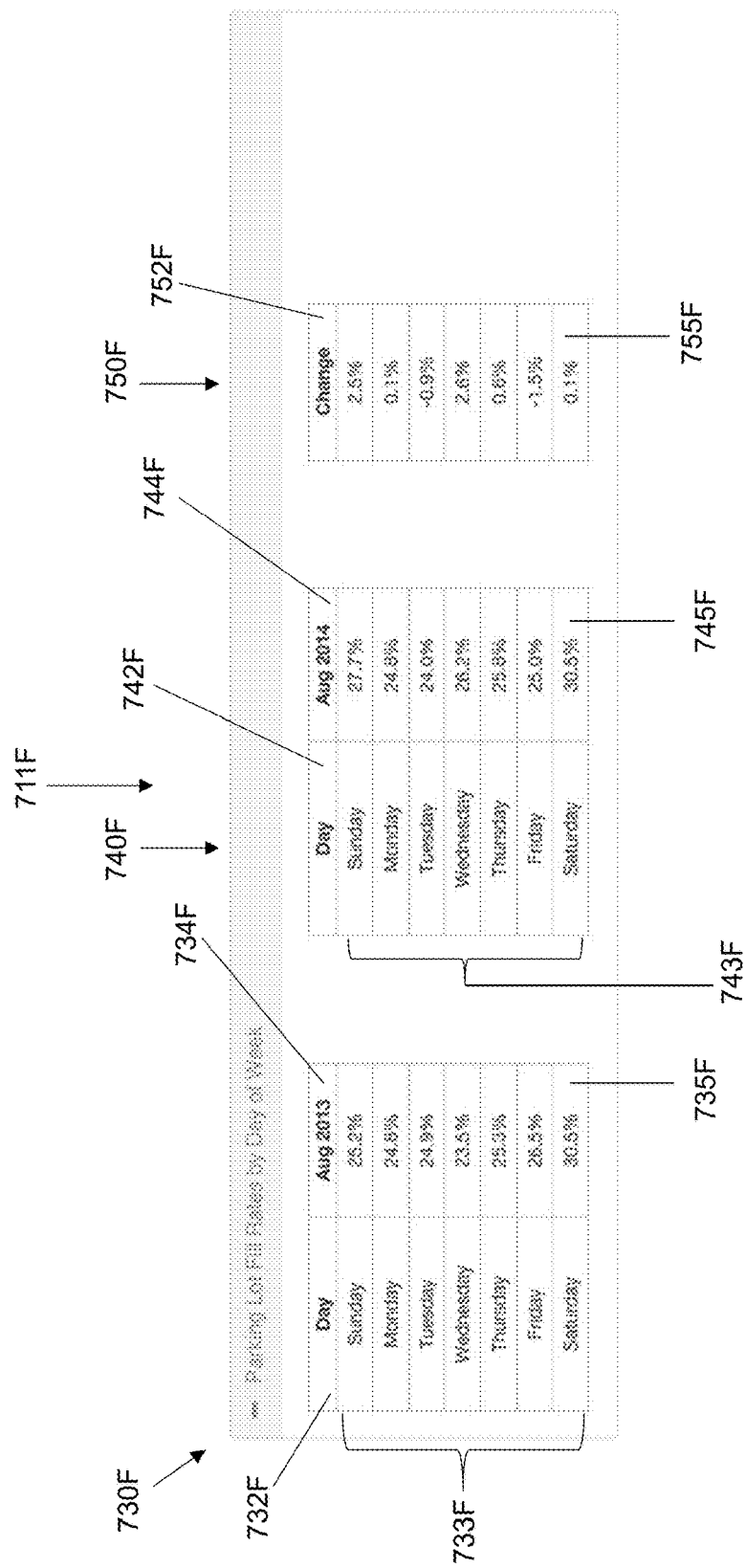

By engaging the "Parking Lot Fill Rates by Day of Week" feature 701F provided through the interface 711A shown in FIG. 7A, a day parking lot fill rate summary display screen 711F is provided to the end user that summarizes the information provided through the information product shown in FIG. 7A on a daily basis. FIG. 7F illustrates one preferred embodiment of a daily summary screen 711F that provides a historic daily parking lot fill rate summary 730F, a contemporary daily parking lot fill rate summary 740F, and a daily rate change information product component 750F.

More specifically, the historic daily parking lot fill rate summary 730F shown in FIG. 7F provides a historic daily list component 732F—that displays to an end user a list of the days 733F for which parking lot fill rates information products are provided by days of the listed week—and a historic parking lot daily fill rate distribution component 734F—that provides a daily distribution list 735F having a plurality of entries each of which shows the average of the amounts to which the parking lots of the identified target were filled on each of the identified days that were within the historic period identified in 733A of the screen 711A shown in FIG. 7A.

The contemporary daily parking lot fill rate summary 740F provides a contemporary daily list component 742F—that displays to an end user a list of the days 743F for which parking lot fill rates information products are provided by days of the listed week—and a contemporary parking lot daily fill rate distribution component 744F—that provides a daily distribution list 735F having a plurality of entries each of which shows the average of the amounts to which the parking lots of the identified target were filled on each of the identified days that were within the contemporary period identified in 743A of the screen 711A shown in FIG. 7A.

Figure 7G:
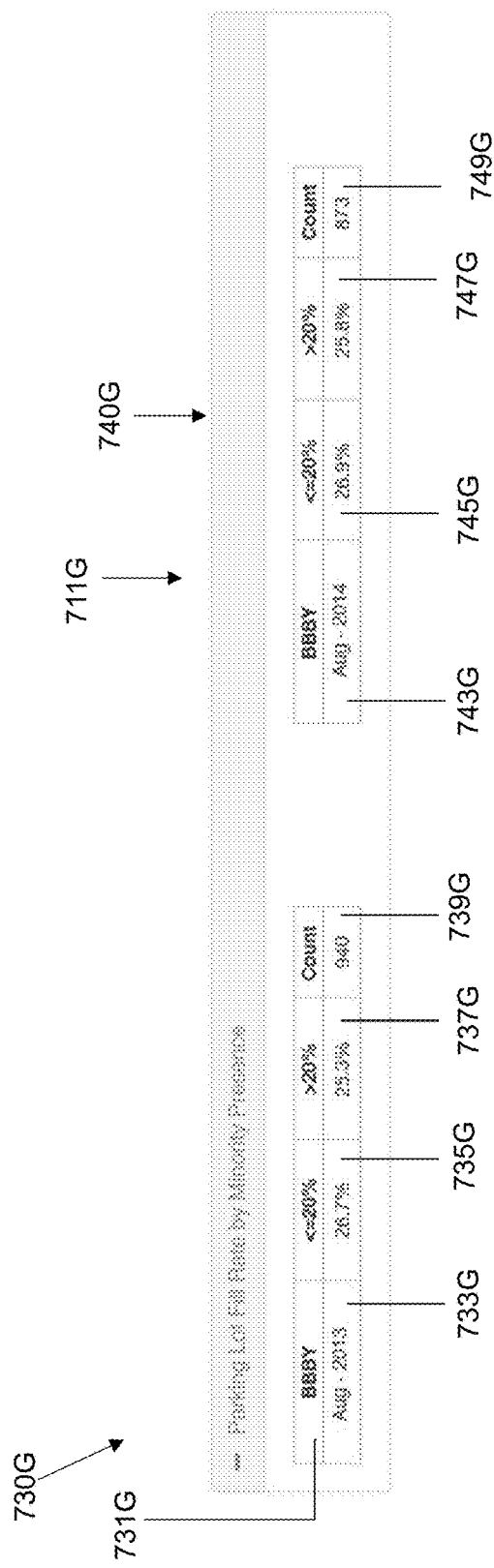

The embodiment of the daily summary screen 711F shown in FIG. 7F provides a daily distribution change information product component 750F—that includes a change list component 752F that includes a change list 755F which displays to an end user the percentages showing the comparisons of the historic and contemporary distribution values By engaging the "Parking Lot Fill Rate by Minority Presence" feature 701G provided through the interface 711A shown in FIG. 7A, a minority presence parking lot fill rate summary display screen 711G is provided to the end user that summarizes the information provided through the information product shown in FIG. 7A on a minority presence basis. The demographic data from which this information product may be formed from one or more sources, for example, from a governmental organization such as the U.S. Census Bureau and to the extent necessary may be modeled to represent the current year. FIG. 7G illustrates one preferred embodiment of a minority presence summary screen 711G that provides a historic minority presence parking lot fill rate summary 730G and a contemporary minority presence parking lot fill rate summary 740G.

More specifically, the embodiment of the minority presence parking lot fill rate summary display screen 711G shown in FIG. 7G provides a historic minority presence parking lot fill rate summary 730G that includes a target confirmation 731G—that identifies the target selected through the use of component 531F of the embodiment of the screen 520F shown in FIG. 5F—, a time period component 733G—that identifies a time period that is prior to the one that was selected by the end user through the use of the component 533F of the screen 520F shown in FIG. 5F and for which comparative information will be drawn and an information product developed, a small minority presence zip code summary 735G—that identifies the percentage of average parking lot fill rates for stores that are in zip codes with less than or equal to 20% minority populations, a large minority presence zip code summary 737G—that identifies the percentage of average parking lot fill rates for store locations in zip codes with greater than 20% minority populations, and a historic "CoGunt" component 739G—that lists the number of locations for the target stores from which information was obtained to develop for the synthesized information. The contemporary minority presence parking lot fill rate summary 740G provides the same type of information as does the historic component but for the contemporary period identified through the use of component 533F of screen 520F shown in FIG. 5F and confirmed through component 743A of the screen 711A shown in FIG. 7A.

Figure 7H:
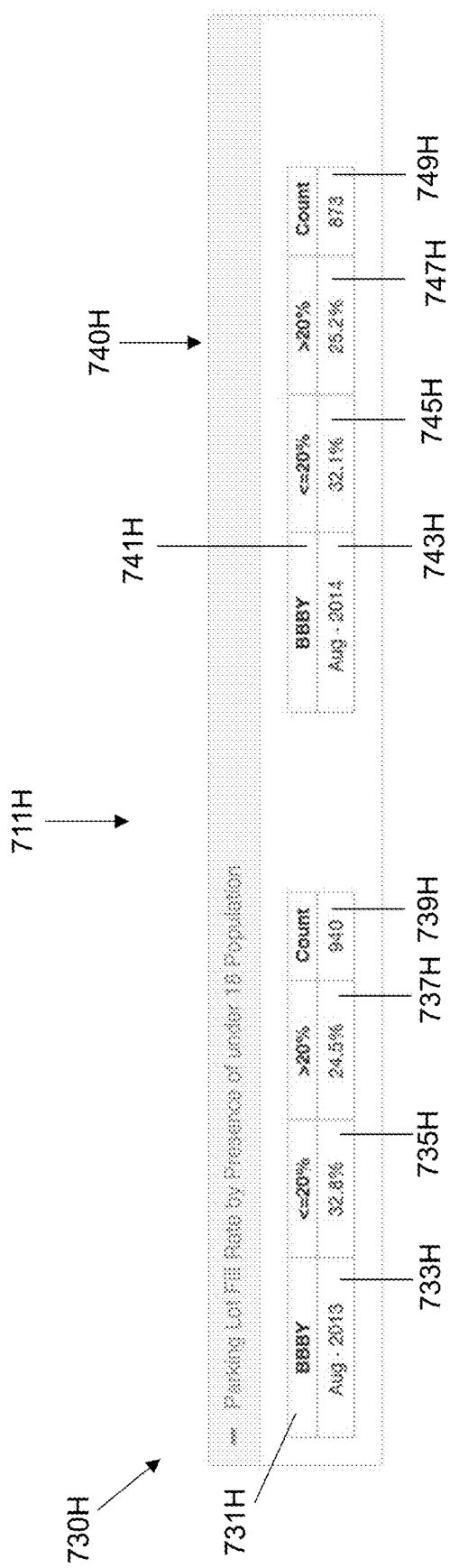

By engaging "Parking Lot Fill Rate by Presence of under 18 Population" feature 701H provided through the interface 711A shown in FIG. 7A, a minority age presence parking lot fill rate summary display screen 711H is provided to the end user that summarizes the information provided through the information product shown in FIG. 7A on a minority age presence basis. FIG. 7H illustrates one preferred embodiment of a minority age presence summary screen 711H that provides a historic minority age presence parking lot fill rate summary 730H and a contemporary minority presence parking lot fill rate summary 740H.

More specifically, the historic minority age presence parking lot fill rate summary 730H identifies the target that is the subject of the information product through target component 531H, a time period component 733H—that identifies a time period that is prior to the one that was selected by the end user through the use of component 533F of the screen 520F shown in FIG. 5F and for which comparative information will be drawn and an information product developed, a small minority age presence zip code summary 735H—that identifies the percentage of average fill rates for stores that are in zip codes with less than or equal to 20% minority age populations, a large age minority presence zip code summary 737H—that identifies the percentage of average parking lot fill rates for store locations in zip codes with greater than 20% minority populations, and a historic "Count" component 739H—that lists the number of locations for the target stores from which information was obtained to develop for the synthesized information. The contemporary minority presence parking lot fill rate summary 740H provides the same type of information as does the historic component but for the contemporary period identified through the use of component 743A of the screen 711A shown in FIG. 7A.

Figure 7I:
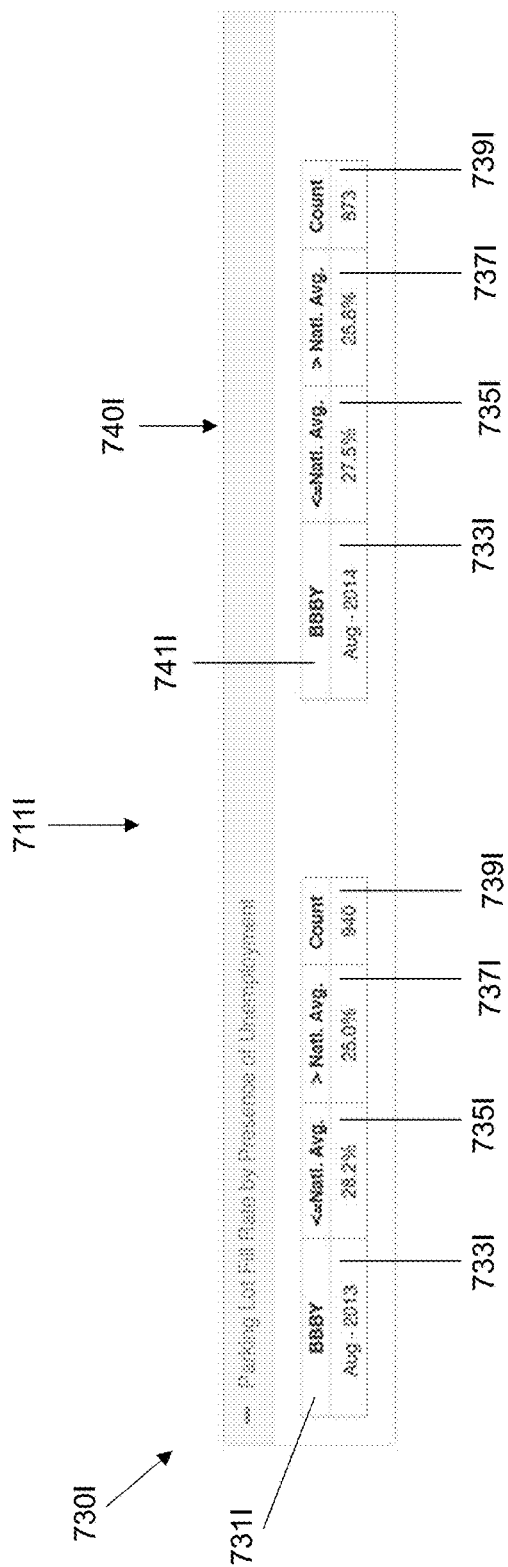

By engaging "Parking Lot Fill Rate by Presence of Unemployment" feature 701I provided through the interface 711A shown in FIG. 7A, a unemployment parking lot fill rate summary display screen 711I is provided to the end user that summarizes the information provided through the information product shown in FIG. 7A on an unemployment basis. FIG. 7I illustrates one preferred embodiment of an unemployment parking lot fill rate summary screen 711I that provides a historic unemployment parking lot fill rate summary 730I and a contemporary unemployment parking lot fill rate summary 740I.

More specifically, the historic unemployment parking lot fill rate summary 730I identifies the target selected through the use of target component 531F, a historic time period component 733I—that identifies a time period that is prior to the one that was selected by the end user through the use of the screen 520F and for which comparative information will be drawn and an information product developed, a historic low percentage unemployment component 735I—that shows the average fill rates for stores that are in zip codes with less than or equal to the current national unemployment rate, a historic high unemployment component 737I—that shows the average fill rates for stores that are in zip codes with unemployment that is higher than the current national unemployment rate, and a historic "Count" component 739I—that lists the number of locations for the target stores from which information was obtained to develop for the synthesized information. The contemporary unemployment parking lot fill rate summary 740I provides the same type of information as does the historic component but for the contemporary period identified through the use of component 743A of the screen 711A shown in FIG. 7A.

Figure 7J:
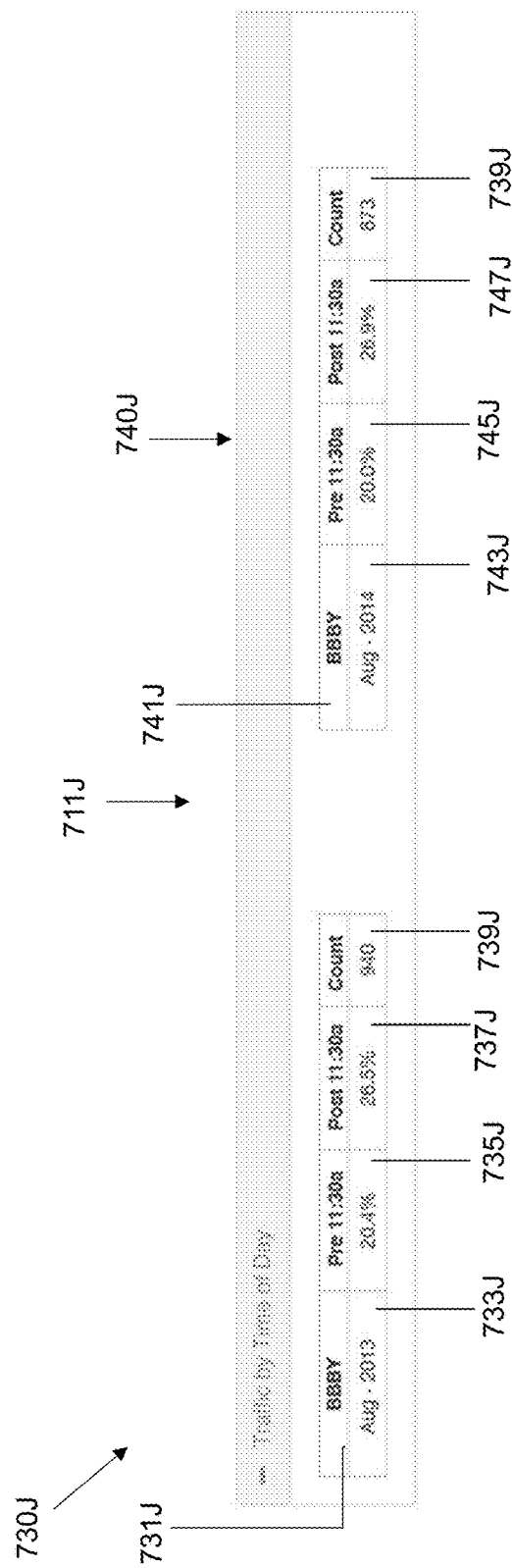

By engaging the "Traffic by Time of Day" feature 701J provided through the interface 711A shown in FIG. 7A, a traffic time summary display screen 711I is provided to the end user that summarizes the information provided through the information product shown in FIG. 7A according to the level of traffic experienced at target locations by time of day. FIG. 7J illustrates one preferred embodiment of traffic time summary display screen 711J that provides a historic traffic time summary 730J and a contemporary traffic time summary 740J.

More specifically, the traffic time summary 730J identifies the target selected through the use of target component 531J, a historic time period component 733J—that identifies a time period that is prior to the one that was selected by the end user through the use of the screen 520F and for which comparative information is drawn and an information product developed, a historic early time component 735J—that shows the average parking lot fill rates for stores that were determined from synthesized information developed from information obtained prior to 11:30 a.m., a historic late time component 737J—that shows the average parking lot fill rates for stores that were determined from synthesized information developed from information obtained after 11:30 a.m., and a historic "Count" component 739J—that lists the number of locations for the target stores from which information was obtained to develop for the synthesized information. The contemporary traffic time summary 740J provides the same type of information as does the historic component but for the contemporary period identified through the use of component 743A of the screen 711A shown in FIG. 7A.

Figure 7K:
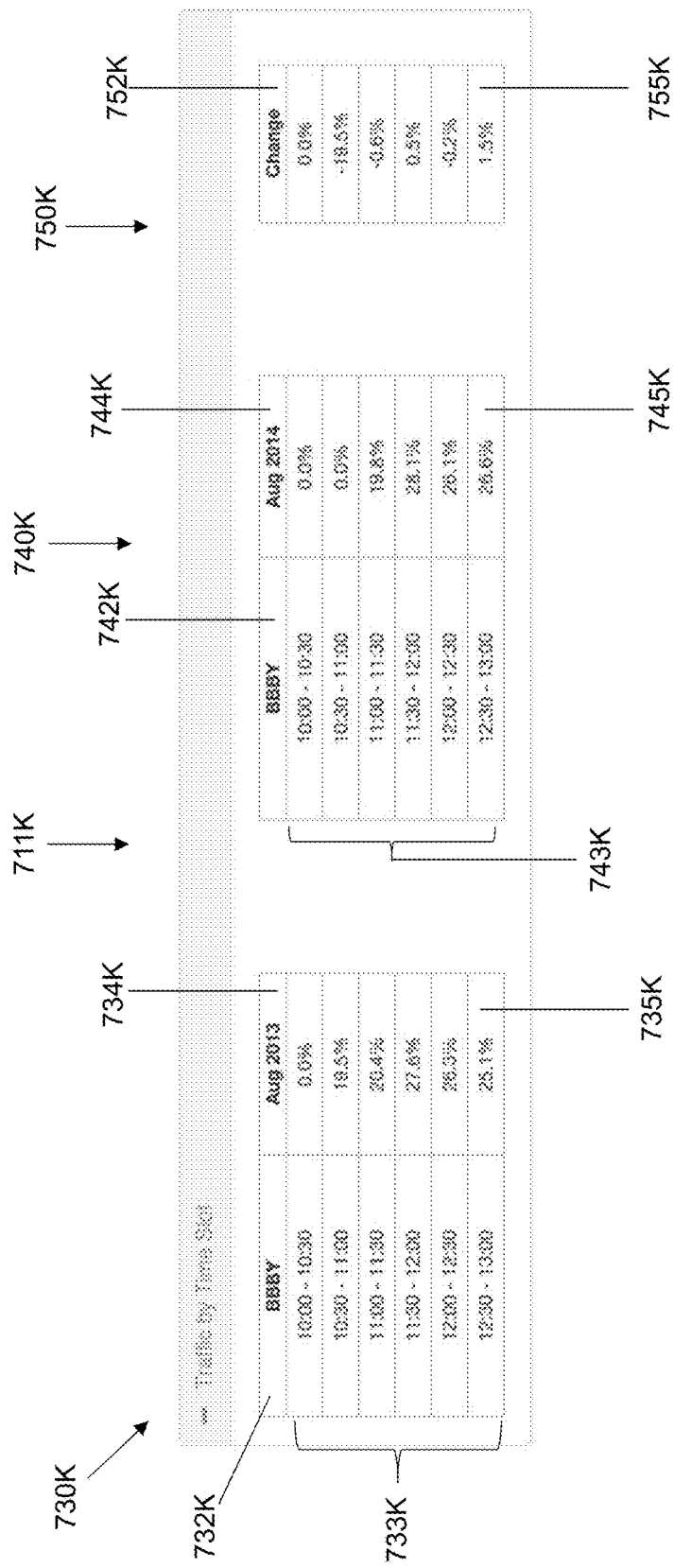

By engaging the "Traffic by Time Slot" feature 701K provided through the interface 711A shown in FIG. 7A, a traffic time slot summary display screen 711K is provided to the end user that summarizes the information provided through the information product shown in FIG. 7A according to the level of traffic experienced at target locations by specific segments of time of day. FIG. 7K illustrates one preferred embodiment of traffic time summary display screen 711K that provides a historic traffic time slot summary 730K, a contemporary traffic time slot summary 740K, and a time slot change component 750K.

More specifically, the traffic time slot summary 730K includes a target component 732K—that confirms the target that was selected through the use of target component 531J, a time slot component 733K—that displays to an end user a list of the time slots within a day 733K for which parking lot fill rate information is provided—and, a historic parking lot time slot fill rate component 734K—that confirms the historic time for which the information is provided and includes a time slot list 735K having a plurality of entries, each of which shows the average of the amounts to which the parking lots of the identified target were filled during each of the identified time slots that were within the historic period identified in 733A of the screen 711A shown in FIG. 7A. The contemporary traffic time slot summary 740K provides the same type of information as does the historic component but for the contemporary period identified through the use of component 743A of the screen 711A shown in FIG. 7A. The embodiment of the time slot summary screen 711K shown in FIG. 7K provides a time slot change component 750K—that includes a change list component 752K that includes a change list 755K which displays to an end user the percentages showing the comparisons of the historic and contemporary distribution values.

Figure 7L:
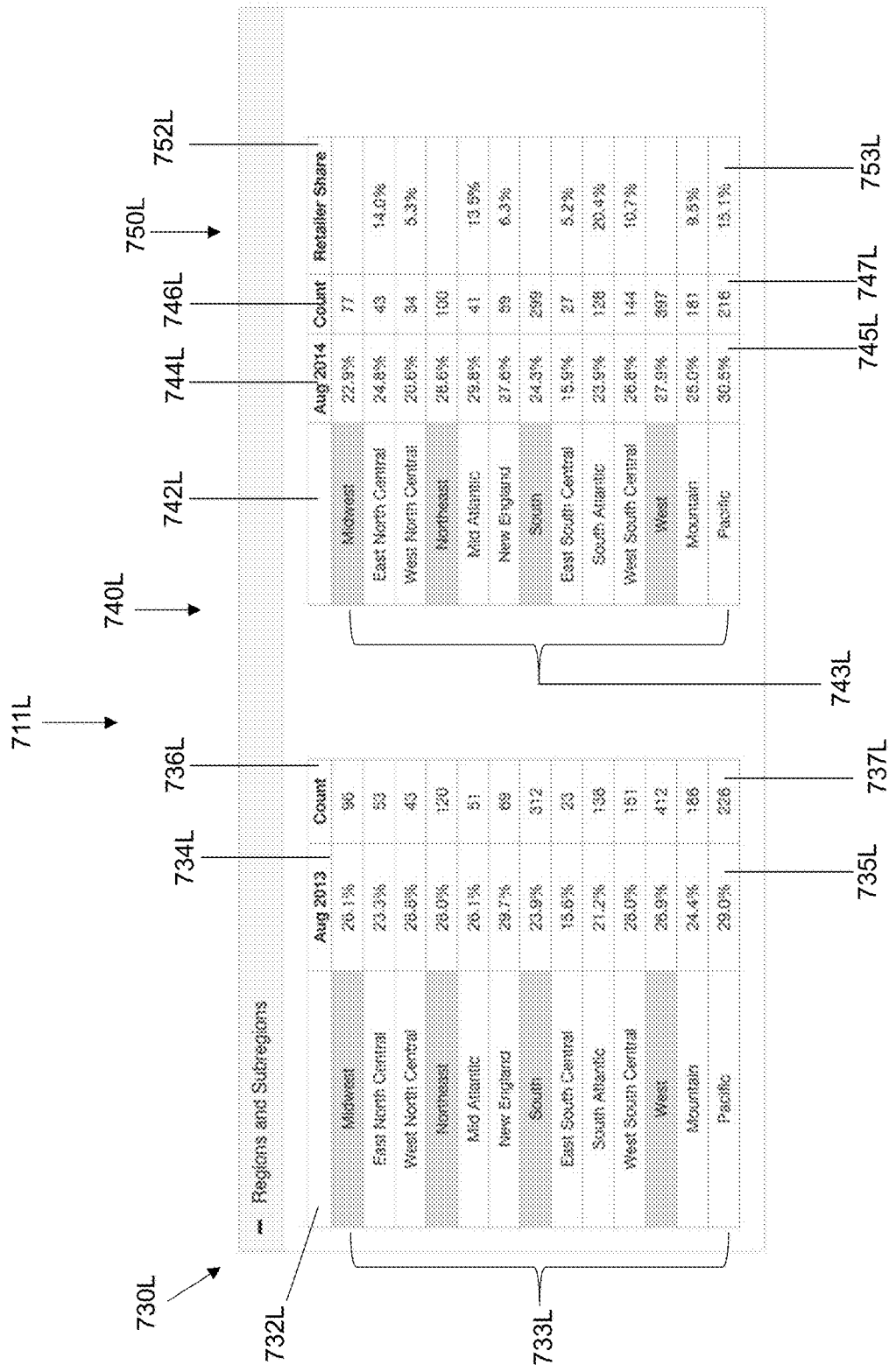

By engaging the "Regions and Sub-Regions" feature 701L provided through the interface 711A shown in FIG. 7A, a region sub-region summary display screen 711L is provided to the end user that summarizes the information provided through the information product shown in FIG. 7A according to the level of traffic experienced at target locations by region and sub-region. FIG. 7L illustrates one preferred embodiment of region sub-region summary display screen 711L that provides a historic region sub-region summary 730L, a contemporary region sub-region summary 740L, and a retailer share component 750L.

The historic region sub-region summary 730L provides a historic region sub-region identification component 732L—that includes a list 733L of each of the regions and sub-regions from which information was drawn for purposes of producing the synthesized information that was summarized in summary 730A—, a historic regional weekly fill percentage component 734L—which includes a list 735L of the average parking lot fill rate that was developed from the information obtained for the locations of the target within each of the regions and sub-regions identified in region list 733L during the period of time within the historic period of time confirmed to end user through component 733A shown in FIG. 7A—, and a historic "Count" component 736L—that includes a list 737L of the number of locations for the target stores that were used within each of the identified regions and sub-regions from which information was obtained to develop for the synthesized information. The contemporary region sub-region summary 740L of the screen 711L shown in FIG. 7L provides the same type of information as provided through the historic region sub-region summary 730L but for the contemporary period of time selected through the use of the component 533F of the interface 520F shown in FIG. 5F. The retailer share component 750L shows the percentage of the target's total number of stores that is located in each of the identified regions and sub-regions.

Certain embodiments of the system of the present invention may generate synthesized information from which information product—such as a standard type of report or a type of signal—may be developed. Other embodiments of the system may be configurable to generate a plurality of types of synthesized information from which information product including a plurality of standardized reports, reports customized by the user or end user, or types of signals may be developed. The synthesized information that may be output from the system and which the user may select may be viewed on one or more display screens of the system.

In addition to information regarding specific businesses and stores, another type of information that may be accessed through one preferred embodiment of the system that is the subject of the present invention for analysis by a user is that concerning non-urban areas. For example, a variety of different types of satellites including those known by the acronyms MODIS, LANDSAT, and SPOT can produce such images. Depending on the sensors and cameras carried aboard the satellite, the images can vary in scope and resolution. The commercial, high-resolution optical imaging SPOT—or the "Satellite for Observation of Earth"—satellite system advantageously may be able to obtain images with high spatial resolution thereby permitting detailed analysis of smaller features including trees and crops. The images may be rendered in true color.

Another type of synthesized information may be developed from content drawn from information accessed through certain preferred embodiments of the system. Various data may be captured by sensors on board a satellite, received, analyzed, and transformed into one or more information products usable by and of value, for example, to an end user. Sensors on board a satellite can measure the wavelengths of light absorbed and reflected by vegetative and non-vegetative components. Certain pigments in plant leaves strongly absorb wavelengths of visible (red) light while strongly reflecting wavelengths of near-infrared light, which is invisible to human eyes. The raw satellite data obtained from the satellite sensors can be transformed through known algorithms into one or more vegetation indices. One such vegetation index represents the relative density and health of vegetation shown in an image on a pixel by pixel basis by the color green. The denser and healthier the vegetation in a given area of the image, the more saturated that portion of the image will be in the color green. One widely used vegetation index is the Normalized Difference Vegetation Index ("NDVI"). NDVI values can range from +1.0 to −1.0. Areas of barren rock, sand, or snow typically show very low NDVI values—for example, 0.1 or less. Areas with sparse vegetation, such as shrubs and grasslands or senescing crops, may produce moderate NDVI values—approximately 0.2 to 0.5. Dense vegetation, such as that found in temperate and tropical forests or crops at the peak of their growth period, can produce high NDVI values—approximately 0.6 to 0.9. By the transformation of raw satellite data into NDVI values, images and other information products can be produced that provide an estimate of vegetation type, amount, and condition of land surfaces. By averaging NDVI values over time, a baseline can be established of what "normal" conditions for a given area may be. Over time, changes to the condition of the land—such as those caused by mining, deforestation, or urban area growth—and the health of the vegetation may be identifiable.

An image produced through the transformation by NDVI analysis of the wavelength data captured via satellite for the same land area does not show features in true color. Embodiments of the system of the present invention permit an area within the larger image to be defined—such as through a border-like feature used to define the area of analysis for a retail store—and NDVI values produced for the data captured for that defined area. Certain embodiments of the system may be configurable to permit the NDVI values to be shown such as on the transformed image in a data box. Certain embodiments of the present invention may be configurable to provide an image or images in which selected features are shown in one or more contrasting colors in order to rapidly convey information sought by the end user. For example, information received through the NDVI analysis of an imaged area of land may show healthy vegetation by the color green, no vegetation by the color red, and damaged areas by the colors white and/or yellow.

Certain embodiments of the system of the present invention are configurable to permit information obtained from the most contemporary image or images to be placed in a historical context. As an example, the information obtained from an NDVI-analyzed image taken in a certain month may be placed in a historical context by reference to the information obtained from an image taken in another or other months.

Figure 8A:
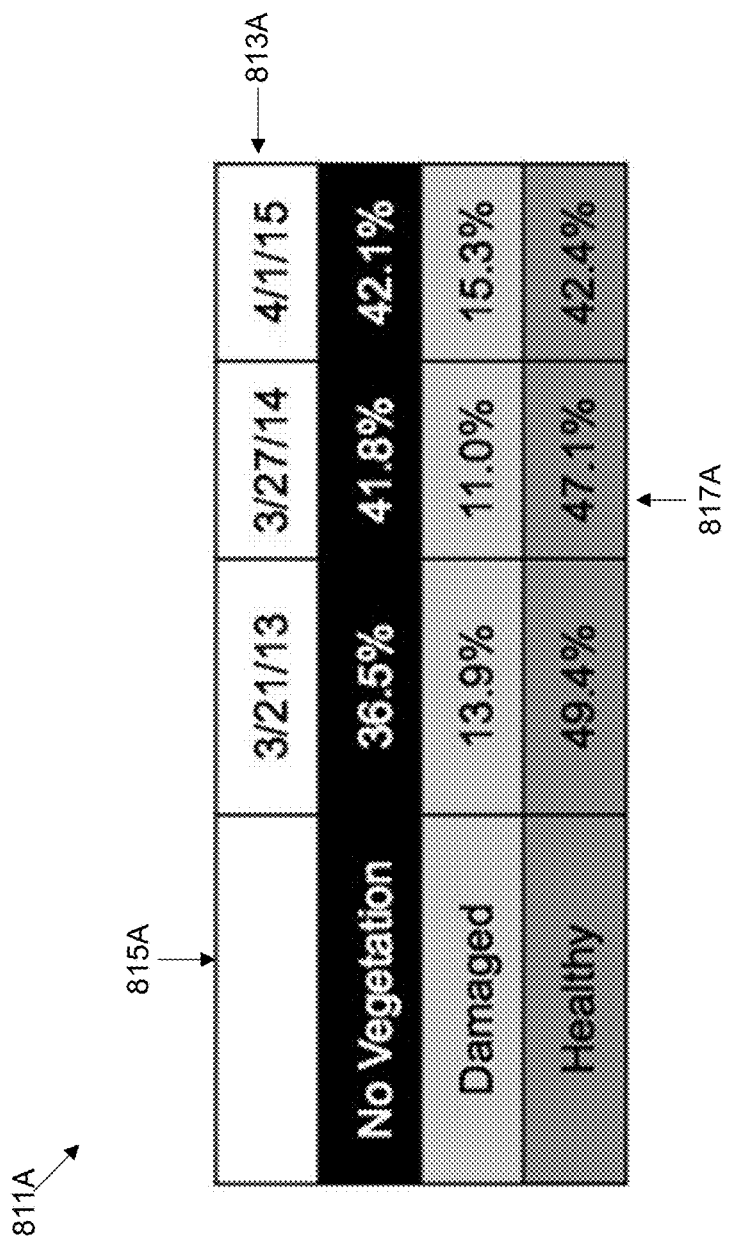
FIG. 8A and FIG. 8B each illustrate a representation of an information product prepared through the use of a preferred embodiment of the present invention.
Figure 8B:
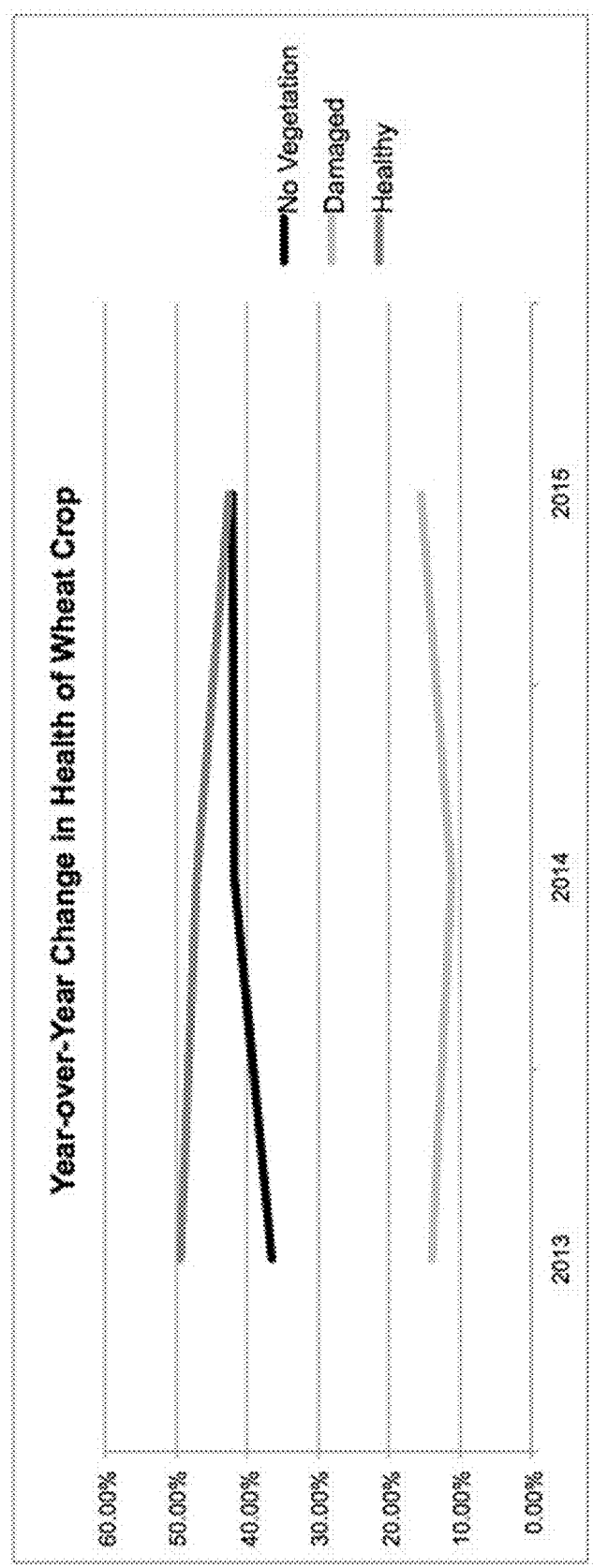

FIG. 8A and FIG. 8B each illustrate an information product synthesized from the comparison of the data obtained through the NDVI analysis of the same area of land defined by a border. FIG. 8A illustrates an embodiment of a chart 811A that includes time of image information 813A, data categorizations 815A that may be selected for purposes of an NDVI analysis conducted from satellite images—that is, "No Vegetation", "Damaged", and "Healthy"), and the analysis results 817A—in the illustrated embodiment, percentages of the total amount of land defined by the border that was within one of the date categorizations. To improve the ease with which chart 811A may be read—even on simple communication device—, the areas of the chart 811A conveying information product about each of the categorizations may be colored or patterned. The information product shown in FIG. 8B is a chart 811B that conveys information regarding time versus land condition. The percentage shown on the y axis is the percentage of pixels that are healthy, damaged, or have no vegetation. This percentage may refer to one crop field or a sample of many crop fields.

Figure 9A:
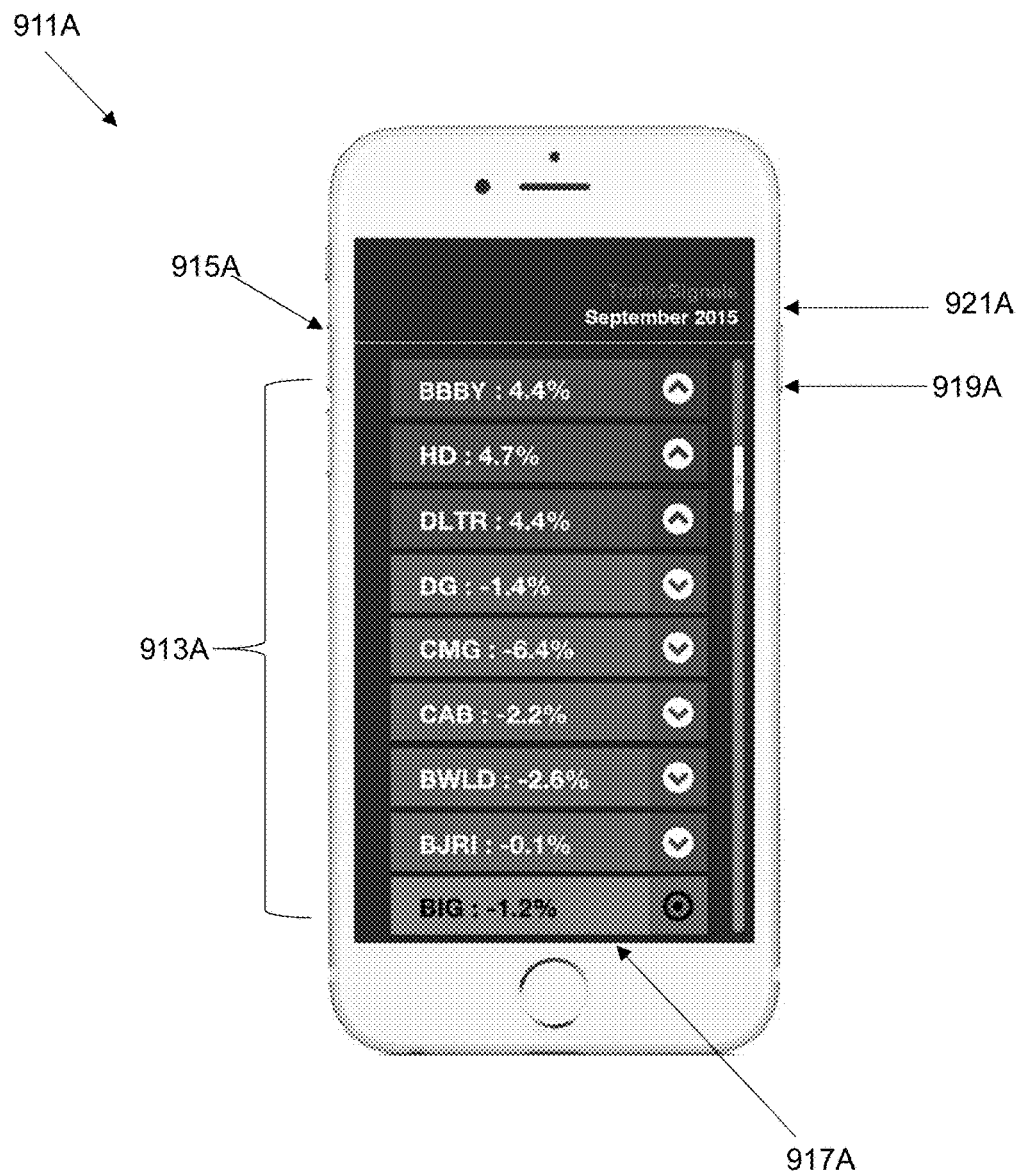
FIG. 9A through FIG. 9D each illustrate a representative of a simplified representation of an information product prepared through the use of a preferred embodiment of the present invention.

FIG. 9A through FIG. 9D illustrate additional embodiments of information products that may be developed through the use of the system and distributed to one or more end users. Advantageously, the illustrated embodiments of the information products are simplified embodiments of the TrafficSignals" group of information products that may be readily distributed and received in a variety of contexts and through the use of various mobile devices. FIG. 9A illustrates a multi-target information product 911A that includes a target list 913A—that identifies a plurality of targets through their ticker designations 915A, a current performance value 917A for each of the identified targets, and an analysis grapheme 919A—that informs the end user of the longer term performance of the target. The illustrated embodiment of the multimarket information product 911A includes a time component 921A that informs the end user for what period of time the information is provided. Information regarding the target identity and the performance may be provided through additional signals.

Figure 9B:
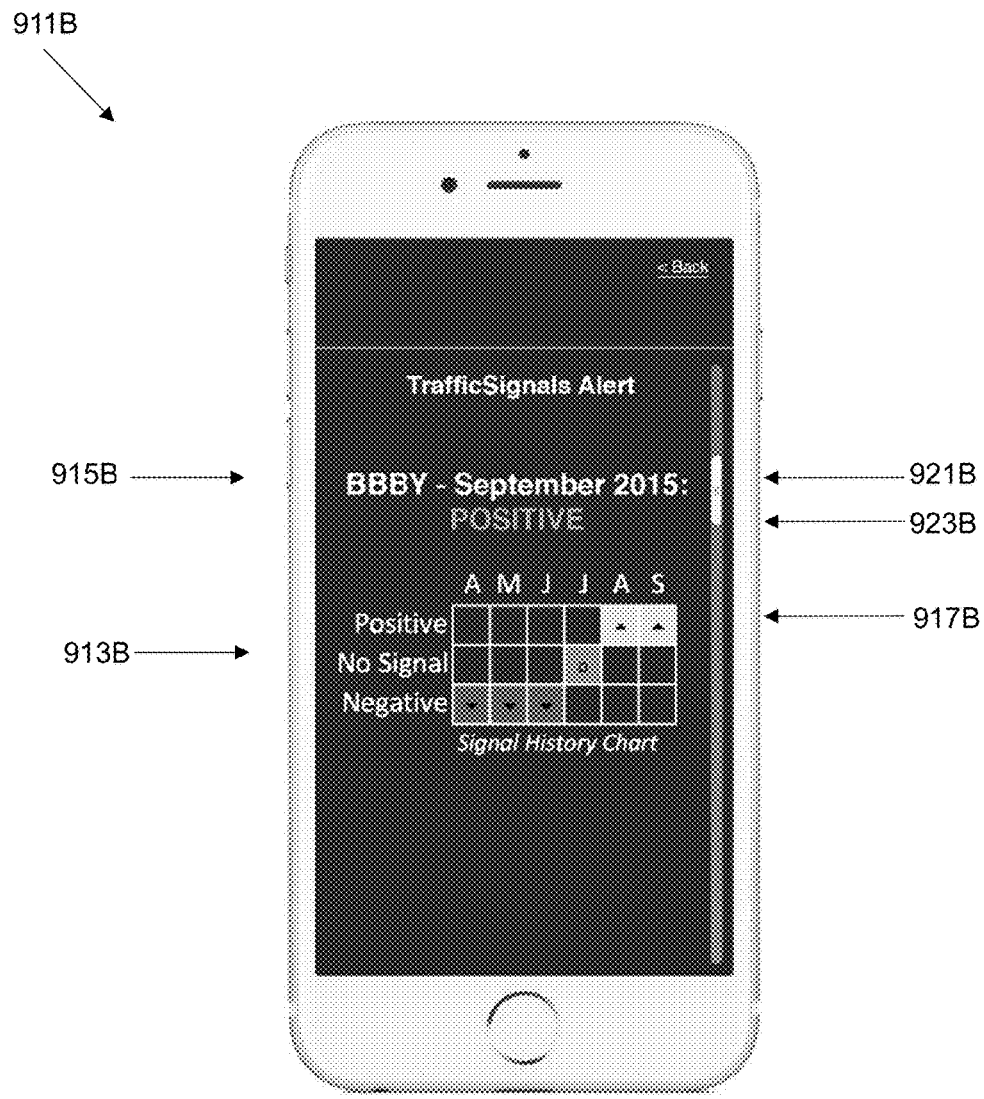

FIG. 9B illustrates an embodiment of an information product that may be one of the "TrafficSignals" group of information products and that may be distributed to and displayed by an end user such as by the engagement of one of the target entries shown in FIG. 9A. The embodiment of the information product shown in FIG. 9B includes a target additional history screen 911B for an identified target 915B "BBBY" provided by engaging the "BBBY" feature 915A on display screen 991A. The illustrated embodiment of history screen provides information—identified by product abbreviations 917B—in chart form 913B—"A" for April, "M" for May, "J" for June, "J" for July, "A" for August, and "S" for September—that are prior to the identified period of time 921B "September 2015". regarding the performance of the selected target for a period of six months. An additional performance signal 923B is provided.

Figure 9C:

FIG. 9C illustrates an embodiment of an information product 911C that provides information for a single identified target 915C. The display includes a performance value 923C and a grapheme signal 925C for an identified period of time 921C. Such a simplified embodiment is advantageous in that it may be sent and received even in limited mobile contexts.

Figure 9D:

FIG. 9D illustrates an embodiment of an information product 911D that provides historical information for a single identified target 915D. More specifically, the displayed information product 911D including a target history screen 913D of the type shown in FIG. 9B.

Figure 10A:
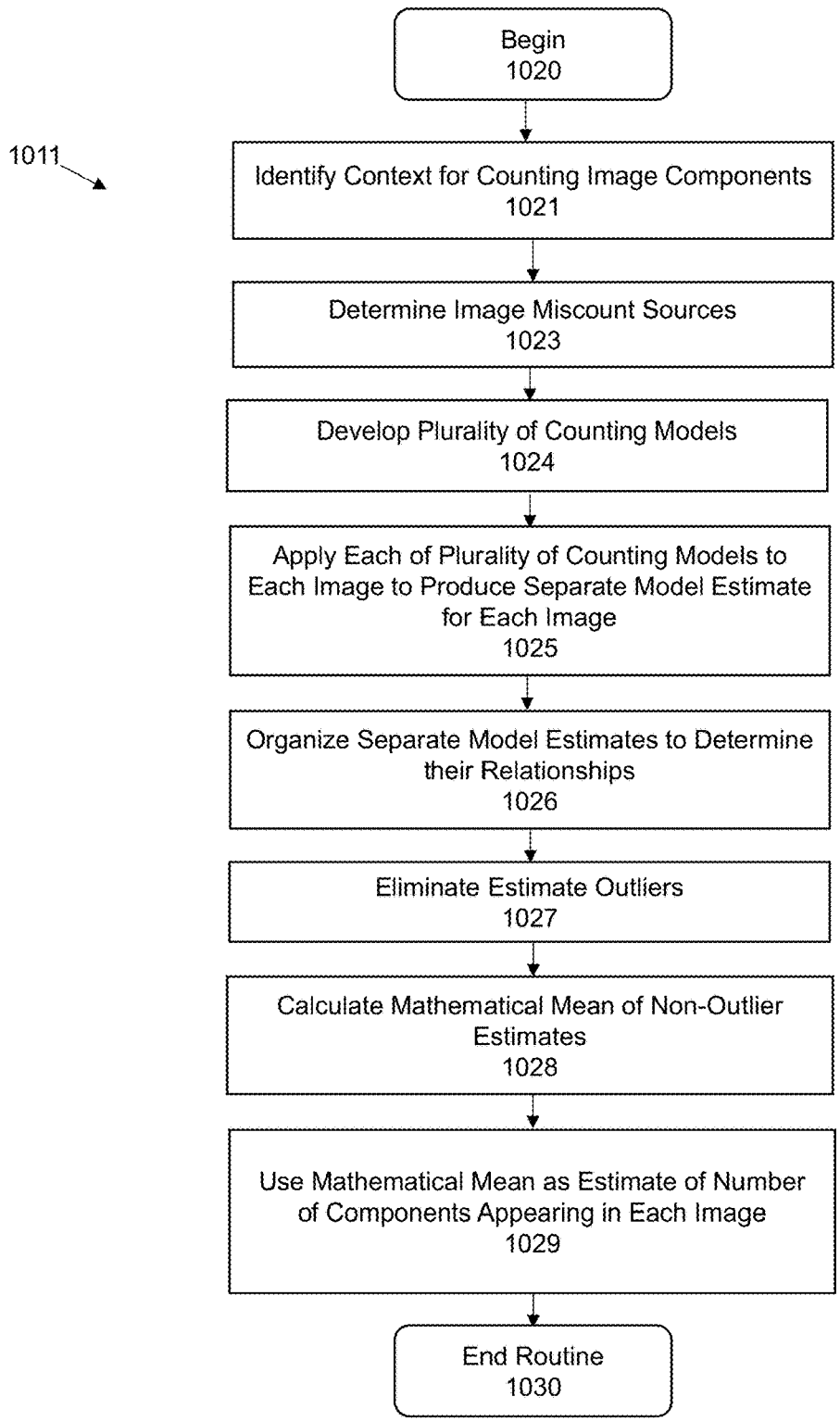
FIG. 10A is flowchart showing the operation of an additional preferred embodiment of the present invention.

The following describes certain preferred embodiments by which the balancing of the content 451 may be accomplished. More specifically, one of the preferred embodiments of a routine by which balancing of content may be accomplished is illustrated in FIG. 10A. Routine 1011 facilitates the development of at least an accurate estimate of the number of a selected component that appears in one or more images.

In block 1021 of routine 1011, the context in which the counting of image components is to take place is identified. For example, the context may be the counting of the number of people in a certain location, or the number of animals in a herd, or the number of cars in the parking lot of a mall or retailer. The following will be discussed from the perspective of the counting of cars in a parking lot as representative of the various contexts to which the present invention may be used.

In block 1023 of routine 1011, the features that may appear in the one or more images that may be a source of miscounts by the automated system are determined. For example, if the task is to accurately estimate the number of cars that may appear in images taken of a parking lot, inaccurate counts may result from the counting of lighting standards in the parking lots or the failure to count dark colored cars in a black-topped parking lot. Determining possible image miscount sources is important for the development of counting models that can provide accurate estimates even with such possible source of errors.

In block 1024, a plurality of counting models are developed, each of which is intended to produce at least an accurate estimate of the number of components appearing in each of the analyzed images taking into consideration one or more of the possible image miscount sources. For example, one or more models may be developed that count the number of cars in a parking lot but which is able to identify cars that, given their color, do not markedly contrast with the color of the surface of the parking lot (e.g., gray colored cars and gray colored parking lot, or dark-colored cars against black-topped parking lots). Other models may be developed that are better able to count cars parked in diagonal parking spaces in contrast to cars parking in straight parking spaces, or cars during summer conditions when the glare of a bright sun may obscure images or winter when snow piles may appear to be light-colored cars or with respect to other aspects, characteristics, or features associated with cars.

Certain preferred embodiments may use 300 different counting models to produce separate model estimates of the components appearing in each image or images. Other preferred embodiments may use fewer models or more models depending, in part, in the context in which the counting is to take place.

In block 1025, each of the counting models are applied to each of the images to count the number of the selected component in each to develop at least separate model estimates of the number of components appearing in each of the images.

In block 1026, the separate model estimates are organized to determine the relationship of each of the separate model estimates to each other and to the aggregation of all separate model estimates. One preferred embodiment by which the separate model estimates may be organized to determine such relationships is to plot the separate model estimates. Advantageously, such plotting can reveal whether the application of separate counting models produced the same or similar separate model estimates and whether and to what extent some of the estimates may be considered to be outliers relative to a grouping of other of the estimates. Certain embodiments of the present invention may define such outliers as being 1 standard deviation from the mean and the final estimation as being the mean of the remaining counts. Other embodiments of the present invention may consider any estimate that is more than 1.5 standard deviation from the mean as being an outlier. The plotting of the results may produce a bell-shaped curve or another shape.

In block 1027, the estimate outliers are eliminated from further processing. [please provide more information how this and the following two steps are conducted.]

In block 1028, the mean of the remaining non-outlier estimates is calculated.

In block 1029, the mean is the estimate of the number of components appearing in the image.

Advantageously, the power and novelty of such embodiments of balancing approach is that the system may be scaled in line with the number of images that are available for analysis and the use of statistics and a large sample size of less accurate counts to arrive at a final accurate count that is based on a combination of all of the best counts.

To illustrate, a user may seek to determine the number of cars in the parking lots associated with 1,000 outlets of the same retailer. 1,000 images may be taken at the same time of each of the parking lots. Many different analysis models may be used to determine the cars in the parking lots. If, for example, 300 different models are used to count the cars that are shown in each of these images, 300,000 car counts (300 per image) for the same retailer will be produced. When the outliers are eliminated, and the mean of the best counts for each image, the mean count is then used as the final count for that image and included in a final report with a mean count for all 1,000 images.

Figure 10B:
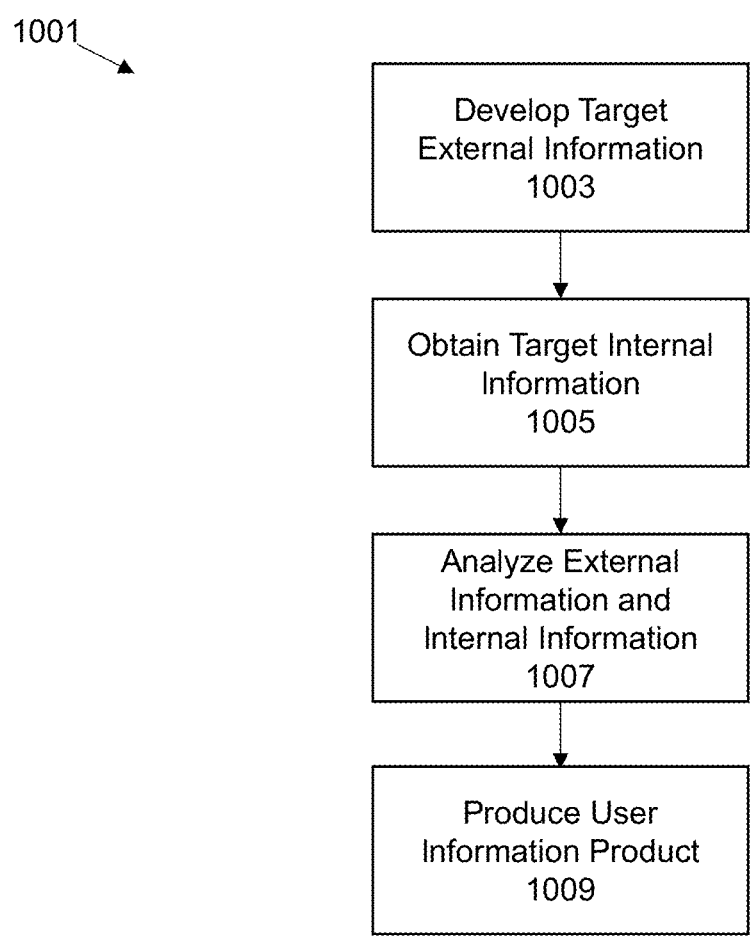
FIG. 10B is flowchart showing the operation of an additional preferred embodiment of the present invention.

FIG. 10B illustrates one preferred embodiment of a system 1001 according to the present invention that may permit an analysis to be conducted of the external information developed for a target and the internal information obtained for that target by a business. The target may be a business for which the user is seeking to estimate its economic health. For purposes of this application, external information is observable information but not that which a user obtains as a result of the business transactions that the user conducts and to which the user has at least initially a proprietary interest. Such user business transaction information is considered internal information for purposes of this application and may comprise, for example, information obtained by a user as result of the services or products sold to customers of the user such as in one or more stores of the user. For example, one preferred embodiment of the system 1001 shown in FIG. 10B develops external information 1003 through the use of the system 411 shown in FIG. 4A. The use of the system 411 may provide parking lot fill rates or parking lot car counts developed through an analysis of satellite images taken of one or more stores of a business or businesses. Information developed through this process is based on images captured of the exterior of the store and only indirectly relate to the proprietary transactions that may be taking place within the targeted store. The external information developed about a target through the use of the development component 803 and the internal information obtained by a user through component 1005 may be analyzed by a user through analysis component 1007 in order that the user may produce an information product through production component 1009 that the user may not share with another given the proprietary nature of the internal information.

In order to measure growth of activity for a group of locations, the user may utilize a "balancing" methodology that creates a comparable representative sample in each time period that the user is measuring. This may be necessary because the raw sample of data extracted from imagery or other sources may be imbalanced from one period to another in terms of the distribution of data such as by geographic region, store location, store format, day of week, and time of day. The process of balancing may either remove data from the sample that is over-represented or apply a higher weight to data to the sample that is under-represented, so that the sample is comparable to other samples.

Balancing may be done both during the ordering process and during the analysis of data. During the ordering process, for imagery and other sources, sources may be selected based on a set of standards in order to obtain the most appropriate and comparable sample for the analysis. Balancing during the ordering process may be done both by proprietary code and by manual selection. Balancing may take into account store composition, proper proportions of different store formats, regional footprint, or other factors.

Balancing may be applied to various products and analyses such as retail traffic growth, agricultural crop health and growth, industrial employment and production, or coal and iron ore consumption at global steel mills. In certain embodiments, a statistical sample of activity at multiple locations using imagery or other informational sources that indicate activity at a certain place or time are obtained, and the samples weighted or balanced to make them comparable both on the front end when ordering or obtaining observations, and on the back end after the data content has been extracted for development of the final information product.

Below is an example of the balancing process for retail traffic growth measurement for the TrafficSignals application and for retail traffic data, both at ordering and for development of the final information product.

There are several ways that balancing methods can be applied at the time of ordering images from sources such as satellites. Each week, the user may download satellite imagery metadata for the prior week and the same week in the past year for each business target. The satellite imagery metadata may be obtained from satellite imagery providers (e.g., DigitalGlobe, Airbus Defense & Space.) It may then be available in shapefile format: https://www.esri.com/library/whitepapers/pdfs/shapefile.pdf. However, other formats/download options may be available.

Using embodiments of custom Python code and GIS software, the system may combine the satellite imagery metadata with the full store location database that may be stored in either shapefile format, or another GIS format called a Geodatabase. The store location database may be developed using public company information and/or from purchases of third party data from companies, such as AggData, LLC. Such data may be a file of lat/long locations with other fields like address, zipcode, store number, etc.

The result of the combination of the satellite imagery metadata and the store locations may represent the full set of available imagery that may exist for that particular week, year-over-year. However, instead of ordering everything available, which may produce an imbalanced sample, the system uses the following processes in Python script to create a comparable sample year-over-year across all of the retailers under coverage:

Equalize the number of store locations that have matches year-over-year

Equalize the number of store locations that don't have matches year-over-year

Equalize the number of store locations by U.S. Census Division year-over-year (https://www.census.gov/geo/reference/gtc/gtc_census_divreg.html)

Match the composition of the sample of each year with the store footprint of each chain. The store footprint of each chain may be calculated by dividing the number of stores within any particular Census Division by the total number of stores within the chain. All of the above processes involve the system removing oversampling of any particular store location, Census Division, or footprint by a random sampling algorithm that was developed in Python and Numpy that deletes oversampled observation first by number of counts per day and then by total cloud cover (both by highest first). The resulting sample may be smaller than the total available sample and may be more comparable year-over-year for all of the chains we order on a weekly basis. The system may request the imagery that covers each location/date that was ordered.

Once the imagery from the providers have been received and the cars and spaces have been counted for each location, the system may perform a final balancing step for the development of each target's specific sample. This may be necessary because the balancing during the ordering process may be across all business targets that are covered and therefore may not be specific enough to capture all of the differences between each chain.

The system may engage multiple different types of balancing models that can be used separately or together to provide the most accurate sample. The software that may be used to do this may be custom code in Python and Numpy and may operates on the system's data in Excel or CSV format.

Balancing models seek to ensure that the proportions by region are correct, that year-over-year they are balanced well, and that there are enough images per day for each location. Proportions need to be comparable year-over-year and region-by-region. These models may also seek to ensure the right composition of store locations and formats are used, have the same number of stores that match year-over-year and the same number of stores that don't match year-over-year. Proportions maybe comparable for the following: Geographic Region; Store format (e.g., Regular Target vs. Super Target); Time of Day; Day of Week; and, Store Location.

The balancing process may be run in a similar way to the ordering process above in the sense that it uses an algorithm within each model that randomly deletes different combinations of oversampled observations in order to obtain a more comparable sample. It may accomplish this across hundreds or thousands of trials to find a "best fit" result that is then distributed to end users in various different products such as TrafficSignals, FactorySignals, CropSignals, Retail Traffic Data, and many other formats.

Figure 11A:
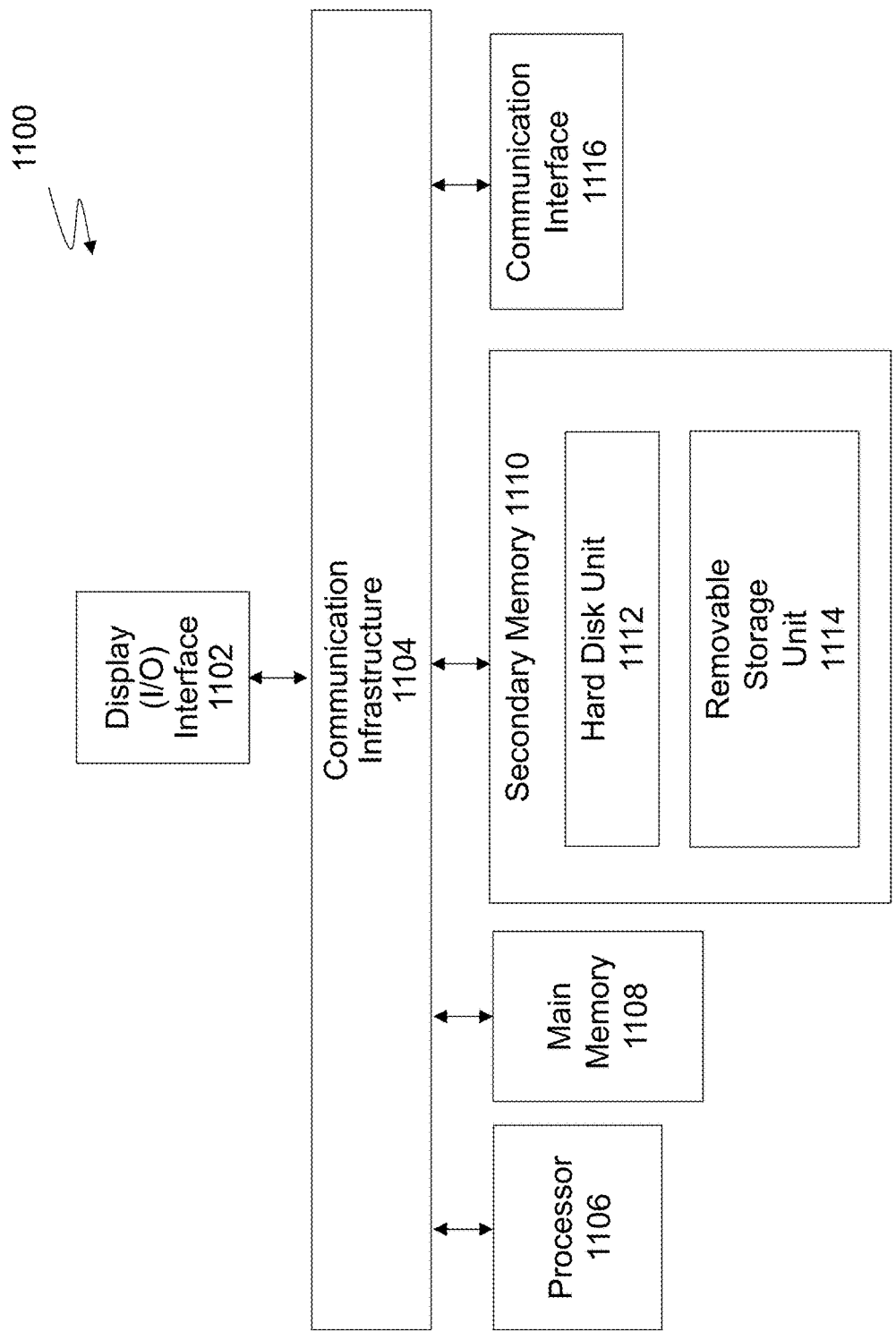
FIG. 11A illustrates an exemplary computer system 1100 that may be used to implement the methods according to the invention.

FIG. 11A illustrates an exemplary computer system 1100 that may be used to implement the methods according to the invention. One or more computer systems 1100 may carry out the methods presented herein as computer code.

Computer system 1100 includes an input/output display interface 1102 connected to communication infrastructure 1104—such as a bus—, which forwards data such as graphics, text, and information, from the communication infrastructure 1104 or from a frame buffer (not shown) to other components of the computer system 1100. The input/output display interface 1102 may be, for example, a keyboard, touch screen, joystick, trackball, mouse, monitor, speaker, printer, any other computer peripheral device, or any combination thereof, capable of entering and/or viewing data.

Computer system 1100 includes one or more processors 1106, which may be a special purpose or a general-purpose digital signal processor that processes certain information. Computer system 1100 also includes a main memory 1108, for example random access memory ("RAM"), read-only memory ("ROM"), mass storage device, or any combination of tangible, non-transitory memory. Computer system 1100 may also include a secondary memory 1110 such as a hard disk unit 1112, a removable storage unit 1114, or any combination of tangible, non-transitory memory. Computer system 1100 may also include a communication interface 1116, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 1108, secondary memory 1110, communication interface 1116, or a combination thereof, function as a computer usable storage medium, otherwise referred to as a computer readable storage medium, to store and/or access computer software including computer instructions. For example, computer programs or other instructions may be loaded into the computer system 1100 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 1114 or hard disc unit 1112 to the secondary memory 1110 or through the communication infrastructure 1104 to the main memory 1108 of the computer system 1100.

Communication interface 1116 allows software, instructions and data to be transferred between the computer system 1100 and external devices or external networks. Software, instructions, and/or data transferred by the communication interface 1116 are typically in the form of signals that may be electronic, electromagnetic, optical or other signals capable of being sent and received by the communication interface 1116. Signals may be sent and received using wire or cable, fiber optics, a phone line, a cellular phone link, a Radio Frequency ("RF") link, wireless link, or other communication channels.

Computer programs, when executed, enable the computer system 1100, particularly the processor 1106, to implement the methods of the invention according to computer software including instructions.

The computer system 1100 described herein may perform any one of, or any combination of, the steps of any of the methods presented herein. It is also contemplated that the methods according to the invention may be performed automatically, or may be invoked by some form of manual intervention.

The computer system 1110 of FIG. 11A is provided only for purposes of illustration, such that the invention is not limited to this specific embodiment. It is appreciated that a person skilled in the relevant art knows how to program and implement the invention using any computer system.

The computer system 1100 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Figure 11B:
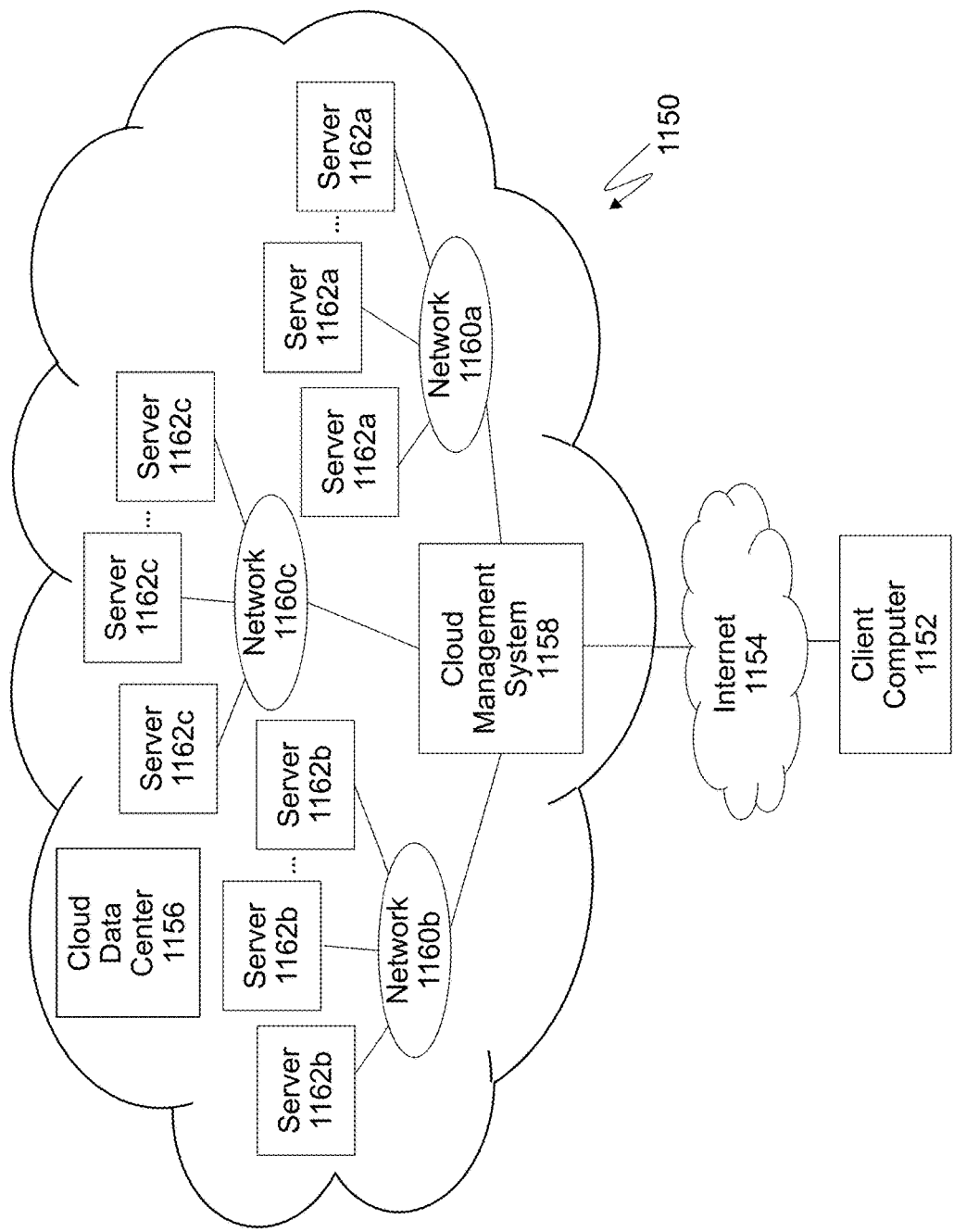
FIG. 11B is a cloud based system that may be used to implement the methods according to the invention.

Separate and apart from, or in addition to, computer system 1100, the methods according to the invention may be implemented using a cloud computing system. FIG. 11B illustrates an exemplary cloud computing system 1150 that may be used to implement the methods according to the present invention. The cloud computing system 1150 includes a plurality of interconnected computing environments. The cloud computing system 1150 utilizes the resources from various networks as a collective virtual computer, where the services and applications can run independently from a particular computer or server configuration making hardware less important.

Specifically, the cloud computing system 1150 includes at least one client computer 1152. The client computer 1152 may be any device through the use of which a distributed computing environment may be accessed to perform the methods disclosed herein, for example, a traditional computer, portable computer, mobile phone, personal digital assistant, tablet to name a few. The client computer 1152 includes a processor and memory such as random access memory ("RAM"), read-only memory ("ROM"), mass storage device, or any combination thereof as described more fully in reference to FIG. 11A.

The client computer 1152 also includes a communications interface, for example, a modem, a network interface (such as an Ethernet card), a communications port, a PCMCIA slot and card, wired or wireless systems, etc. The communications interface allows communication through transferred signals between the client computer 1152 and external devices including networks such as the Internet 1154 and cloud data center 1156. Communication may be implemented using wireless or wired capability such as cable, fiber optics, a phone line, a cellular phone link, radio waves or other communication channels.

The client computer 1152 establishes communication with the Internet 1154—specifically to one or more servers—to, in turn, establish communication with one or more cloud data centers 1156. A cloud data center 1156 includes one or more networks 1160a, 1160b, 1160c managed through a cloud management system 1158. Each network 1160a, 1160b, 1160c includes resource servers 1162a, 1162b, 1162c, respectively. Servers 1162a, 1162b, 1162c permit access to a collection of computing resources and components that can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. A further group of resource servers can host and serve applications to load on an instantiation of a virtual computer, such as an email client, a browser application, a messaging application, or other applications or software.

The cloud management system 1158 can comprise a dedicated or centralized server and/or other software, hardware, and network tools to communicate with one or more networks 1160a, 1160b, 1160c, such as the Internet or other public or private network, with all sets of resource servers 1162a, 1162b, 1162c. The cloud management system 1158 may be configured to query and identify the computing resources and components managed by the set of resource servers 1162a, 1162b, 1162c needed and available for use in the cloud data center 1156. Specifically, the cloud management system 1158 may be configured to identify the hardware resources and components such as type and amount of processing power, type and amount of memory, type and amount of storage, type and amount of network bandwidth and the like, of the set of resource servers 1162a, 1162b, 1162c needed and available for use in the cloud data center 1156. Likewise, the cloud management system 1158 can be configured to identify the software resources and components, such as type of Operating System ("OS"), application programs, and the like, of the set of resource servers 1162a, 1162b, 1162c needed and available for use in the cloud data center 1156.

The present invention is also directed to computer products, otherwise referred to as computer program products, to provide software to the cloud computing system 1150. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 1150 of FIG. 11B is provided only for purposes of illustration and does not limit the invention to this specific embodiment. It is appreciated that a person skilled in the relevant art knows how to program and implement the invention using any computer system or network architecture.

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A computer method for providing an estimate of economic activity of one or more retail stores comprising the steps of:
   capturing by a recording device one or more visual recordings of the one or more retail stores over a first time period and a second time period;
   sending to a processor the one or more visual recordings;
   generating by the processor one or more representations from the one or more visual recordings;
   refining by the processor the one or more representations based on one or more criteria to produce one or more refined representations, wherein the refining step further comprises the step of determining whether a threshold value of a selected criteria is met by each of the one or more representations, and if the threshold value is not met, removing the one or more representations the selected criteria selected from the group consisting of resolution, pixilation, and cloud cover;
   extracting by the processor content for evaluation from the one or more refined representations;
   evaluating by the processor the content to obtain a result, wherein said evaluating step comprises the steps of:
   counting by the processor a number of cars in a parking lot;
   counting by the processor a number of empty parking spaces; and
   dividing by the processor the number of cars in the parking lot by the number of empty parking spaces to determine a first fill rate for the one or more retail stores over the first time period;
   repeating said evaluating step to determine a second fill rate for the one or more retail stores at the second time period;
   comparing the first fill rate to the second fill rate; and
   displaying the result on a display, wherein the result comprises the estimate of economic activity of the one or more retail stores.

2. The computer method for providing an estimate of economic activity of one or more retail stores according to claim 1, wherein said evaluating step further comprises a step of comparing two or more representations to obtain the result.

3. The computer method for providing an estimate of economic activity of one or more retail stores according to claim 1, wherein the recording device is one or more selected from a group consisting of a camera, a satellite camera, and an aerial mapping camera.

4. The computer method for providing an estimate of economic activity of one or more retail stores according to claim 1, wherein the one or more representations includes renderable metadata comprising a time and a date of said capturing step.

5. The computer method for providing an estimate of economic activity of one or more retail stores according to claim 1, wherein the one or more representations having the threshold value of less than 0.95 panchromatic resolution are removed.

6. The computer method for providing an estimate of economic activity of one or more retail stores according to claim 1, wherein the one or more representations having less than 0.85 centimeters per pixel are removed.

7. The computer method for providing an estimate of economic activity of one or more retail stores according to claim 1, wherein the one or more representations having more than 95% cloud cover are removed.

8. The computer method for providing an estimate of economic activity of one or more retail stores according to claim 1, wherein said refining step further comprises the steps of:
   overlaying by the processor coordinate units on the content;
   detecting by the processor the coordinate units that intersect with a cloud cover criteria; and
   removing the content of the coordinate units that do not intersect with the cloud cover criteria.

9. The computer method for providing an estimate of economic activity of one or more retail stores according to claim 1, wherein the result includes one or more selected from a group consisting of: a fill rate of a parking lot, a market share percentage of a particular retail store in geographic location, a trend in retail store revenues over time or over a geographic region, a value of sales of one or more retailers, a value of a share of cars over a specific time period, a close rate of cars in a parking lot of a retailer versus actual transactions measured by the retailer.

10. The computer method for providing an estimate of economic activity of one or more retail stores according to claim 1, wherein each of the first time period and the second time period is selected from a group consisting of a day, a week, a month, a quarter, and a year.

11. The computer method for providing an estimate of economic activity of one or more retail stores according to claim 1, wherein the first time period is a day, a week, a month, or a quarter, of a first year, and the second time period is a day, a week, a month, or a quarter, of a second year.

12. The computer method for providing an estimate of economic activity of one or more retail stores according to claim 1, wherein each of the first fill rate and the second fill rate is determined as an average fill rate over the first time period and the second time period.

13. The computer method for providing an estimate of economic activity of one or more retail stores according to claim 1, wherein said comparing step further includes alerting a user if the comparison of the first fill rate and the second fill rate exceeds a predetermined value.

14. The computer method for providing an estimate of economic activity of one or more retail stores according to claim 1, wherein the one or more retail stores is a same retail store or a different retail store.

15. The computer method for providing an estimate of economic activity of one or more retail stores according to claim 1, further comprising determining a stock price of each of the one or more retail stores, and comparing the stock price to a benchmark, wherein the benchmark includes financial information of the each of the one or more retail stores from a third-party source, to produce a stock performance value.

16. The computer method for providing an estimate of economic activity of one or more retail stores according to claim 15, wherein the financial information includes a stock price performance according to Standard & Poor's 500 Stock Index.

17. The computer method for providing an estimate of economic activity of one or more retail stores according to claim 15, wherein the stock performance value is compared to the result, wherein the comparison of the stock performance value and the result produces a performance signal, the performance signal indicating an increase, decrease or no movement in the stock performance value compared to the result, and the performance signal being readable by a user.

18. The computer method for providing an estimate of economic activity of one or more retail stores according to claim 1, wherein the result comprises an estimate of stock price performance of the one or more retail stores.

19. The computer method for providing an estimate of economic activity of one or more retail stores according to claim 1, wherein said extracting step further includes:
 defining a border around the one or more retail stores;
 identifying within the border a parking lot of the one or more retail stores; and
 distinguishing within the border both a number of cars in the parking lot and a number of empty parking spaces in the parking lot.

20. The computer method for providing an estimate of economic activity of one or more retail stores according to claim 1, wherein the result is compared to a historical average of a fill rate of the parking lot.

21. A computer method for providing an estimate of economic activity of one or more retail stores comprising the steps of:
 capturing by a recording device one or more visual recordings of the one or more retail stores over a first time period and a second time period;
 sending to a processor the one or more visual recordings;
 generating by the processor one or more representations from the one or more visual recordings;
 refining by the processor the one or more representations based on one or more criteria to produce one or more refined representations, wherein the refining step further comprises the step of determining whether a threshold value of a selected criteria is met by each of the one or more representations, and if the threshold value is not met, removing the one or more representations, the selected criteria selected from the group consisting of resolution, pixilation, and cloud cover;
 extracting by the processor content for evaluation from the one or more refined representations, wherein said extracting step further includes:
 defining a border around the one or more retail stores;
 identifying within the border a parking lot of the one or more retail stores; and
 distinguishing within the border both a number of cars in the parking lot and a number of empty parking spaces in the parking lot;
 evaluating by the processor the content to obtain a result, wherein the evaluating step further comprises the steps of:
 counting by the processor the number of cars in the parking lot;
 counting by the processor the number of empty parking spaces; and
 dividing by the processor the number of cars in the parking lot by the number of empty parking spaces to determine a first fill rate of the first time period, wherein the first time period is selected from a group consisting of a day, a week, a month, and a quarter, of a first year;
 repeating the extracting and evaluating step to determine a second fill rate for the one or more retail stores of the second time period, wherein the second time period is identical to the first time period, but of a second year;
 comparing the first fill rate to the second fill rate; and
 displaying the result on a display, wherein the result comprises the estimate of economic activity of the one or more retail stores.

22. The computer method for providing an estimate of economic activity of one or more retail stores according to claim 21, wherein the one or more representations having the threshold value of less than 0.95 panchromatic resolution are removed.

* * * * *